US012421795B2

(12) United States Patent
Luo et al.

(10) Patent No.: US 12,421,795 B2
(45) Date of Patent: Sep. 23, 2025

(54) CORDLESS WINDOW COVERING

(71) Applicant: Nien Made Enterprise Co., Ltd., Taichung (TW)

(72) Inventors: Lei Luo, Taichung (TW); Lin Chen, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 256 days.

(21) Appl. No.: 18/373,994

(22) Filed: Sep. 28, 2023

(65) Prior Publication Data

US 2024/0117671 A1 Apr. 11, 2024

(30) Foreign Application Priority Data

Oct. 6, 2022 (TW) .................................. 111211049

(51) Int. Cl.
*E06B 9/322* (2006.01)
*E06B 9/327* (2006.01)

(52) U.S. Cl.
CPC .............. *E06B 9/327* (2013.01); *E06B 9/322* (2013.01); *E06B 2009/3222* (2013.01)

(58) Field of Classification Search
CPC ... E06B 9/327; E06B 9/322; E06B 2009/3222
See application file for complete search history.

(56) References Cited

U.S. PATENT DOCUMENTS

| | | | | |
|---|---|---|---|---|
| 8,002,012 B2 * | 8/2011 | Cheng | E06B 9/322 160/176.1 R |
| 9,435,153 B2 * | 9/2016 | Chen | E06B 9/322 |
| 9,863,185 B2 * | 1/2018 | Franssen | E06B 9/388 |
| 10,550,635 B2 * | 2/2020 | Lin | E06B 9/324 |
| 10,704,323 B2 * | 7/2020 | Chen | E06B 9/322 |
| 10,704,658 B2 * | 7/2020 | Chen | F16H 19/0672 |
| 10,995,545 B2 * | 5/2021 | Chen | E06B 9/364 |
| 11,047,172 B2 * | 6/2021 | Huang | E06B 9/322 |
| 11,072,975 B2 * | 7/2021 | Chen | E06B 9/322 |
| 11,473,370 B2 * | 10/2022 | Chen | E06B 9/322 |
| 11,970,901 B2 * | 4/2024 | Luo | E06B 9/305 |
| 2008/0099157 A1 * | 5/2008 | Nien | E06B 9/322 160/84.05 |
| 2016/0376839 A1 * | 12/2016 | Huang | E06B 9/323 160/368.1 |
| 2019/0063147 A1 * | 2/2019 | Cheng | E06B 9/322 |
| 2021/0381308 A1 * | 12/2021 | Li | E06B 9/326 |
| 2024/0117671 A1 * | 4/2024 | Luo | E06B 9/322 |

* cited by examiner

*Primary Examiner* — Johnnie A. Shablack
(74) *Attorney, Agent, or Firm* — Winston Hsu

(57) ABSTRACT

A cordless window covering includes a first rail, a second rail, a covering body, two pulling cords, and a cord-retracting device including a first casing and an adjusting member movably disposed on the first casing. When relative motion of the first rail and the second rail occurs, the covering body is extended or retracted, and the two pulling cords apply a first force and a second force in opposite directions to the adjusting member respectively. When the first force does not equal to the second force, the user can exert slight force on the second rail to move the adjusting member towards a side with greater force, making one of the pulling cords applying greater force to the adjusting member have its length between the first rail and the second rail elongate as the adjusting member moves, such that the non-horizontal state of the second rail can be easily corrected.

13 Claims, 49 Drawing Sheets

CORDLESS WINDOW COVERING

BACKGROUND OF THE DISCLOSURE

1. Field of the Disclosure

The present disclosure generally relates to a cordless window covering, and more particularly relates to the cordless window covering having a lower rail of which the levelness is adjustable.

2. Description of the Prior Art

In general, a typical cordless window covering usually includes a cord retractor disposed in the upper rail for winding up or releasing the pulling cords, by which the lower rail ascends or descends with respect to the upper rail. Often, the movements of the lower rail of the cordless window covering are manually controlled by users as the user may push up or drag down the lower rail. However, even undergoing regular operation, the lower rail may exhibit a slight slant and not remain perfectly horizontal after lifting or lowering action comes to a stop. This may be caused by human operation errors or unevenly arrangement of the pulling cords reeling on the cord retractor. As the position where the lower rail stops is closer to the upper rail, the slightly slanted situation of the lower rail would be more easily noticeable visually.

Especially if the lower rail is slightly slanted when the window covering has been fully retracted, the user needs to drag down the lower rail to a certain extent again to let the pulling cords released from the cord retractor, and then repeatedly push up the lower rail to adjust the levelness of the lower rail. This operation is not only time-consuming but also laborious. Therefore, taking into account aesthetics and ease of operation, a method and a mechanism for adjusting the levelness of the lower rail without largely changing the height of the lower rail are needed.

SUMMARY OF THE DISCLOSURE

In light of the above reasons, one aspect of the present disclosure is to provide a cordless window covering solving the problem that the user must pull down the lower rail largely to adjust the levelness of the lower rail if the lower rail exhibits a slight slant.

To achieve the above objective, the cordless window covering provided by the present disclosure includes a first rail, a covering body, a second rail, a first pulling cord, a second pulling cord, and a cord-retracting device. The covering body has a first edge disposed on one side of the first rail and a second edge opposing to the first edge. The second rail is connected to the second edge of the covering body so that the covering body is located between the first rail and the second rail. The cord-retracting device is disposed in the first rail and includes a first casing, a power assembly, a first reeling wheel, a second reeling wheel, and an adjusting member. The power assembly is situated on the first casing. The first reeling wheel is rotatably disposed on the first casing. The second reeling wheel is rotatably disposed on the first casing and connected to the first reeling wheel in which the first reeling wheel and the second reeling wheel can be driven by each other to rotate concurrently. The adjusting member is situated on the first casing and movable with respect to the first casing. A first end of the first pulling cord and a first end of the second pulling cord are respectively connected to the first reeling wheel and the second reeling wheel, and a second end of the first pulling cord and a second end of the second pulling cord extend in opposite directions after respectively going around the adjusting member, such that the first pulling cord and the second pulling cord respectively apply a first force and a second force in opposite directions to the adjusting member. When the first force does not substantially equal to the second force, the adjusting member moves with respect to the first casing towards a side with greater force, and one of the first pulling cord and the second pulling cord applying greater force to the adjusting member than the other has a length thereof located between the first rail and the second rail elongate along with movement of the adjusting member.

In one embodiment, the first casing includes a first guiding portion, and the adjusting member includes a first guided portion at a first end of the adjusting member, wherein the first guided portion is movable with respect to the first guiding portion.

In one embodiment, the first guiding portion is one of a first groove and a first protrusion, while the first guided portion is the other one of the first groove and the first protrusion, wherein the first protrusion stretches into the first groove and a length of the first groove is greater than a breadth of the first protrusion.

In one embodiment, the adjusting member has a pivot post located at one end of the adjusting member and connected to the first casing, such that the adjusting member can swing with respect to the first casing.

In one embodiment, the adjusting member has a through hole and a post body, and the through hole penetrates through the post body, wherein the second end of the first pulling cord and the second end of the second pulling cord pass through the through hole and then extend in opposite directions.

In one embodiment, the adjusting member further includes an annular member disposed around the through hole and corresponding to the through hole in shape.

In one embodiment, the cordless window covering further includes a second casing opposing to and engaged with the first casing, and the first reeling wheel and the second reeling wheel are situated between the second casing and the first casing.

In one embodiment, the second casing includes a second guiding portion corresponding to the first guiding portion of the first casing, and the adjusting member includes a second guided portion at a second end of the adjusting member, wherein the second guided portion is movable with respect to the second guiding portion.

In one embodiment, the second guiding portion is one of a second groove and a second protrusion, while the second guided portion is the other one of the second groove and the second protrusion, wherein the second protrusion stretches into the second groove and a length of the second groove is greater than a breadth of the second protrusion.

In one embodiment, the first rail includes a third guiding portion on one surface thereof, and the first casing of the cord-retracting device includes a third guided portion movable with respect to the third guiding portion.

In one embodiment, the third guiding portion is one of a third groove and a third protrusion, while the third guided portion is the other one of the third groove and the third protrusion, wherein the third protrusion stretches into the third groove and a length of the third groove is greater than a breadth of the third protrusion.

In one embodiment, the first reeling wheel and the second reeling wheel are coaxially one stacked on the other vertically.

In one embodiment, the power assembly includes a driving wheel and a spring, and the driving wheel is rotatably disposed on the first casing; one end of the spring is connected to the driving wheel and can be wound onto or unwound from the driving wheel along with rotation of the driving wheel; the driving wheel is connected to the first reeling wheel and the second reeling wheel in a concurrent movable manner, so that the first reeling wheel and the second reeling wheel can be driven to rotate by the rotation of the driving wheel; when the spring is unwound from the driving wheel and makes the driving wheel rotate, the first reeling wheel and the second reeling wheel are driven to rotate and retract the first pulling cord and the second pulling cord respectively.

In conclusion, the cordless window covering of the present disclosure has one or more of the following advantages:

(1) By the collaboration of the adjusting member and the first and second pulling cords, when the second rail of the cordless window covering appears to a slight slant and is in a non-horizontal state, the user can change the lengths of the first and second pulling cords between the first rail and the second rail by movement of the adjusting member, without necessity of largely changing the height of the second rail, thereby making the second rail perfectly horizontal. In other words, the user can achieve the goal of improving the overall aesthetic appeal of the cordless window covering by convenient operation.

(2) By the collaboration of the adjusting member, the cord-retracting device and the first and the second pulling cords, when the second rail of the cordless window covering appears to a slight slant and is in a non-horizontal state, the user can change the lengths of the first and second pulling cords between the first rail and the second rail by individual movements of the adjusting member and the cord-retracting device, without necessity of largely changing the height of the second rail, thereby making the second rail perfectly horizontal. In other words, the user can achieve the goal of improving the overall aesthetic appeal of the cordless window covering by convenient operation.

(3) The first rail where the cord-retracing device is disposed can be either a rail fixed on the window frame of the wall to suspend the covering body, or a rail connected to a free end of the covering body for being pushed or pulled by users. No matter which rail or which position inside the rail the cord-retracing device is disposed at, the overall function of the cord-retracing device remains the same. Therefore, the configuration position of the cord-retracing device can be arbitrarily chosen according to design requirements and high practicality is achieved thereby.

The preceding text has provided a comprehensive overview of the technical features and advantages of the present disclosure, in order to facilitate a better understanding of the detailed description in the following text. Other technical features and advantages pertaining to the subject matter of the patent disclosure will be described in the following text. One having ordinary skill in the art to which the present disclosure relates should understand that the concepts and specific embodiments disclosed in the following text can be easily utilized to modify or design other structures or processes to achieve the same objectives as the present disclosure. It should also be understood by one having ordinary skill in the art to which the present disclosure relates that such equivalent constructions cannot depart from the spirit and scope of the present disclosure as defined by the appended claims.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings. In accordance with industrial standard practices, the components are not drawn to scale. For the purpose of clarity in discussion, the dimensions of each component may be arbitrarily enlarged or reduced, in which.

DETAILED DESCRIPTION

Figure 1:
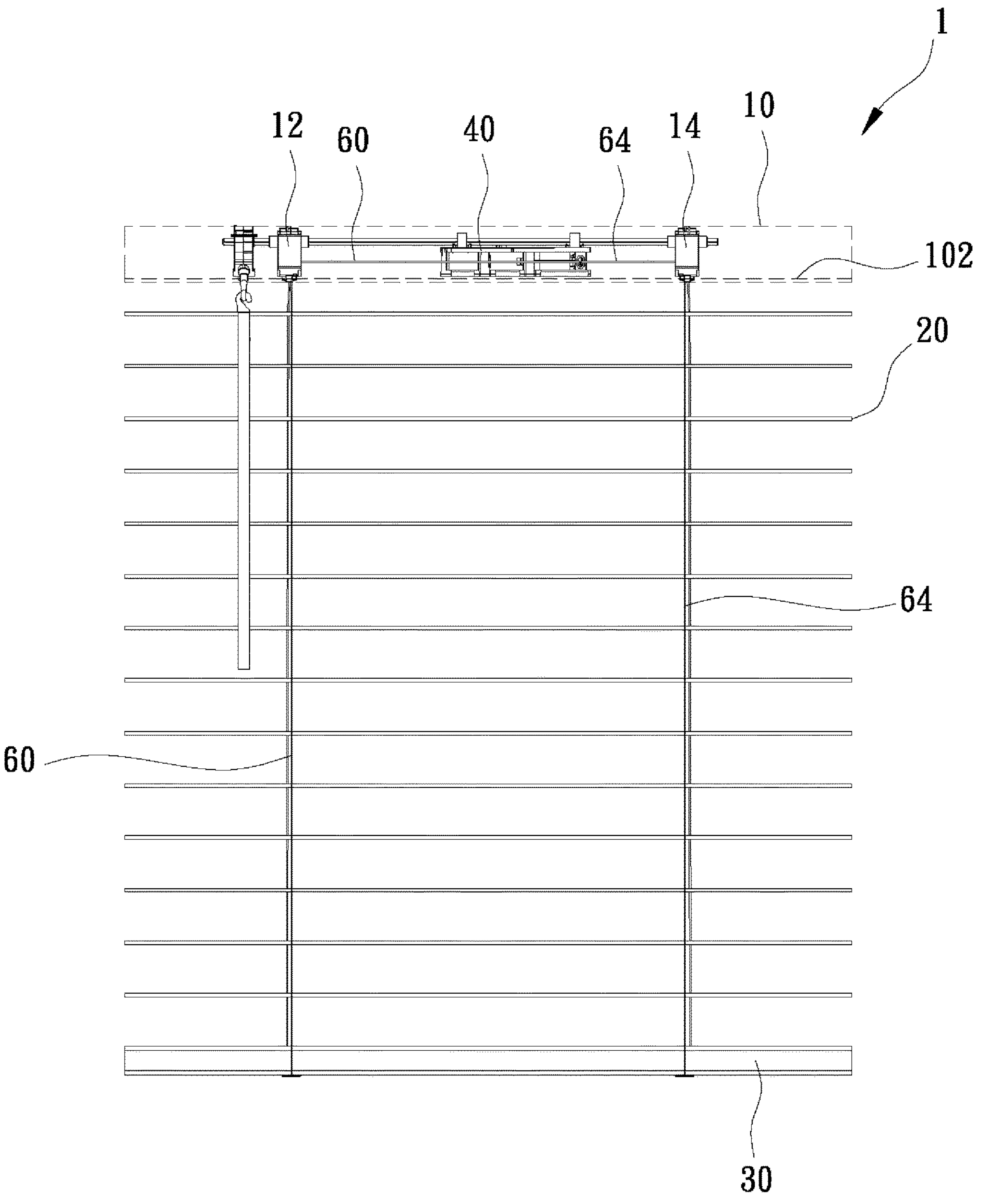
FIG. 1 is a front view of the cordless window covering according to the first embodiment of the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. For instance, when one element is described as being "on" the other element, an embodiment in which the two elements are in direct contact and an embodiment in which there is an extra element situated between the two elements and the two elements are not in direct contact are both encompassed. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person having ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims. The terms regarding space relationships mentioned in the specification, including "below", "under", "lower", "on" and "upper", are illustrative terms for describing relationships between one element or part with the other element or part, encompassing the positions of the elements or parts in usage or operation other than that depicted in the drawings. For instance, the apparatus may be rotated to the other position and the terms regarding space relationships can still be utilized in explanation.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Figure 2:
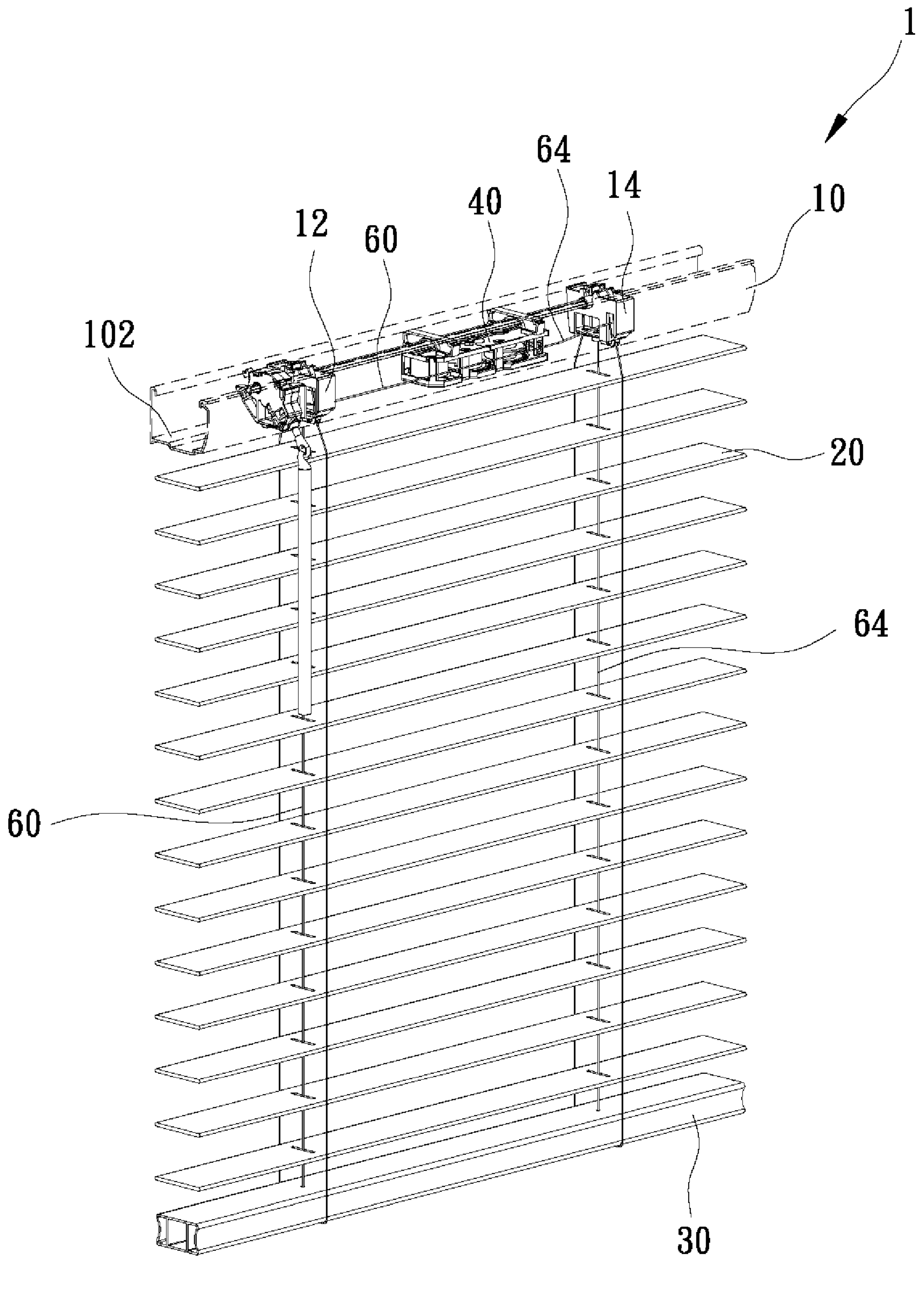
FIG. 2 is a perspective view of the cordless window covering in FIG. 1.

Please refer to FIG. 1 and FIG. 2, which show a cordless window covering 1 according to a first embodiment of the present disclosure. The cordless window covering 1 comprises a first rail 10, a covering body 20, a second rail 30, a cord-retracting device 40, a first pulling cord 60 and a second pulling cord 64. The first rail 10 is for being mounting on a window frame or the wall to suspend the covering body 20 and the second rail 30. The covering body 20 comprises plural slats parallel to each other, and has two opposing sides connected to the first rail 10 and the second rail 30 respectively so that the covering body 20 is situated between the first rail 10 and the second rail 30. The second rail 30 is disposed below the lowest slat of the covering body 20. In the present embodiment, the first rail 10 is roughly a hollow cuboid having a U-shape cross-section. There are a first fixed seat 12 and a second fixed seat 14 disposed within the first rail 10 spaced from each other. Referring to the front view of the cordless window covering 1 as shown in FIG. 1, the first fixed seat 12 is on the left side and the second fixed seat 14 is on the right side. The cord-retracting device 40 is disposed inside the first rail 10 and located between the first fixed seat 12 and the second fixed seat 14.

Referring to FIGS. 3 to 6, the cord-retracting device 40 comprises a first casing 42, a power assembly 46, a reeling assembly 50 and an adjusting member 54. The first casing 42 is roughly parallel to and attached on an inner bottom surface 102 of the first rail 10, as shown in FIGS. 1 and 2. The first casing 42 has a first inner surface 422. The power assembly 46 comprises a spring storage wheel 462, a driving wheel 464 and a spring 466. The spring storage wheel 462 and the driving wheel 464 are rotatably disposed on the first inner surface 422 of the first casing 42 and are adjacent to each other, such that the spring storage wheel 462 and the driving wheel 464 are rotatable with respect to the first casing 42. One end of the spring 466 is connected to the driving wheel 464, and the other end is connected to the spring storage wheel 462. The spring storage wheel 462 is an idler wheel. As the driving wheel 464 rotates in different directions, the spring 466 is driven to be released from the spring storage wheel 462 and wound on the driving wheel 464, or released from the driving wheel 464 and wound on the spring storage wheel 462.

Figure 3:
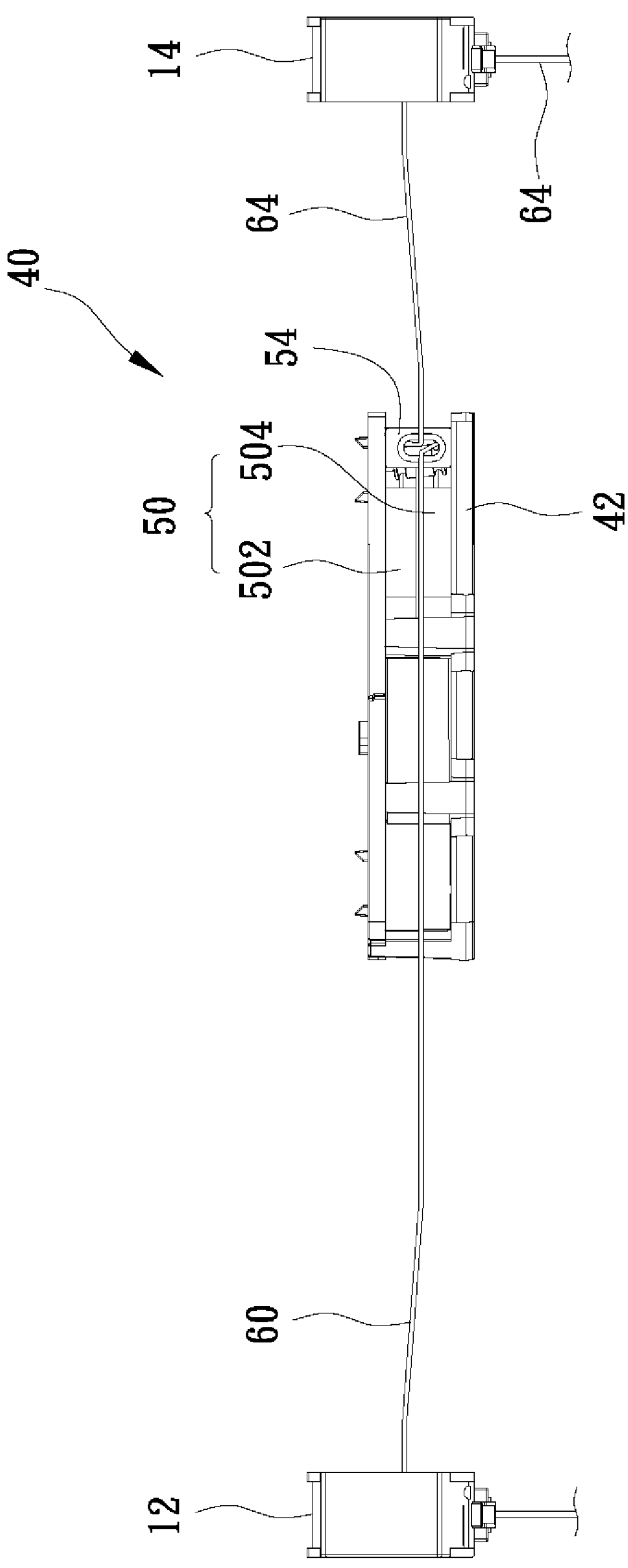
FIG. 3 is a front view of the mechanical configuration within the first rail in FIG. 1.
Figure 4:
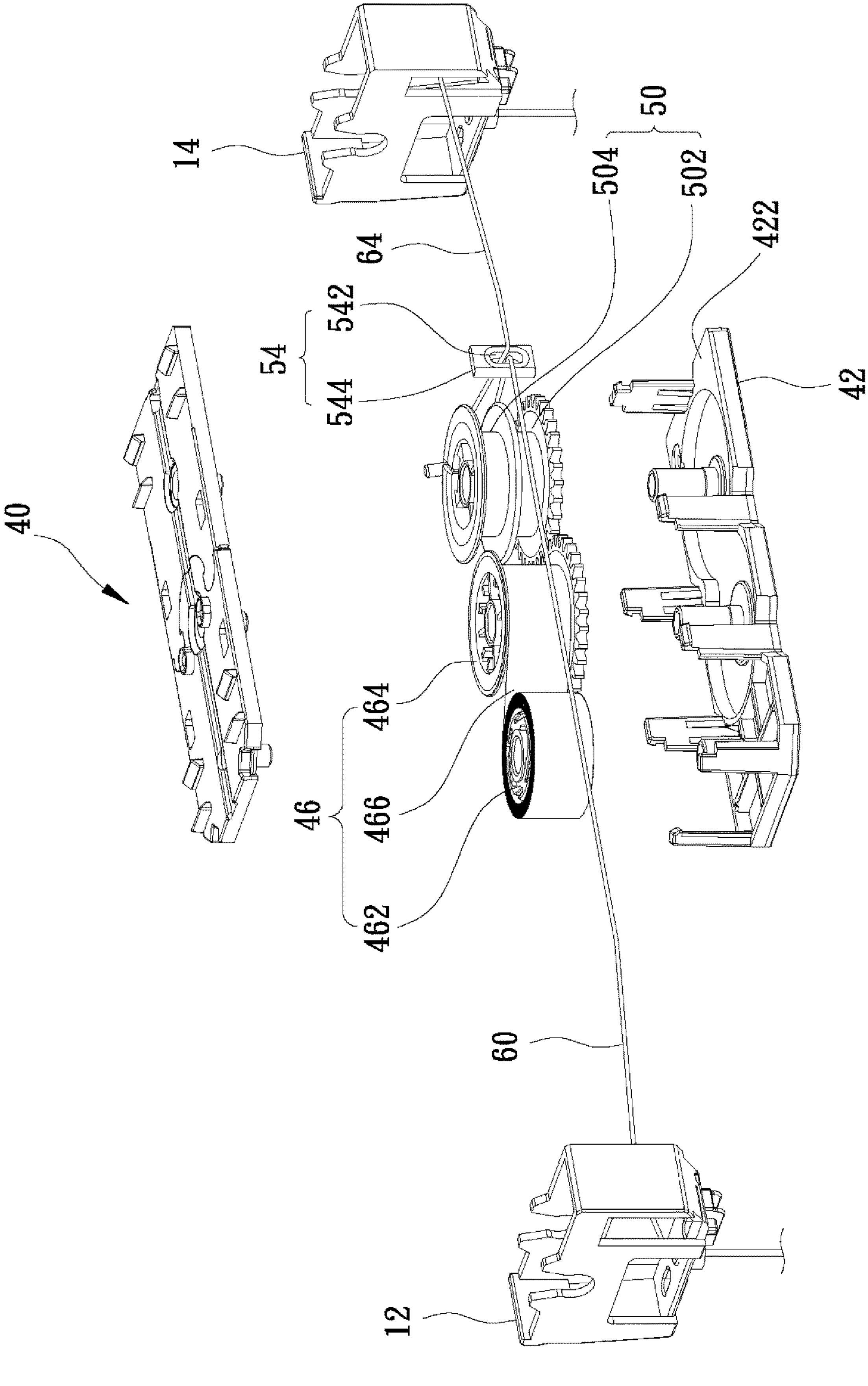
FIG. 4 is an exploded perspective view of the cord-retracting device in FIG. 3.
Figure 5:
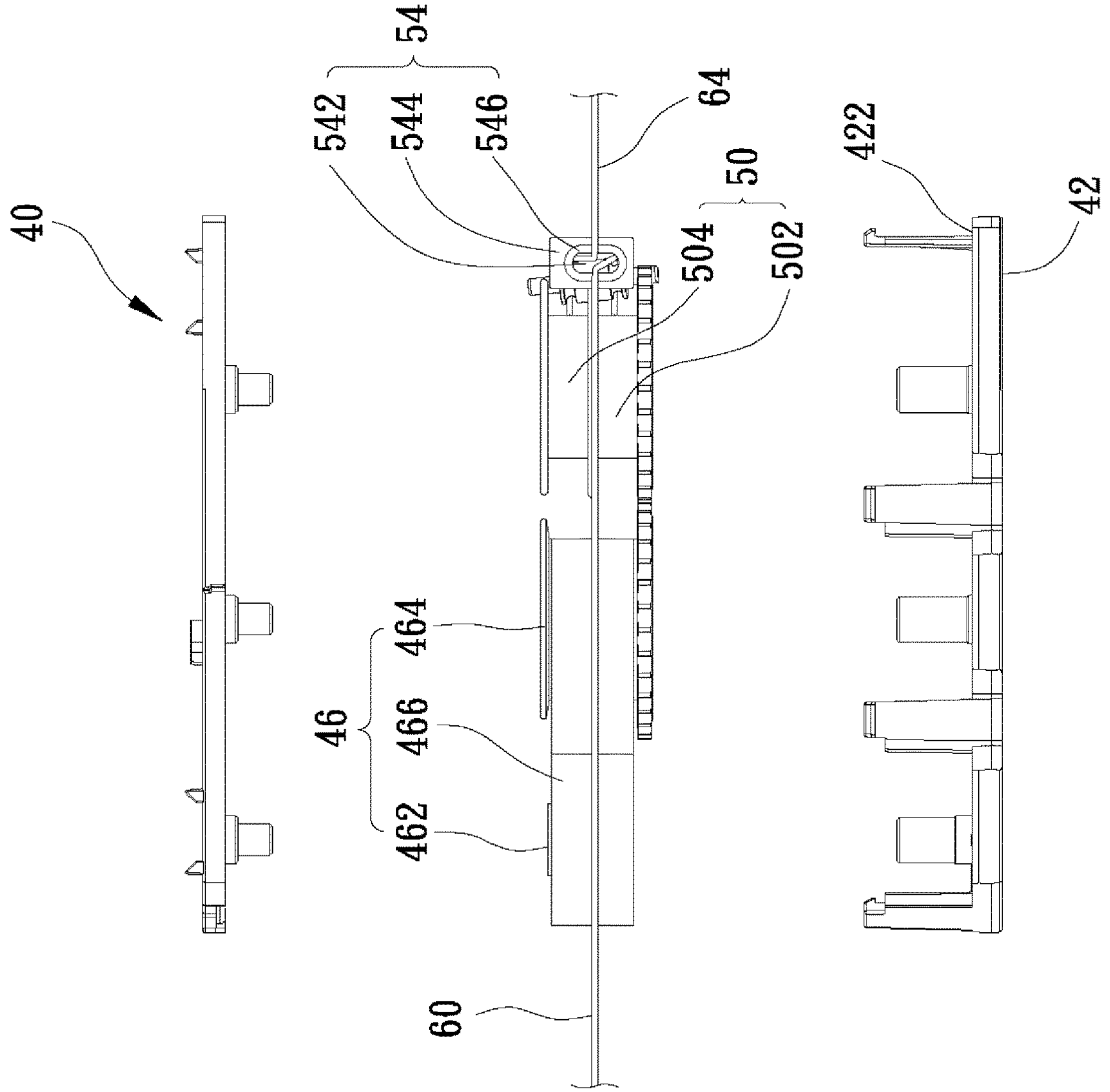
FIG. 5 is an exploded front side view of the cord-retracting device in FIG. 4.
Figure 6:
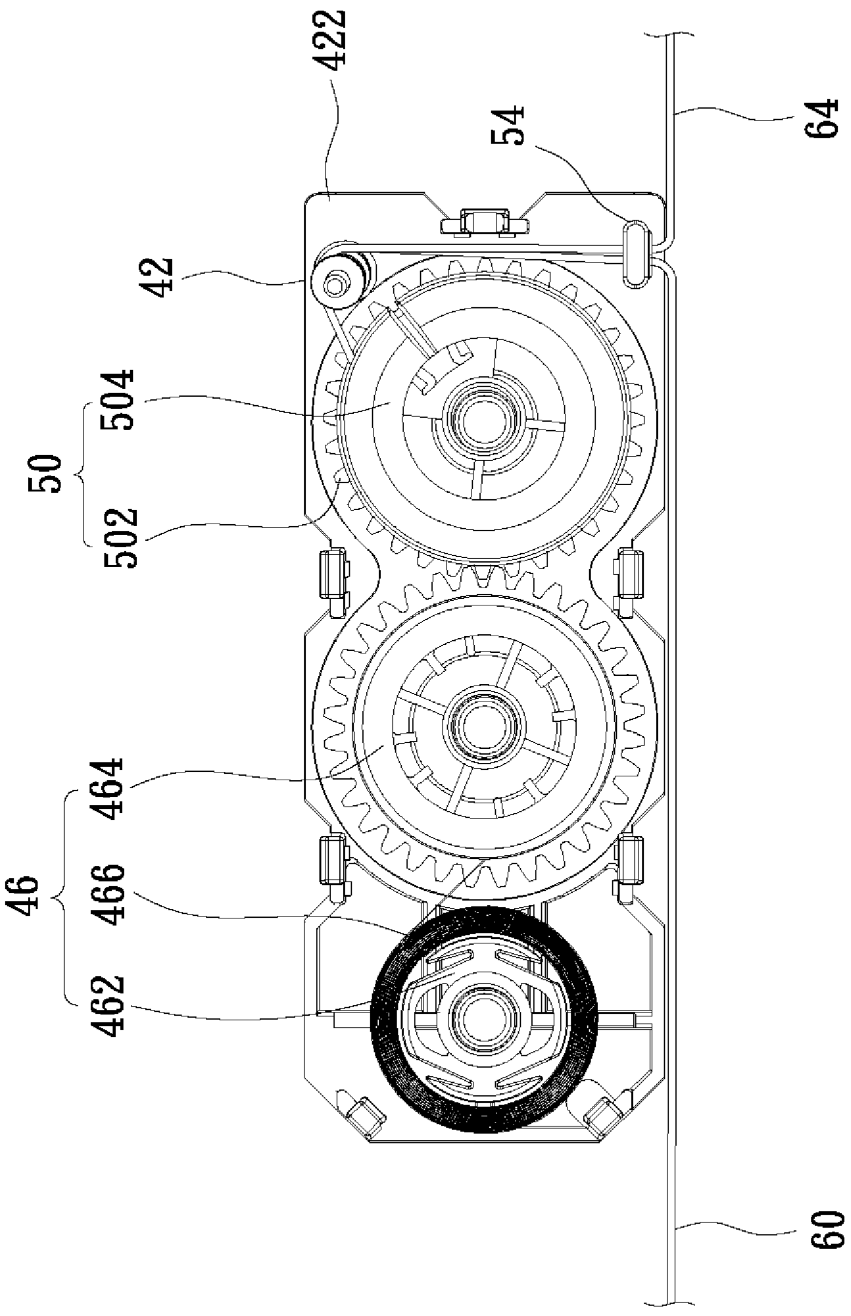
FIG. 6 is a top view of the cord-retracting device in FIG. 4, in which the second casing is omitted.

The reeling assembly 50 and the power assembly 46 are disposed adjacent to each other. The reeling assembly 50 comprises a first reeling wheel 502 and a second reeling wheel 504 which are rotatably disposed on the first casing 42. The first reeling wheel 502 and the second reeling wheel 504 are connected in a concurrently movable way. In the present embodiment, the first reeling wheel 502 and the second reeling wheel 504 are coaxially one stacked on the other vertically and interconnected in an integrally-formed manner. As shown in FIGS. 3 to 5, the first reeling wheel 502 has a gear engaged with the driving wheel 464, such that the driving wheel 464, the first reeling wheel 502 and the second reeling wheel 504 can rotate concurrently. In some other embodiments, the first reeling wheel and the second reeling wheel are interconnected as one adhered to or embedded into the other, which can also achieve the effect that the driving wheel, the first reeling wheel and the second reeling wheel are connected in the concurrently movable manner. In a further embodiment, the first reeling wheel and the second reeling wheel are not coaxially one stacked on the other. Instead, the first reeling wheel and the second reeling wheel are both rotatably disposed on the first inner surface of the first casing and disposed adjacent to each other. The first reeling wheel has a first gear engaged with the driving wheel, and the second reeling wheel has a second gear engaged with the first gear of the first reeling wheel, such that the driving wheel, the first reeling wheel and the second reeling wheel are connected in the concurrently movable manner. In addition, as shown in FIG. 4, in the present embodiment, there are plural posts protruding from the first inner surface 422 of the first casing 42. The driving wheel 464 as well as the first reeling wheel 502 and the second reeling wheel 504 which are coaxially stacked, are sleeved on the posts, respectively. As a result, the driving wheel 464 as well as the first reeling wheel 502 and the second reeling wheel 504 can rotate around the posts as axes and the relative positions between them are remained by the posts.

Referring to FIGS. 3 to 6 again, the adjusting member 54 is disposed on one side of the first inner surface 422 of the first casing 42 and adjacent to the reeling assembly 50, in which the above-mentioned side of the first inner surface 422 corresponds to one of the two longer edges of the first inner surface 422. The adjusting member 54 comprises a post body 544 and a through hole 542 thereon. In the present embodiment, the adjusting member 54 is disposed adjacent to one of the two longer edges of the first inner surface 422, as the through hole 542 penetrates through the post body 544 in a direction roughly along the shorter edges of the first inner surface 422. The through hole 542 is provided to be passed through by the first pulling cord 60 and the second pulling cord 64.

Figure 7:
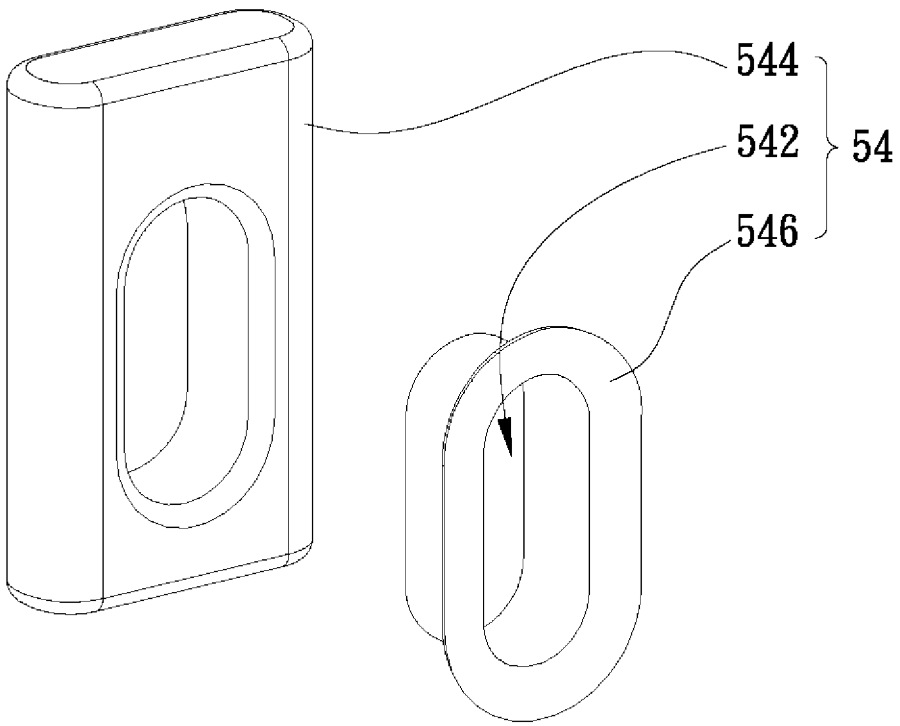
FIG. 7 is an exploded perspective view of the adjusting member in FIG. 4.

The material of the post body 544 can be plastic, metal, compound metal or a combination of the above-mentioned materials. Once the post body 544 is made of less wear-resistant plastics, such as polypropylene, the adjusting member 54 may further comprises an annular member 546 corresponding to the through hole 542 in shape for avoiding the first pulling cord 60 and the second pulling cord 64 which are passing through the through hole 542 from being worn down by friction with the edges of the through hole 542. As shown in FIG. 5 and FIG. 7, the annular member 546 is disposed on the through hole 542, and the material of the annular member 546 can be chosen as materials with wear-resistant characteristics, such as metals or PTFE (i.e., Polytetrafluoroethylene), for reducing wear between the first pulling cord 60, the second pulling cord 64 and the hole wall of the through hole 542, thereby prolonging lifespans of the first pulling cord 60, the second pulling cord 64 and the adjusting member 54. In some other embodiments, the post body is directly made of a material with wear-resistant characteristics, such as metals or PTFE (i.e., Polytetrafluoroethylene), and the configuration of the annular member can be omitted since the post body itself would not be easily worn down.

Please refer to FIGS. 1 to 6, which illustrate the configuration of the first pulling cord 60 and the second pulling cord 64. A first end of the first pulling cord 60 and a first end of the second pulling cord 64 are located within the first rail 10 and connected to the first reeling wheel 502 and the second reeling wheel 504 of the cord-retracting device 40, respectively. Meanwhile, a second end of the first pulling cord 60 extends to the left and reaches the first fixed seat 12 after passing through the through hole 542 of the adjusting member 54, and then passes out from the first rail 10. A second end of the second pulling cord 64 extends to the right and reaches the second fixed seat 14 after passing through the through hole 542 of the adjusting member 54, and then passes out from the first rail 10. The parts of the first pulling cord 60 and the second pulling cord 64 outside the first rail 10 respectively thread through the slats of the covering body 20 and are connected to the second rail 30. Since the first pulling cord 60 and the second pulling cord 64 extend in opposite directions after passing through the through hole 542 of the adjusting member 54, the first pulling cord 60 and the second pulling cord 64 apply a first force and a second force in opposite directions to the adjusting member 54, respectively.

In some other embodiments, the adjusting member is a post body without any through hole thereon (not shown). Since the adjusting member does not have a through hole provided for the first pulling cord and the second pulling cord to pass therethrough, the second end of the first pulling cord goes around an outer edge on one side of the post body of the adjusting member, extending to the left and reaching the first fixed seat, then passing out from the first rail, while the first end of the first pulling cord is connected to the first reeling wheel. Similarly, the second end of the second pulling cord goes around an outer edge on the other side of the post body of the adjusting member, extending to the right and reaching the second fixed seat, then passing out from the first rail, while the first end of the second pulling cord is connected to the second reeling wheel. Since the first pulling cord and the second pulling cord extend in opposite directions after going around the two sides of the post body of the adjusting member, the first pulling cord and the second pulling cord apply a first force and a second force in opposite directions to the adjusting member, respectively.

Please refer to FIGS. 8 to 12, which illustrate acting relationship among the components while the covering body 20 of the cordless window covering 1 is extended or retracted.

When the covering body 20 of the cordless window covering 1 is fully extended, as shown in FIG. 1 and FIG. 2, the second rail 30 is moved to a farthest position from the first rail 10, and the majority of the spring 466 is released from the spring storage wheel 462 and wound onto the driving wheel 464. As the spring 466 is coiled around the driving wheel 464, the spring 466 accumulates energy that would make the spring 466 rewound onto the spring storage wheel 462. At this moment, the first pulling cord 60 is almost fully released from the first reeling wheel 502, and the second pulling cord 64 is almost fully released from the second reeling wheel 504.

Figure 8:
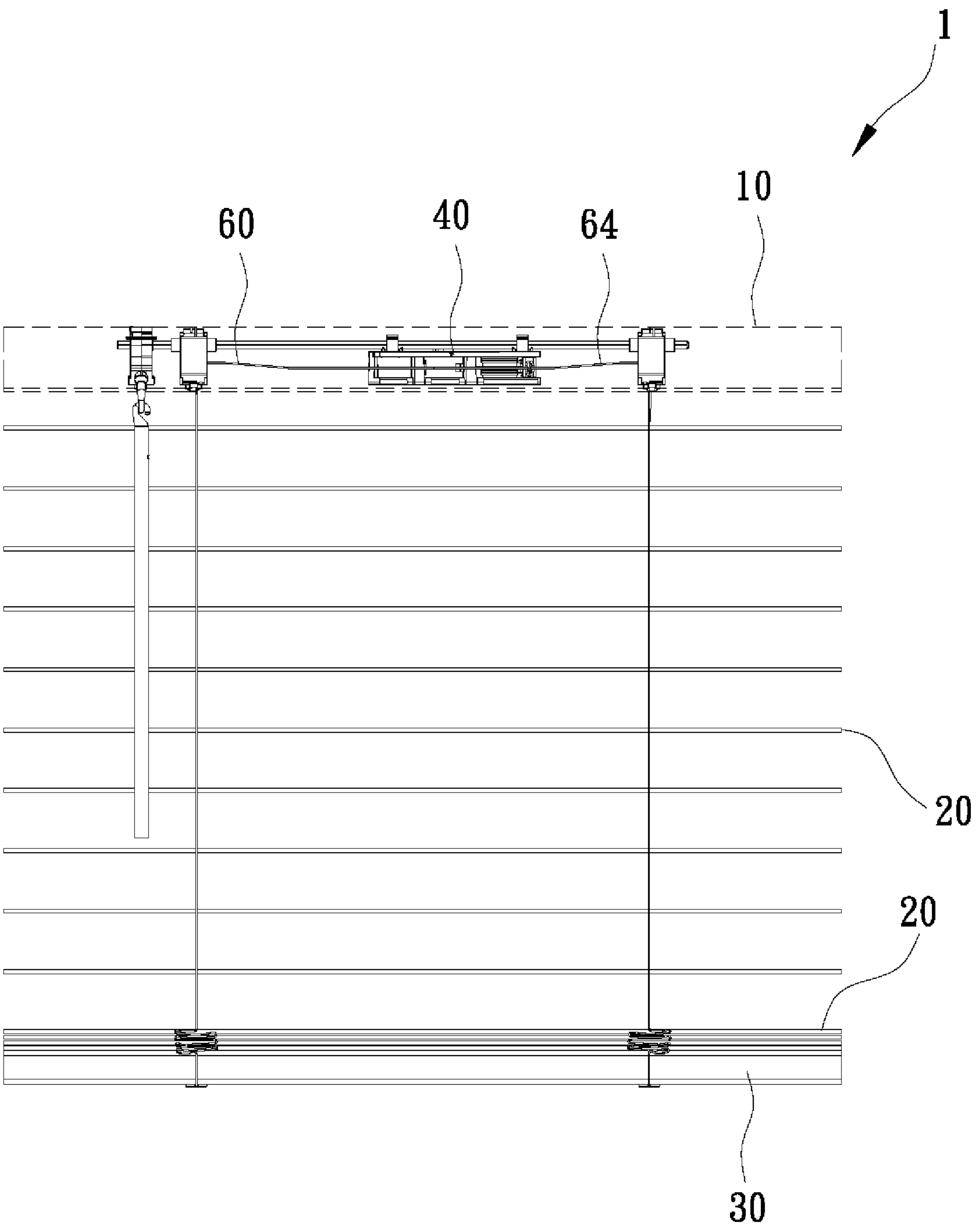
FIG. 8 is a front view of the cordless window covering according to the first embodiment of the present disclosure, in which the covering body is in a partial-retracted state.

In order to gradually retract the covering body 20 of the cordless window covering 1 from a fully extended state shown in FIG. 1 and FIG. 2 to a partial-retracted state shown in FIG. 8, the user can apply a force to the second rail 30 by hands or by a tool (e.g., a pushing or dragging rod) to make the second rail 30 move upwardly. During the upward movement of the second rail 30, the spring 466 releases energy and is rewound onto the spring storage wheel 462. In the process of rewind of the spring 466, the driving wheel 464 is driven to rotate, and the rotation of the driving wheel 464 drives the first reeling wheel 502 and the second reeling wheel 504 to rotate for pulling back the first pulling cord 60 and the second pulling cord 64, which are loosen because of the upward movement of the second rail 30.

During the upward movement of the second rail 30, the second rail 30 may be slanted as higher on the left side and lower on the right side, or alternatively, lower on the left side and higher on the right side, because the second rail 30 is moved too fast by the user or the force applied by the user to the second rail 30 is uneven. This results in variations in the stacking uniformity of the first pulling cord 60 and the second pulling cord 64 which are respectively rolled up on the first reeling wheel 502 and the second reeling wheel 504. For example, when each of the pulling cords is wound on the corresponding reeling wheel, it may not be stacked in order and not neatly arranged. Another possible situation is that when the pulling cords are wound on the reeling wheels for the same number of rotations, the pulling cord with higher tension will be collected with a shorter length, due to different tensions in each pulling cord. In both cases, the first pulling cord 60 and the second pulling cord 64 are collected with different lengths after the second rail 30 is raised, at which point if the user stops applying the upward pushing force to the second rail 30 and lets the second rail 30 suspended naturally, the second rail 30 would be slanted and in a non-horizontal state.

Figure 9:
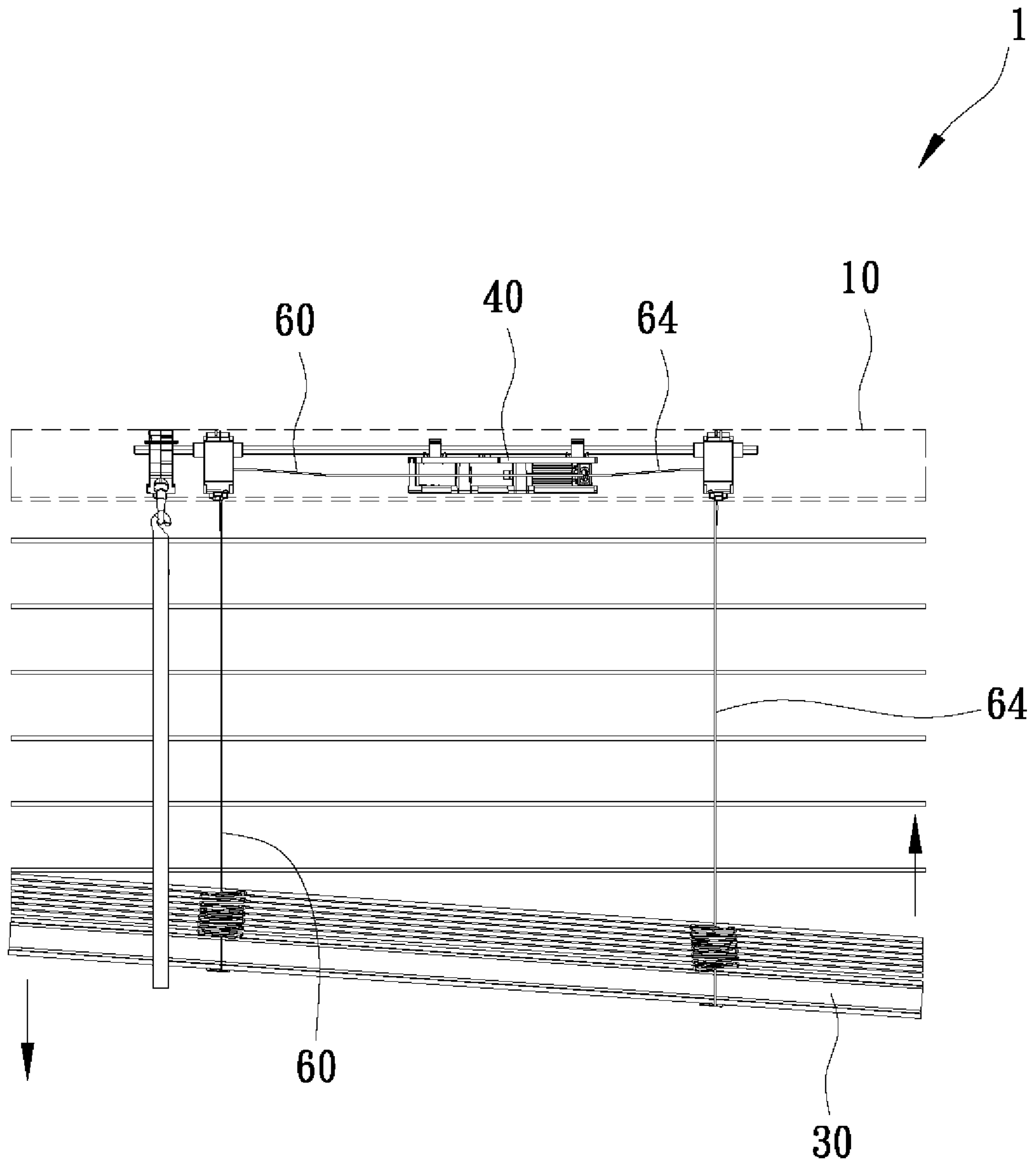
FIG. 9 schematically shows the second rail of the cordless window covering in the partial-retracted state, as the second rail is in a non-horizontal state as being higher on the left side and lower on the right side.
Figure 10:
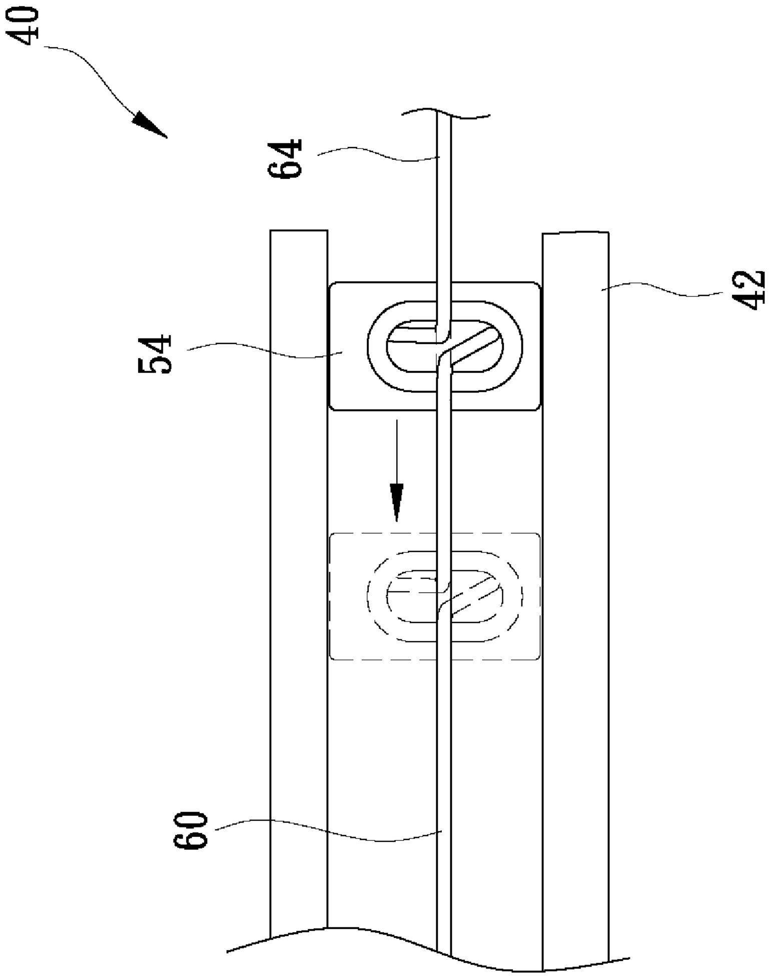
FIG. 10 schematically shows the action of the adjusting member during levelness adjustment of the cordless window covering in FIG. 9.

Please refer to FIGS. 5, 9 and 10 together, in which the second rail 30 in a slanted state as being higher on the left side and lower on the right side is taken for example. For adjusting the levelness of the second rail 30, the user only has to exert a small force on the second rail 30, slightly pulling down the left side of the second rail 30 or slightly pushing up the right side of the second rail 30, making the first force applied by the first pulling cord 60 to the adjusting member 54 greater than the second force applied by the second pulling cord 64 to the adjusting member 54. Because the force exerted by the user is extremely small, the first force and the second force are merely sufficient for triggering the slide movement of the adjusting member 54 and not able to release the first pulling cord 60 and the second pulling cord 64 from the first reeling wheel 502 and the second reeling wheel 504. When the first force is greater than the second force, the adjusting member 54 moves with respect to the first casing 42 towards where the first pulling cord 60 extends from, i.e., the adjusting member 54 moves to the left side. As a result, a length of the first pulling cord 60 and a length of the second pulling cord 64 which are located between the first rail 10 and the second rail 30 respectively increases and decreases along with the movement of the adjusting member 54 until the second rail 30 is in a horizontal state.

Figure 11:
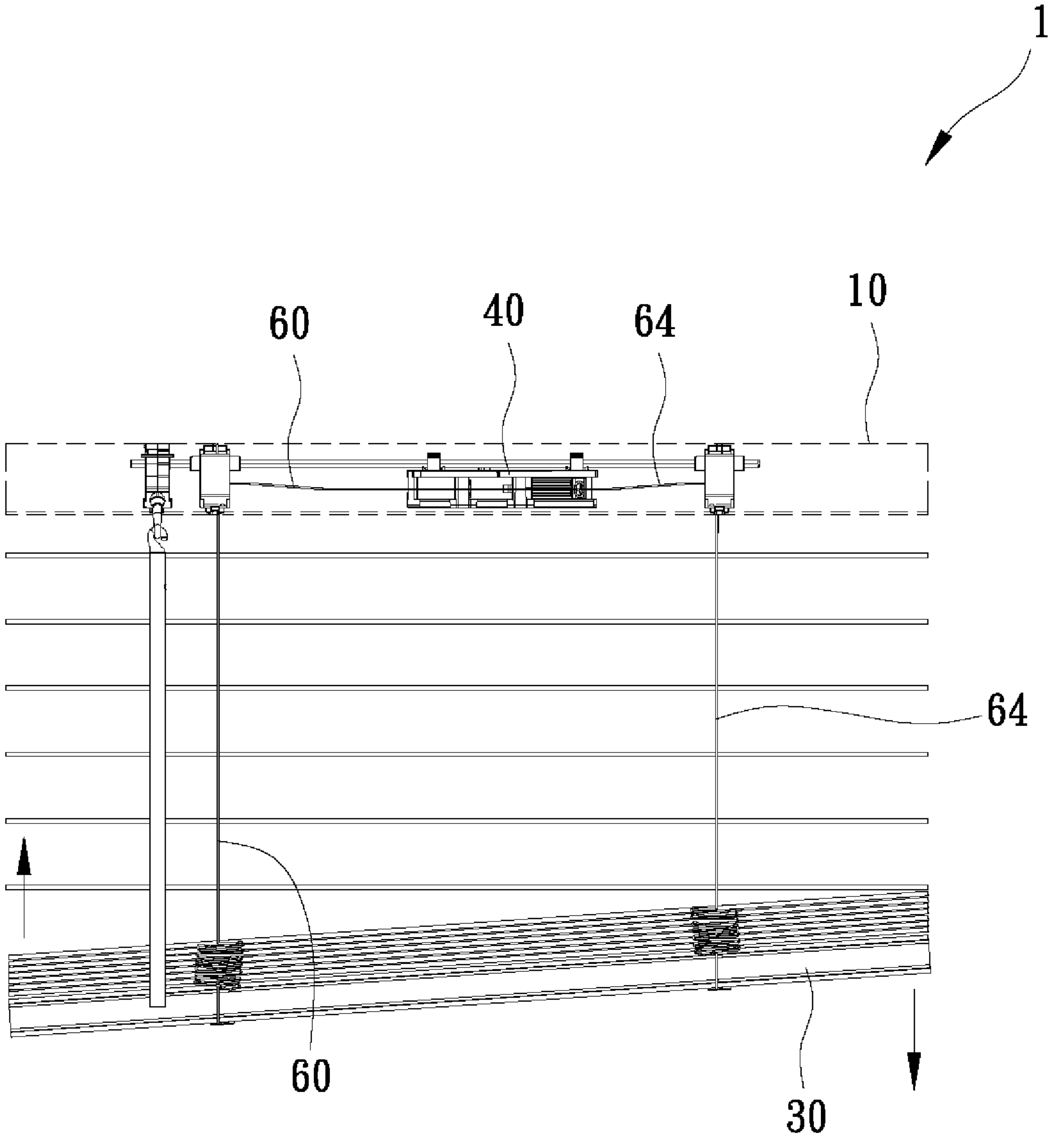
FIG. 11 schematically shows the second rail of the cordless window covering in the partial-retracted state, as the second rail is in a non-horizontal state as being lower on the left side and higher on the right side.
Figure 12:
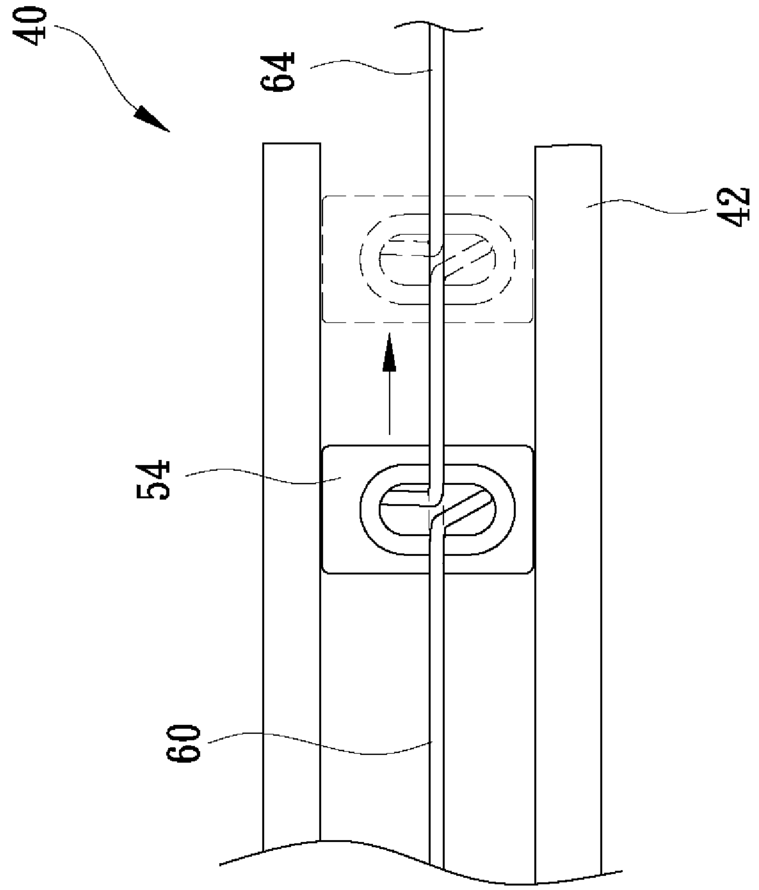
FIG. 12 schematically shows the action of the adjusting member during levelness adjustment of the cordless window covering in FIG. 11.

In a similar manner, please refer to FIGS. 5, 11 and 12 together, in which the second rail 30 in a state as being lower on the left side and higher on the right side is taken for example. For adjusting the levelness of the second rail 30, the user only has to exert a small force on the second rail 30, slightly pushing up the left side of the second rail 30 or slightly pulling down the right side of the second rail 30, making the first force applied by the first pulling cord 60 to the adjusting member 54 smaller than the second force applied by the second pulling cord 64 to the adjusting member 54. Because the force exerted by the user is extremely small, the first force and the second force are merely sufficient for triggering the slide movement of the adjusting member 54 and not able to release the first pulling cord 60 and the second pulling cord 64 from the first reeling wheel 502 and the second reeling wheel 504. When the first force is smaller than the second force, the adjusting member 54 moves with respect to the first casing 42 towards where the second pulling cord 60 extends from, i.e., the adjusting member 54 moves to the right side. As a result, a length of the first pulling cord 60 and a length of the second pulling cord 64 which are located between the first rail 10 and the second rail 30 respectively decreases and increases along with the movement of the adjusting member 54 until the second rail 30 is in a horizontal state.

As seen from the above, when the second rail of the cordless window covering of the present disclosure is slightly slanted, the user does not have to drag down the second rail largely to make the pulling cords unwound from the reeling wheels, and then repeatedly push up the second rail to adjust the levelness of the second rail. On the contrary, according to the present disclosure, by collaboration of the adjusting member, the first pulling cord and the second pulling cord, the lengths of the first pulling cord and the second pulling cord located between the first rail and the second rail can be changed by the movements of the adjusting member. Thus, the levelness of the second rail can be easily adjusted on the premise of not largely changing the height of the second rail, and aesthetic appeal and ease of operation of the cordless window covering are both achieved.

Please refer to FIGS. 13 to 26, in which a cordless window covering 1A according to a second embodiment of the present disclosure is shown.

Referring to FIGS. 13 to 26, the cordless window covering 1A according to the second embodiment comprises a first rail 10, a covering body 20, a second rail 30, a cord-retracting device 40A, a first pulling cord 60 and a second pulling cord 64. Overall, the structure and the configuration of the second embodiment is similar to that of the first embodiment. The first rail 10 is for being mounting on a window frame or the wall to suspend the covering body 20 and the second rail 30. The covering body 20 comprises plural slats parallel to each other. The second rail 30 is disposed below the lowest slat of the covering body 20. The cord-retracting device 40A is disposed inside the first rail 10 and located between the first fixed seat 12 and the second fixed seat 14.

Figure 13:
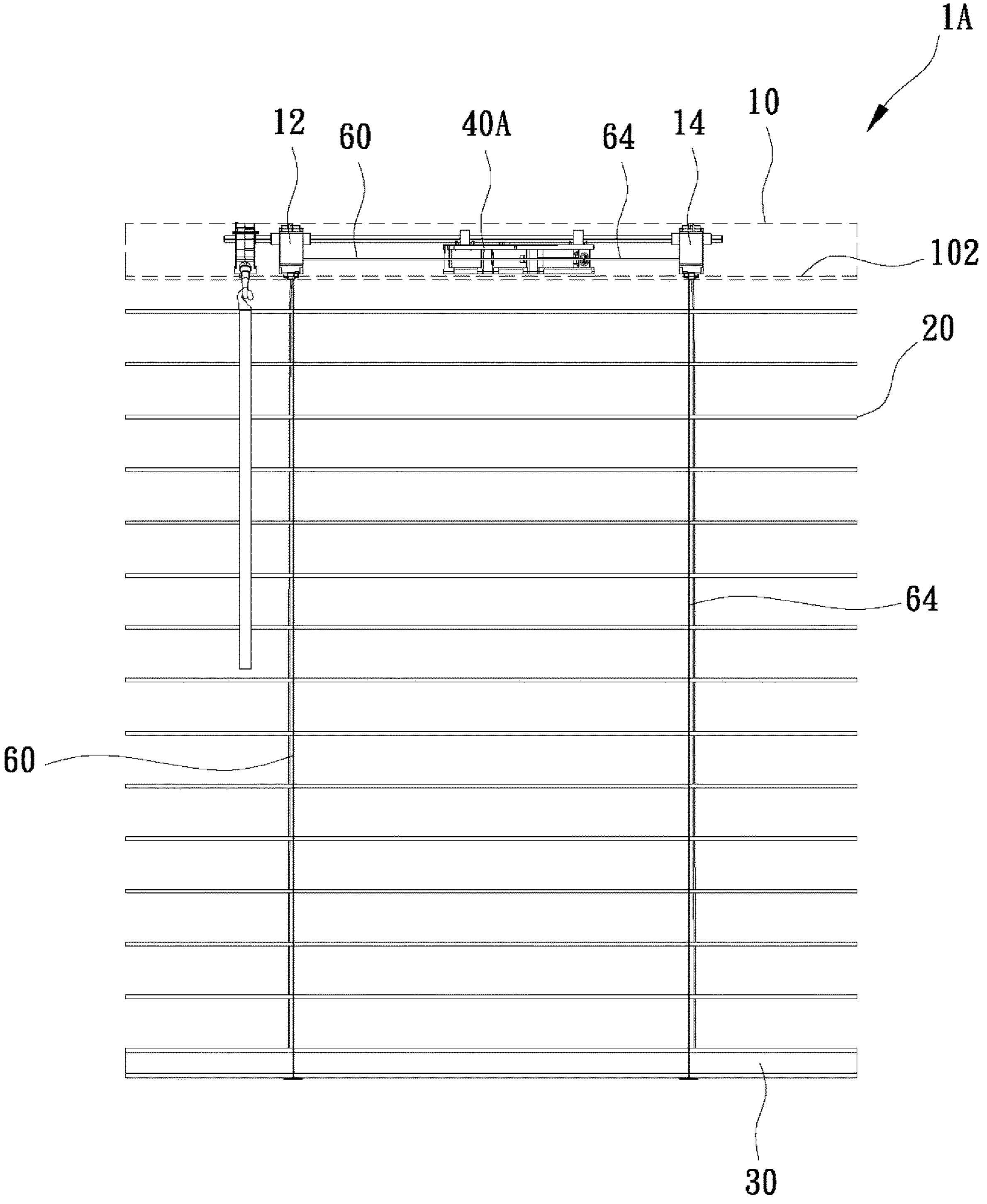
FIG. 13 a front view of the cordless window covering according to the second embodiment of the present disclosure, in which the covering body is fully extended.
Figure 14:
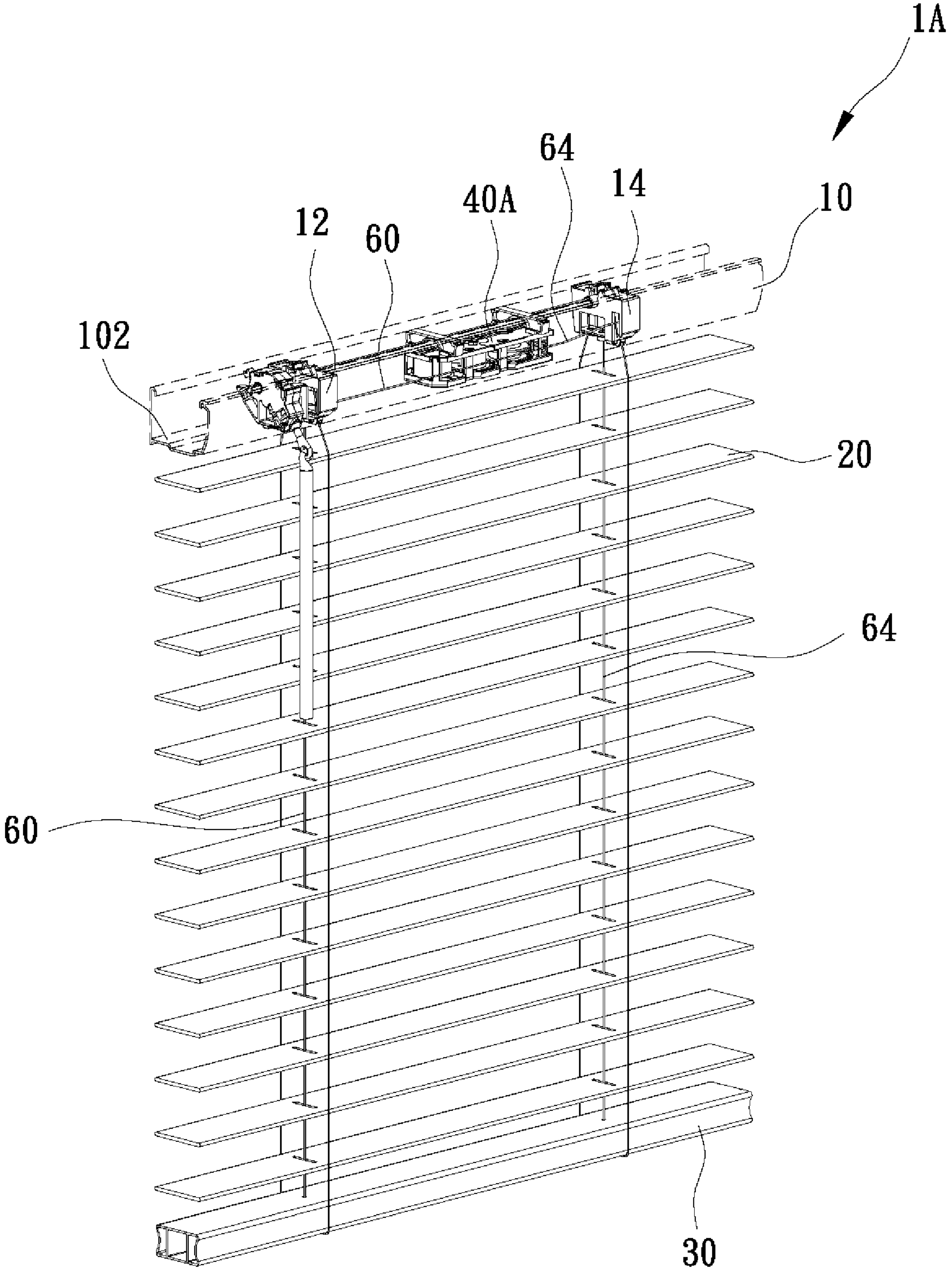
FIG. 14 is a perspective view of the cordless window covering in FIG. 13.
Figure 15:
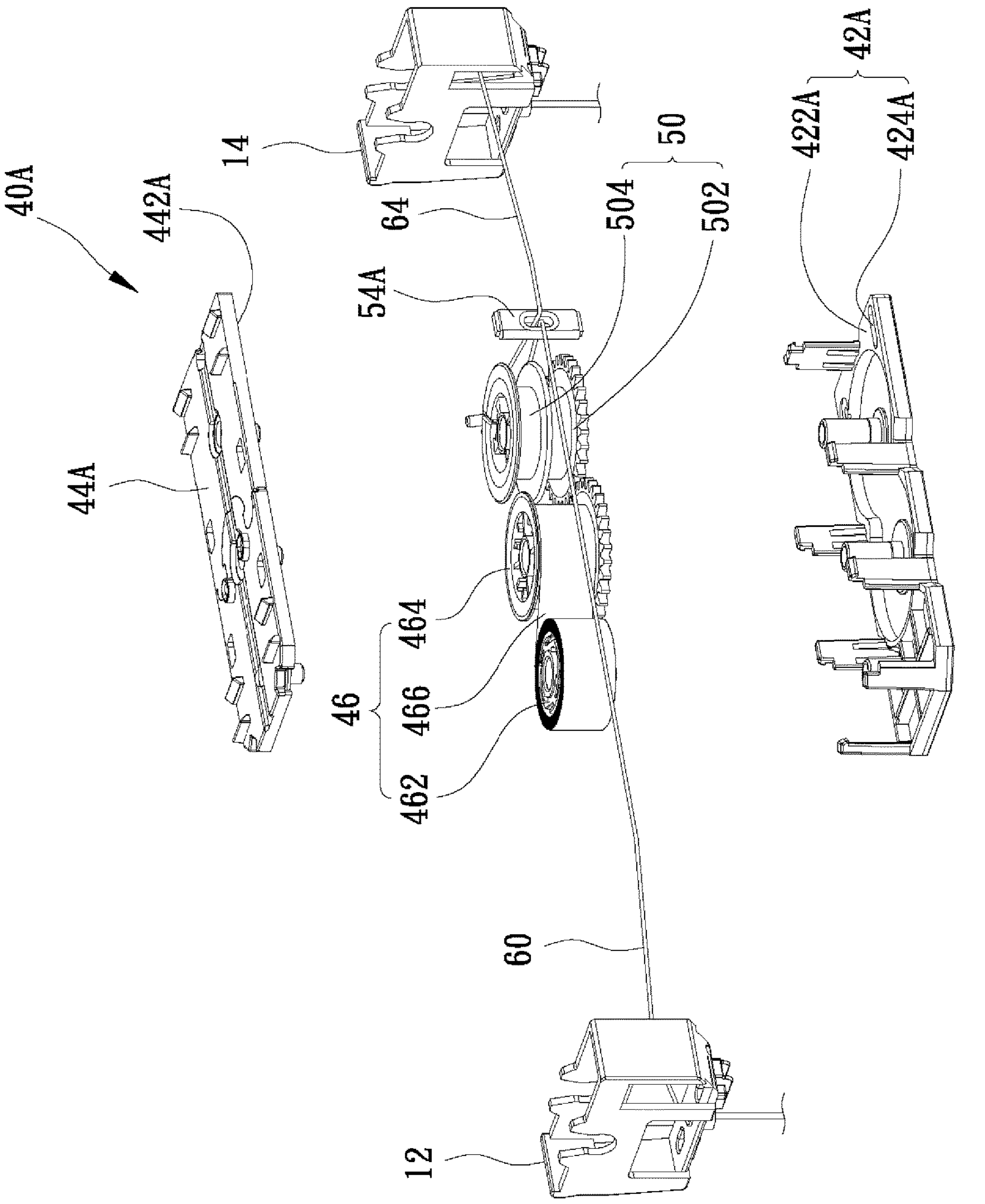
FIG. 15 is an exploded perspective view of the cord-retracting device in FIG. 13.
Figure 16:
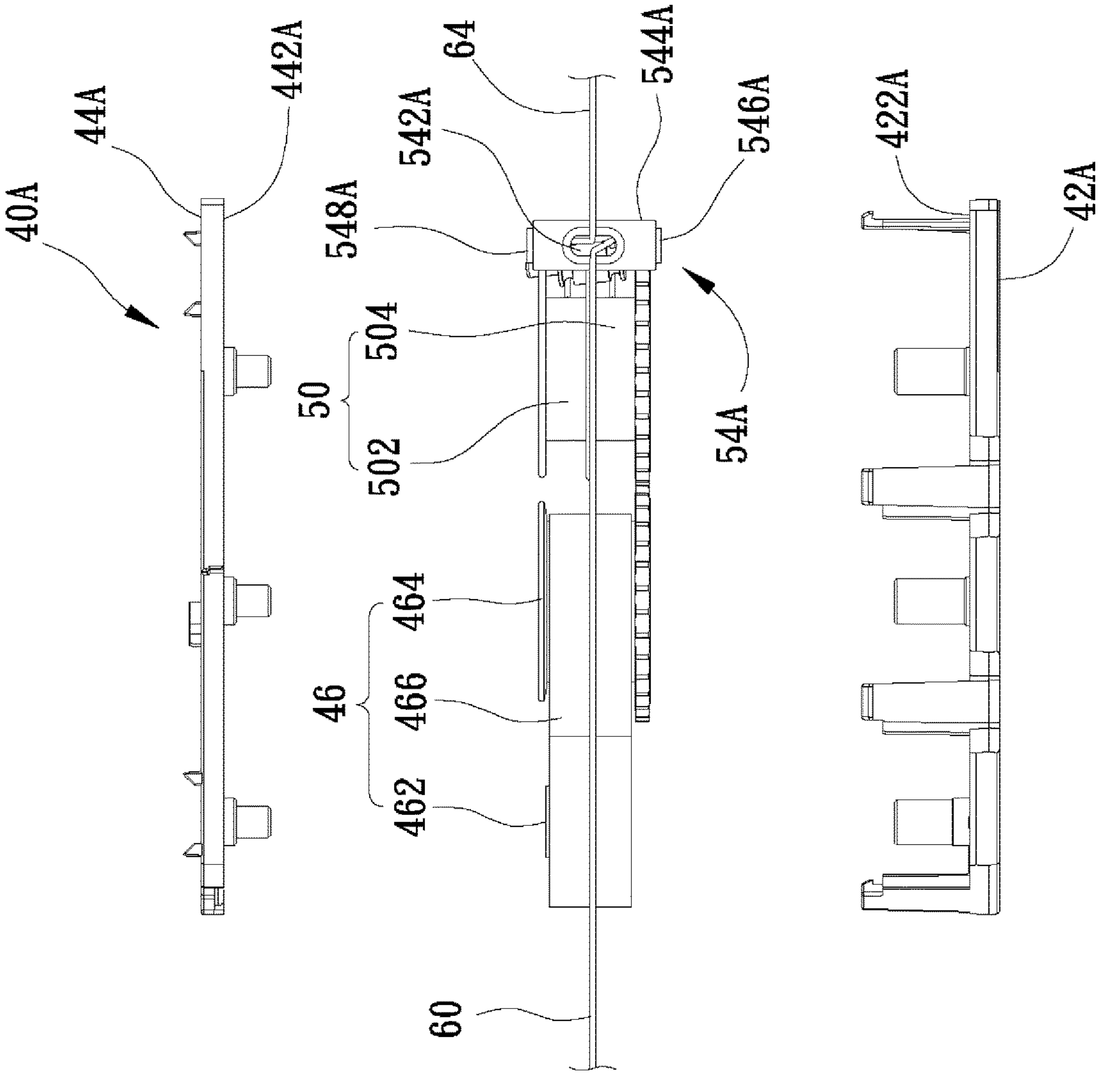
FIG. 16 is an exploded front view of the cord-retracting device in FIG. 13.

Please refer to FIGS. 15 to 16 together. The cord-retracting device 40A comprises a first casing 42A, a second casing 44A, a power assembly 46, a reeling assembly 50 and an adjusting member 54A. The first casing 42A is disposed on an inner bottom surface 102 of the first rail 10, as shown in FIGS. 13 and 14. The first casing 42A has a first inner surface 422A. The second casing 44A and the first casing 42A are opposing to each other and engaged with each other. The power assembly 46, the reeling assembly 50 and the adjusting member 54A are sandwiched between the first casing 42A and the second casing 44A to be positioned in a more stable manner. Please further refer to FIG. 18. The first casing 42A comprises a first guiding portion, which is a first groove 424A in this embodiment. The first groove 424A is concavely formed on the first inner surface 422A of the first casing 42A, and has a length L1 (shown in FIG. 18) oriented along the longer edge of the first casing 42A. The power assembly 46 comprises a spring storage wheel 462, a driving wheel 464 and a spring 466. The spring storage wheel 462 and the driving wheel 464 are rotatably disposed on the first inner surface 422A of the first casing 42A and are adjacent to each other. One end of the spring 466 is connected to the driving wheel 464, and the other end is connected to the spring storage wheel 462.

In the present embodiment, the spring storage wheel 462 is an idler wheel. As the driving wheel 464 rotates in different directions, the spring 466 is driven to be released from the spring storage wheel 462 and rolled up on the driving wheel 464, or released from the driving wheel 464 and rolled up on the spring storage wheel 462.

The reeling assembly 50 and the power assembly 46 are disposed adjacent to each other. The reeling assembly 50 comprises a first reeling wheel 502 and a second reeling wheel 504 connected in a concurrently rotatable manner. In the present embodiment, the first reeling wheel 502 and the second reeling wheel 504 are coaxial and stacked vertically, and are interconnected in an integrally-formed manner. The first reeling wheel 502 has a gear engaged with the driving wheel 464, such that the driving wheel 464, the first reeling wheel 502 and the second reeling wheel 504 can rotate concurrently. Moreover, as shown in FIG. 16, in the present embodiment, there are plural posts protruding from the first inner surface 422A of the first casing 42A. In the meantime, there are also plural posts protruding from a second inner surface 442A of the second casing 44A corresponding to the posts of the first casing 42A, and the posts are provided for the driving wheel 464, and the first reeling wheel 502 and the second reeling wheel 504 which are coaxially one stacked on the other to be sleeved thereon. As a result, the driving wheel 464, the first reeling wheel 502 and the second reeling wheel 504 can rotate around the posts as axes and the relative positions between them are remained by the posts.

Referring to FIGS. 15 to 18, the adjusting member 54A is disposed on the first inner surface 422A, and comprises a post body 544A, a through hole 542A on the post body 544A, and a first protrusion 546A (i.e., the first guided portion). The through hole 542A is provided for the first pulling cord 60 and the second pulling cord 64 to pass therethrough. The first protrusion 546A is inserted in the first groove 424A of the first casing 42A. The first protrusion 546A has a breadth W1 oriented along the longer edge of the first casing 42A, and the breadth W1 is smaller than the length L1 of the first groove 424A. Thus, the first protrusion 546A of the adjusting member 54A can be slide within the first groove 424A along the longer edge with a restricted range of motion. By collaboration of the first protrusion 546A and the first groove 424A, the sliding direction and sliding distance of the adjusting member 54A with respect to the first casing 42A are under control and the adjusting member 54A is prevented from unpredictable movements when being subjected to forces.

Figure 17:
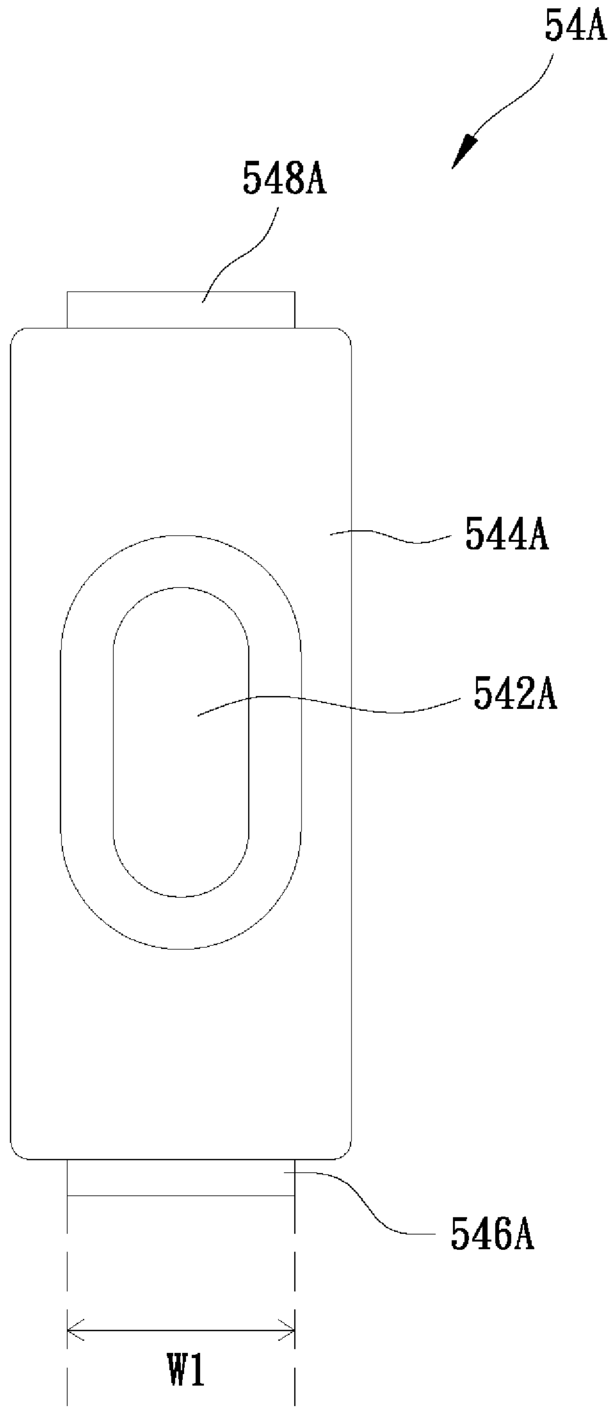
FIG. 17 is a front view of the adjusting member in FIG. 13.
Figure 18:
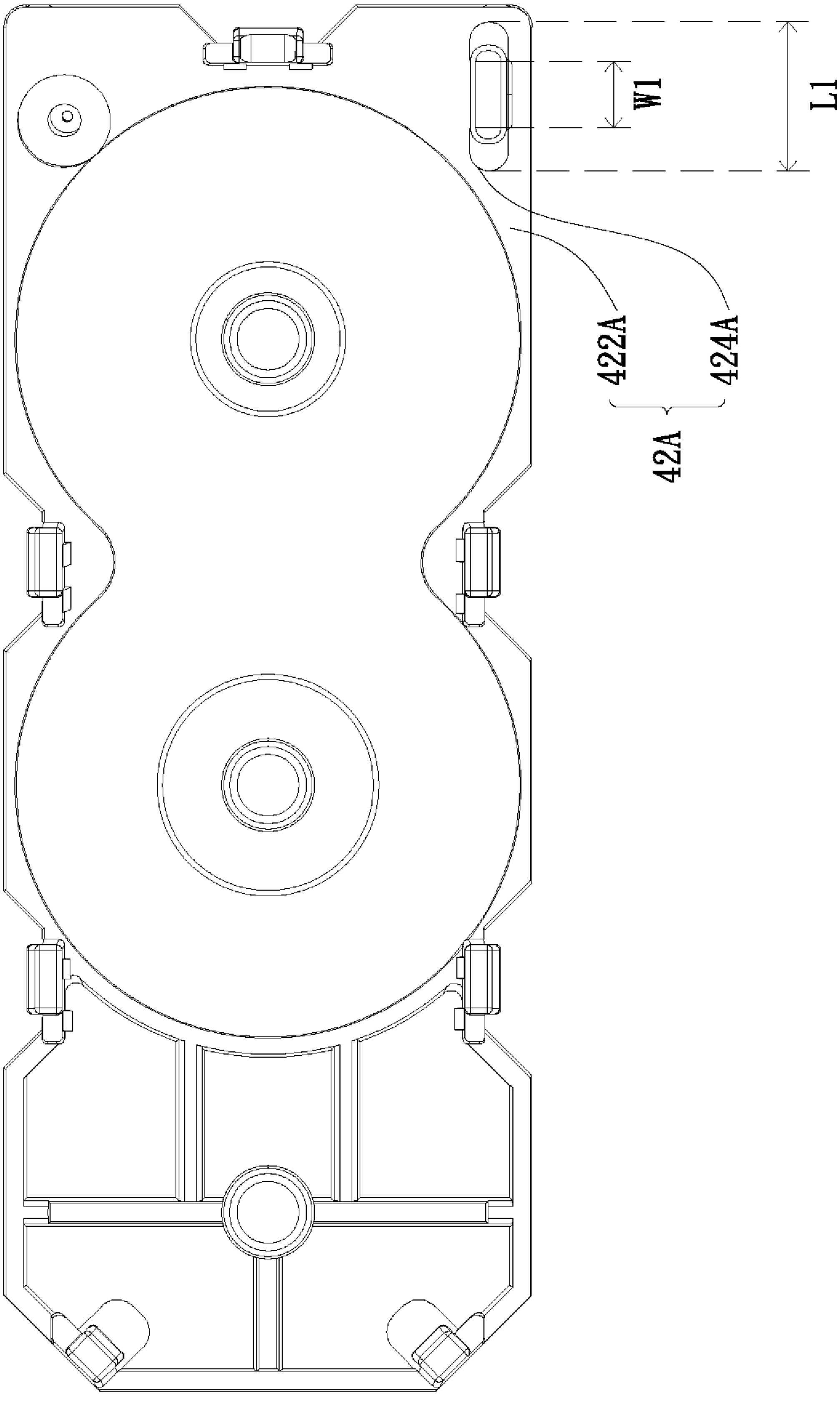
FIG. 18 is a top view of the first casing and the adjusting member of the cord-retracting device in FIG. 13.
Figure 19:
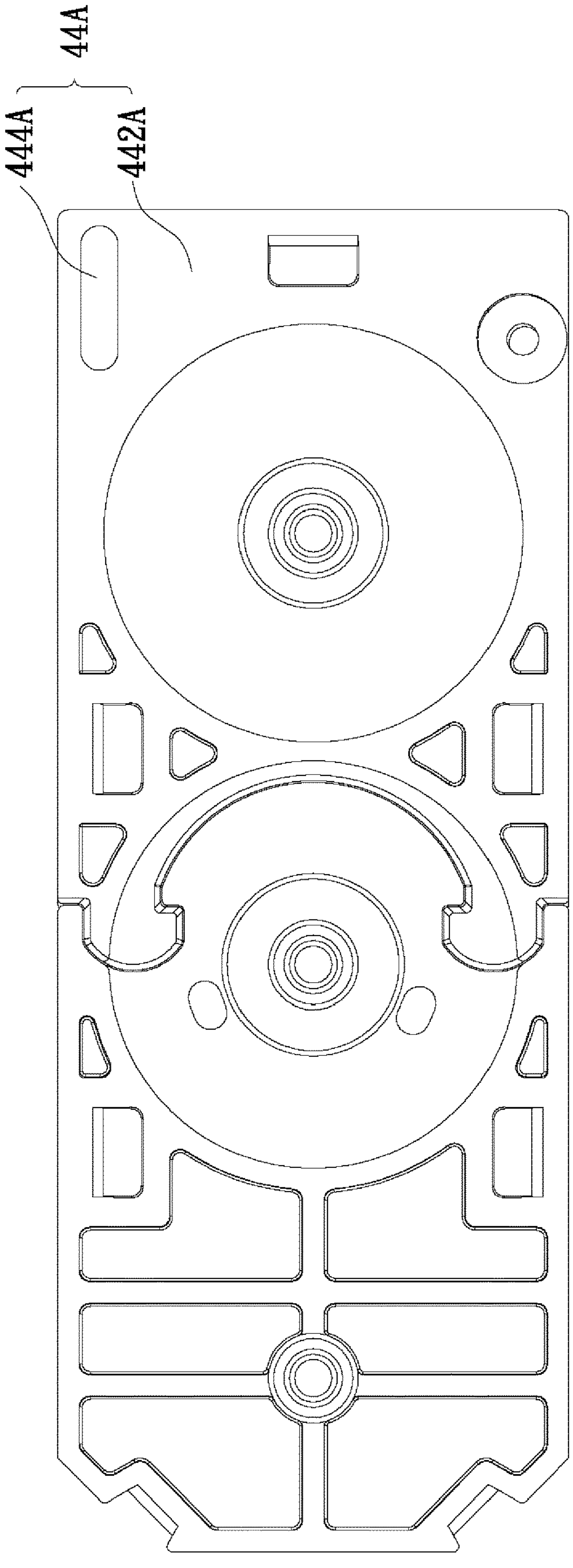
FIG. 19 is a bottom view of the second casing of the cord-retracting device in FIG. 13.

Please further refer to FIG. 19. In addition to the structure of the first protrusion 546A and the first groove 424A mentioned above, the second casing 44A also comprises a second guiding portion, which is a second groove 444A concavely formed in the upward direction on the second inner surface 442A of the second casing 44A. The position and the length of the second groove 444A correspond to that of the first groove 424A of the first casing 42A. As shown in FIG. 17, the adjusting member 54A further comprises a second guided portion, which is a second protrusion 548A for being inserted into the second groove 444A. The way that the second protrusion 548A collaborates with the second groove 444A is the same as that of the first protrusion 546A and the first groove 424A, in which the second protrusion 548A can be slide within the second groove 444A along the longer edge with a restricted range of motion.

Figure 25:
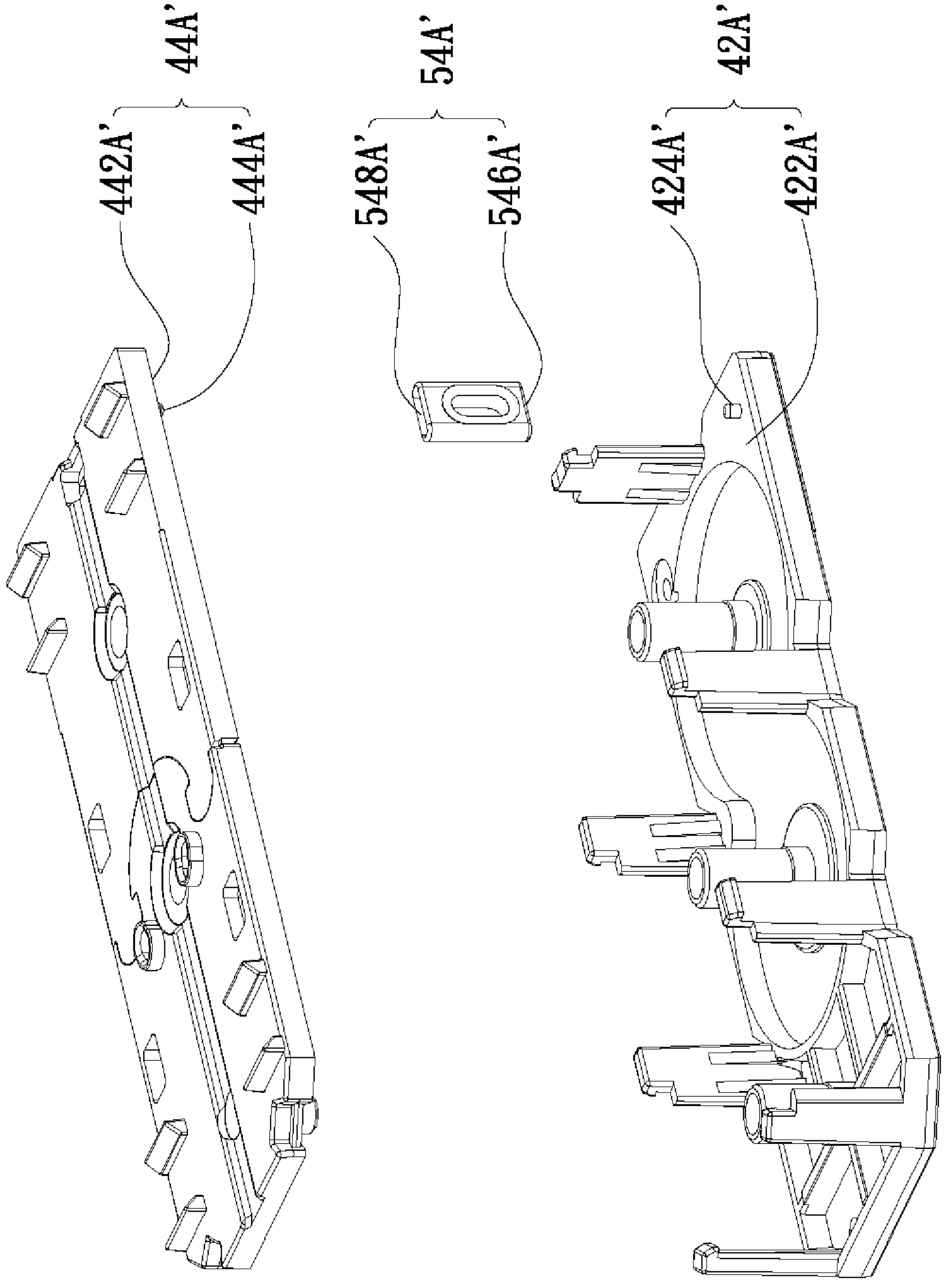
FIG. 25 is an exploded perspective view of another exemplified first casing, second casing and the adjusting member of the present disclosure.
Figure 26:
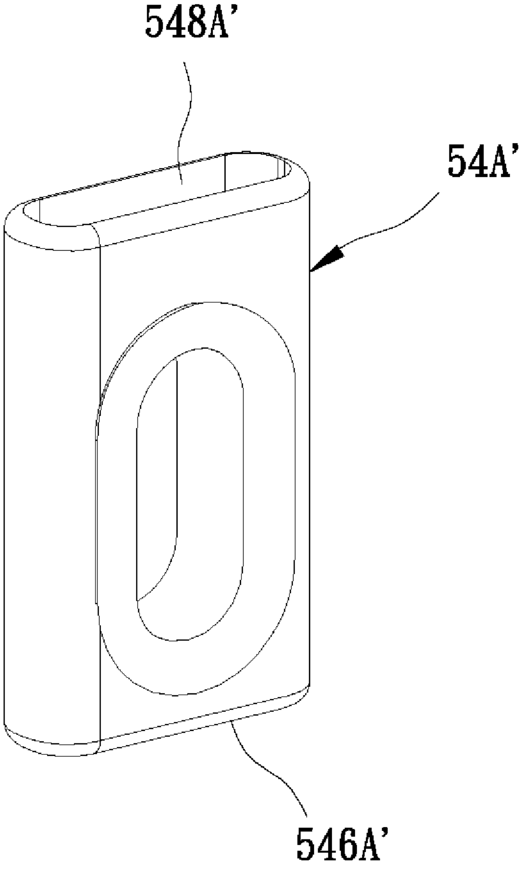
FIG. 26 is a perspective view of the adjusting member in FIG. 25.

In some other embodiments, the connection relationship between the first casing or the second casing and the adjustable seat can be configured in an opposite manner. Referring to FIGS. 25 and 26, a first protrusion 424A' (i.e., the first guiding portion) is formed on the first inner surface 442A' of the first casing 42A' and projects outwardly, while a second protrusion 444A' (i.e., the second guiding portion) is formed on the second inner surface 444A' of the second casing 44A' and projects outwardly. The adjusting member 54A' has a first groove 546A' (i.e., the first guided portion) and a second groove 548A' (i.e., the second guided portion) respectively formed on the bottom and the top thereof. The first protrusion 424A' and the second protrusion 444A' are received in the first groove 546A' and the second groove 548A', respectively, so that the sliding direction and sliding distance of the adjusting member 54A' with respect to the first casing 42A' and the second casing 44A' can be controlled.

Please refer to FIGS. 13 to 16, which illustrate the configuration of the first pulling cord 60 and the second pulling cord 64. A first end of the first pulling cord 60 and a first end of the second pulling cord 64 are located within the first rail 10 and connected to the first reeling wheel 502 and the second reeling wheel 504 of the cord-retracting device 40A, respectively. Meanwhile, a second end of the first pulling cord 60 extends to the left and reaches the first fixed seat 12 after passing through the through hole 542A of the adjusting member 54A, and then passes out from the first rail 10. A second end of the second pulling cord 64 extends to the right and reaches the second fixed seat 14 after passing through the through hole 542A of the adjusting member 54A, and then passes out from the first rail 10. The parts of the first pulling cord 60 and the second pulling cord 64 outside the first rail 10 respectively thread through the slats of the covering body 20 and are connected to the second rail 30. Since the first pulling cord 60 and the second pulling cord 64 extend in opposite directions after passing through the through hole 542A of the adjusting member 54A, the first pulling cord 60 and the second pulling cord 64 apply a first force and a second force in opposite directions to the adjusting member 54A, respectively.

Please refer to FIGS. 20 to 24, which illustrate acting relationship among the components while the covering body 20 of the cordless window covering 1A is extended or retracted.

When the covering body 20 of the cordless window covering 1A is fully extended, as shown in FIG. 13 and FIG. 14, the second rail 30 is moved to a farthest position from the first rail 10, and the majority of the spring 466 is released from the spring storage wheel 462 and wound onto the driving wheel 464. As the spring 466 is coiled around the driving wheel 464, the spring 466 accumulates energy that would make the spring 466 rewound onto the spring storage wheel 462. At this moment, the first pulling cord 60 is almost fully released from the first reeling wheel 502, and the second pulling cord 64 is almost fully released from the second reeling wheel 504.

Figure 20:
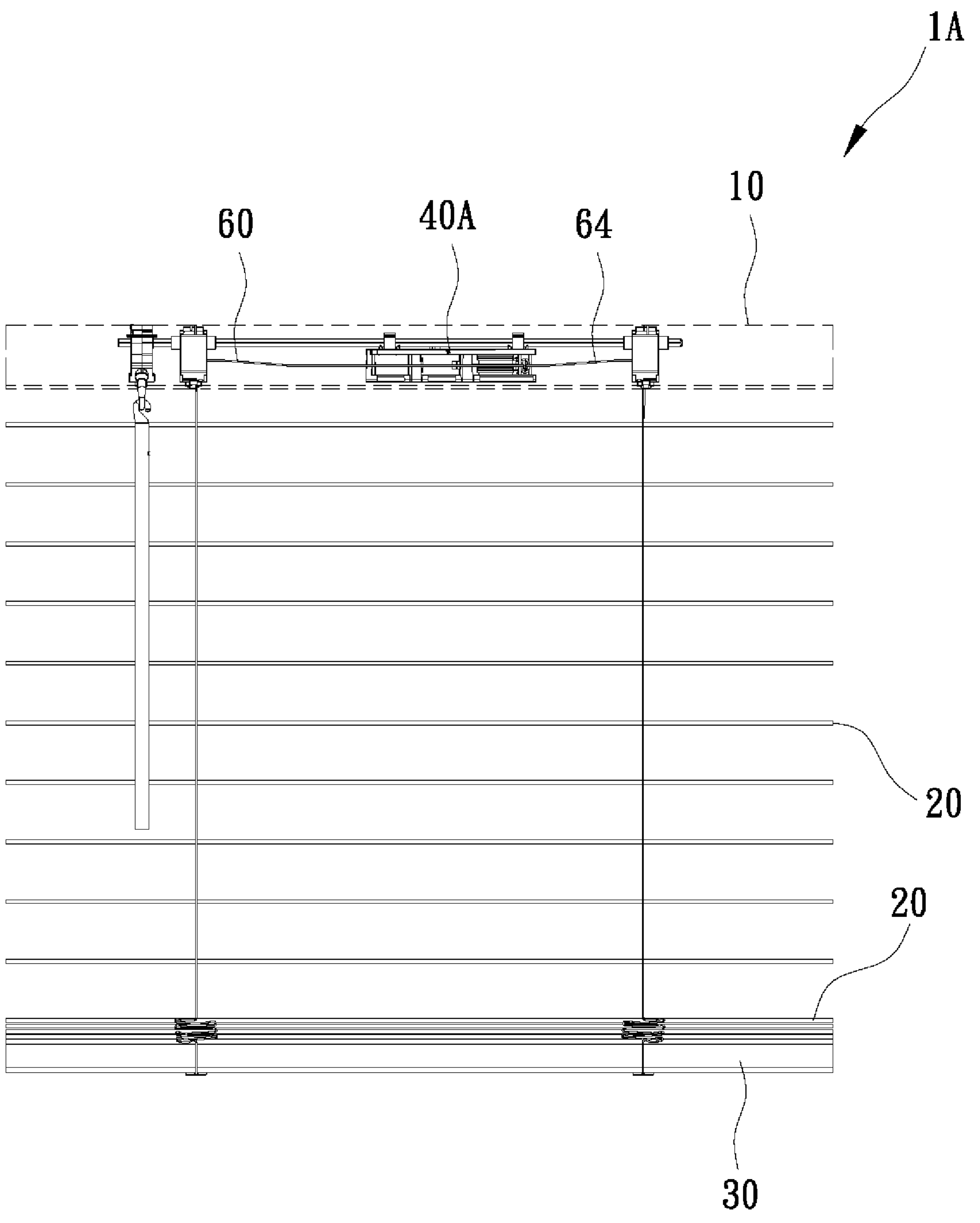
FIG. 20 is a front view of the cordless window covering according to the second embodiment of the present disclosure, in which the covering body is in a partial-retracted state.

In order to gradually retract the covering body 20 of the cordless window covering 1A from a fully extended state shown in FIG. 13 and FIG. 14 to a partial-retracted state shown in FIG. 20, the user can apply a force to the second rail 30 by hands or by a tool (e.g., a pushing or dragging rod) to make the second rail 30 move upwardly. During the upward movement of the second rail 30, the spring 466 releases energy and is rewound onto the spring storage wheel 462. In the process of rewind of the spring 466, the driving wheel 464 is driven to rotate, and the rotation of the driving wheel 464 drives the first reeling wheel 502 and the second reeling wheel 504 to rotate for pulling back the first pulling cord 60 and the second pulling cord 64, which are loosen because of the upward movement of the second rail 30.

During the upward movement of the second rail 30, the second rail 30 may be slanted as higher on the left side and lower on the right side, or alternatively, lower on the left side and higher on the right side, because the second rail 30 is moved too fast by the user or the force applied by the user to the second rail 30 is uneven. This results in variations in the stacking uniformity of the first pulling cord 60 and the second pulling cord 64 which are respectively rolled up on the first reeling wheel 502 and the second reeling wheel 504. For example, when each of the pulling cords is wound on the corresponding reeling wheel, it may not be stacked in order and not neatly arranged. Another possible situation is that when the pulling cords are wound on the reeling wheels for the same number of rotations, the pulling cord with higher tension will be collected with a shorter length, due to different tensions in each pulling cord. In both cases, the first pulling cord 60 and the second pulling cord 64 are collected with different lengths after the second rail 30 is raised, at which point if the user stops applying the upward pushing force to the second rail 30 and lets the second rail 30 suspended naturally, the second rail 30 would be slanted and in a non-horizontal state.

Figure 21:
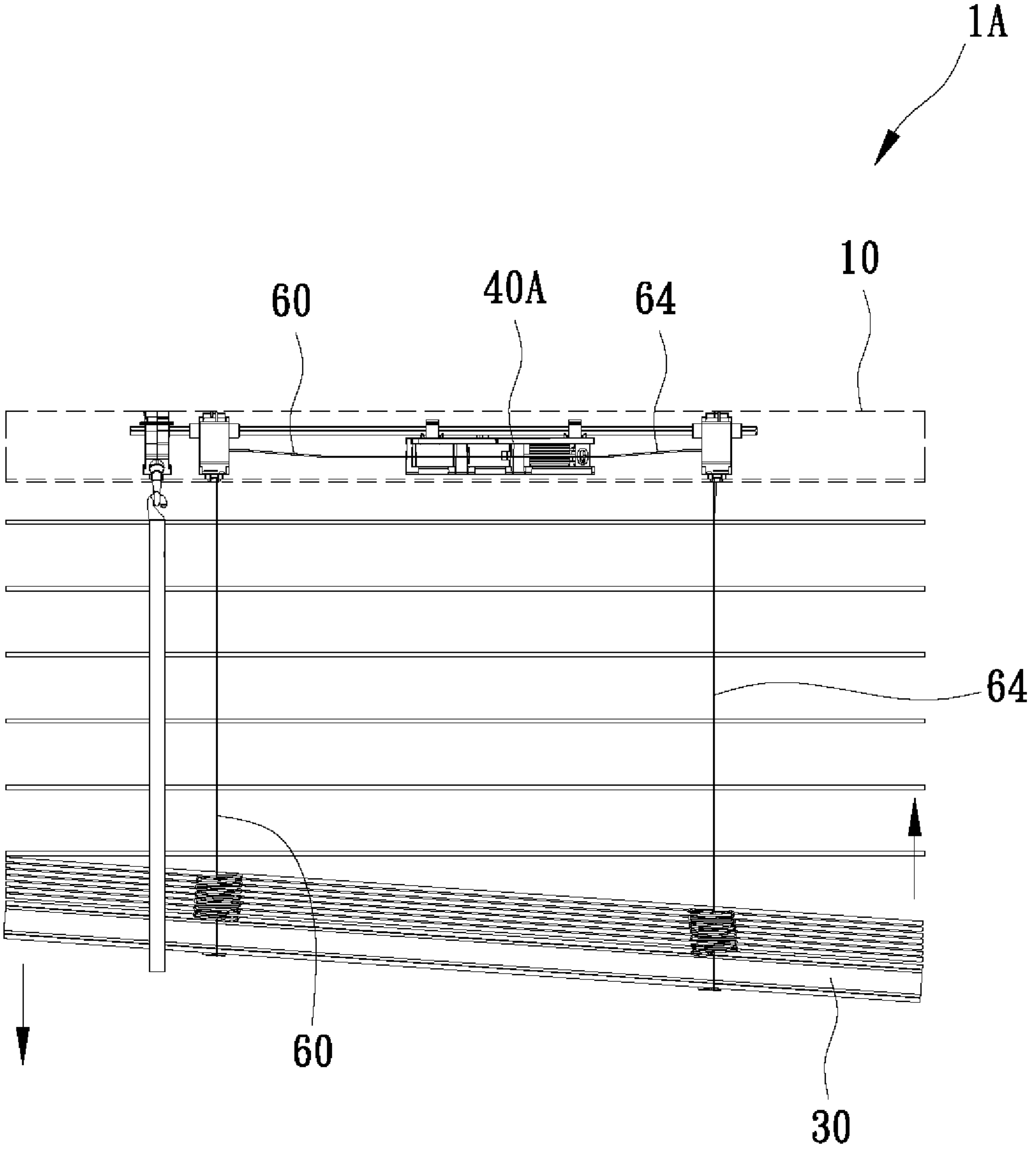
FIG. 21 schematically shows the second rail of the cordless window covering in the partial-retracted state, as the second rail is in a non-horizontal state as being higher on the left side and lower on the right side.
Figure 22:
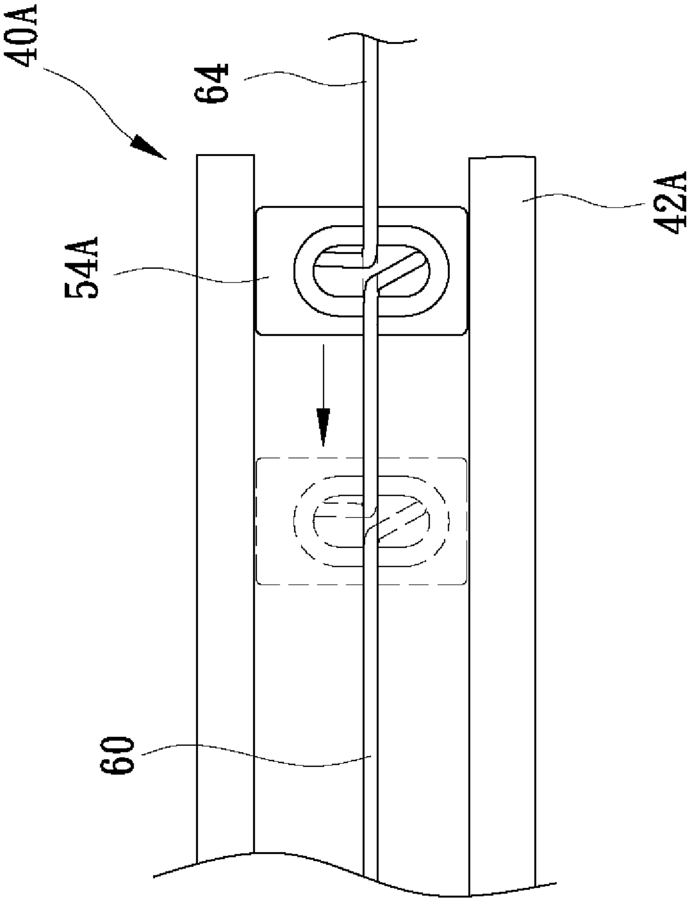
FIG. 22 schematically shows the action of the adjusting member during levelness adjustment of the cordless window covering in FIG. 21.

Please refer to FIGS. 16, 21 and 22 together, in which the second rail 30 in a slanted state as being higher on the left side and lower on the right side is taken for example. For adjusting the levelness of the second rail 30, the user only has to exert a small force on the second rail 30, by slightly pulling down the left side of the second rail 30 or slightly pushing up the right side of the second rail 30, to make the first force applied by the first pulling cord 60 to the adjusting member 54A greater than the second force applied by the second pulling cord 64 to the adjusting member 54A. Because the force exerted by the user is extremely small, the first force and the second force are merely sufficient for triggering the slide movement of the adjusting member 54A and not able to release the first pulling cord 60 and the second pulling cord 64 from the first reeling wheel 502 and the second reeling wheel 504. When the first force is greater than the second force, the adjusting member 54A moves with respect to the first casing 42 towards where the first pulling cord 60 extends from, i.e., the adjusting member 54A moves to the left side. As a result, a length of the first pulling cord 60 and a length of the second pulling cord 64 which are located between the first rail 10 and the second rail 30 respectively increases and decreases along with the movement of the adjusting member 54A until the second rail 30 is in a horizontal state.

Figure 23:
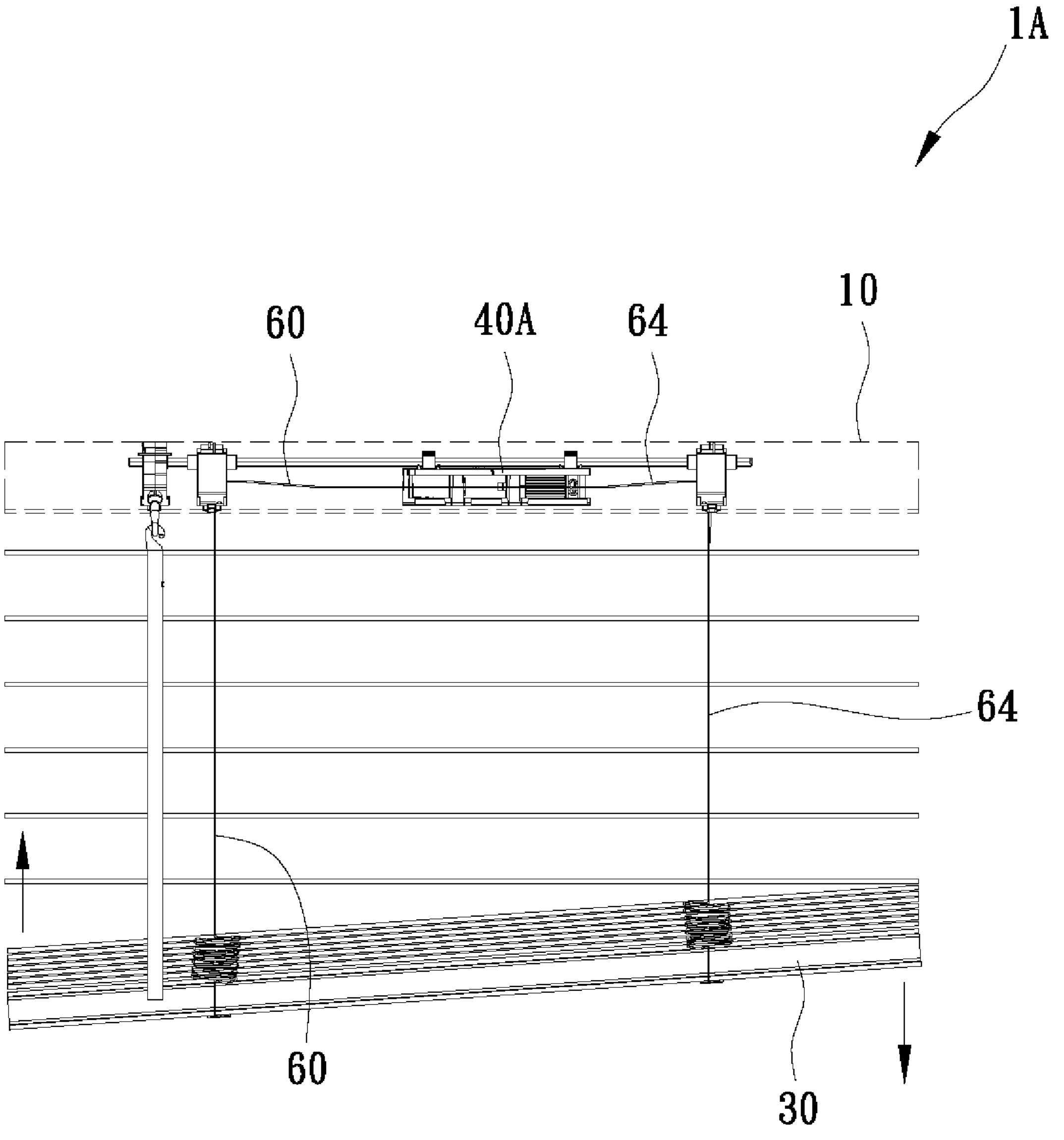
FIG. 23 schematically shows the second rail of the cordless window covering in the partial-retracted state, as the second rail is in a non-horizontal state as being lower on the left side and higher on the right side.
Figure 24:
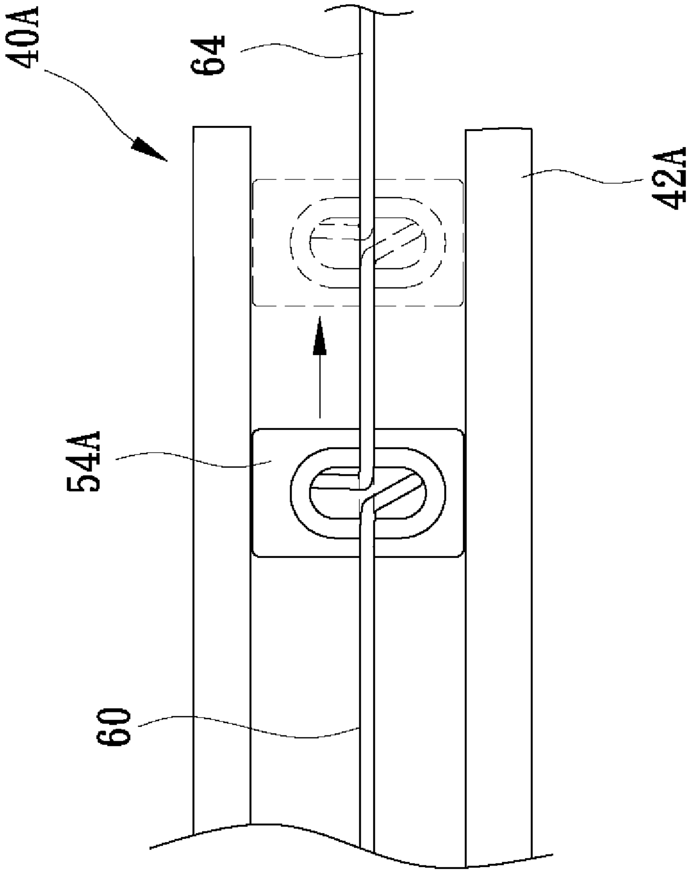
FIG. 24 schematically shows the action of the adjusting member during levelness adjustment of the cordless window covering in FIG. 23.

In a similar manner, please refer to FIGS. 16, 23 and 24 together, in which the second rail 30 in a state as being lower on the left side and higher on the right side is taken for example. For adjusting the levelness of the second rail 30, the user only has to exert a small force on the second rail 30, by slightly pushing up the left side of the second rail 30 or slightly pulling down the right side of the second rail 30, to make the first force applied by the first pulling cord 60 to the adjusting member 54A smaller than the second force applied by the second pulling cord 64 to the adjusting member 54A. Because the force exerted by the user is extremely small, the first force and the second force are merely sufficient for triggering the slide movement of the adjusting member 54A and not able to release the first pulling cord 60 and the second pulling cord 64 from the first reeling wheel 502 and the second reeling wheel 504. When the first force is smaller than the second force, the adjusting member 54A moves with respect to the first casing 42 towards where the second pulling cord 60 extends from, i.e., the adjusting member 54A moves to the right side. As a result, a length of the first pulling cord 60 and a length of the second pulling cord 64 which are located between the first rail 10 and the second rail 30 respectively decreases and increases along with the movement of the adjusting member 54A until the second rail 30 is in a horizontal state.

As seen from the above, when the second rail of the cordless window covering of the present disclosure is slightly slanted, the user can easily adjust the levelness of the second rail without necessity of largely changing the height of the second rail, achieving the goals of ease of operation and aesthetic appeal of the cordless window covering at the same time.

Please refer to FIGS. 27 to 38, in which a cordless window covering 1B according to a third embodiment of the present disclosure is shown.

Figure 27:
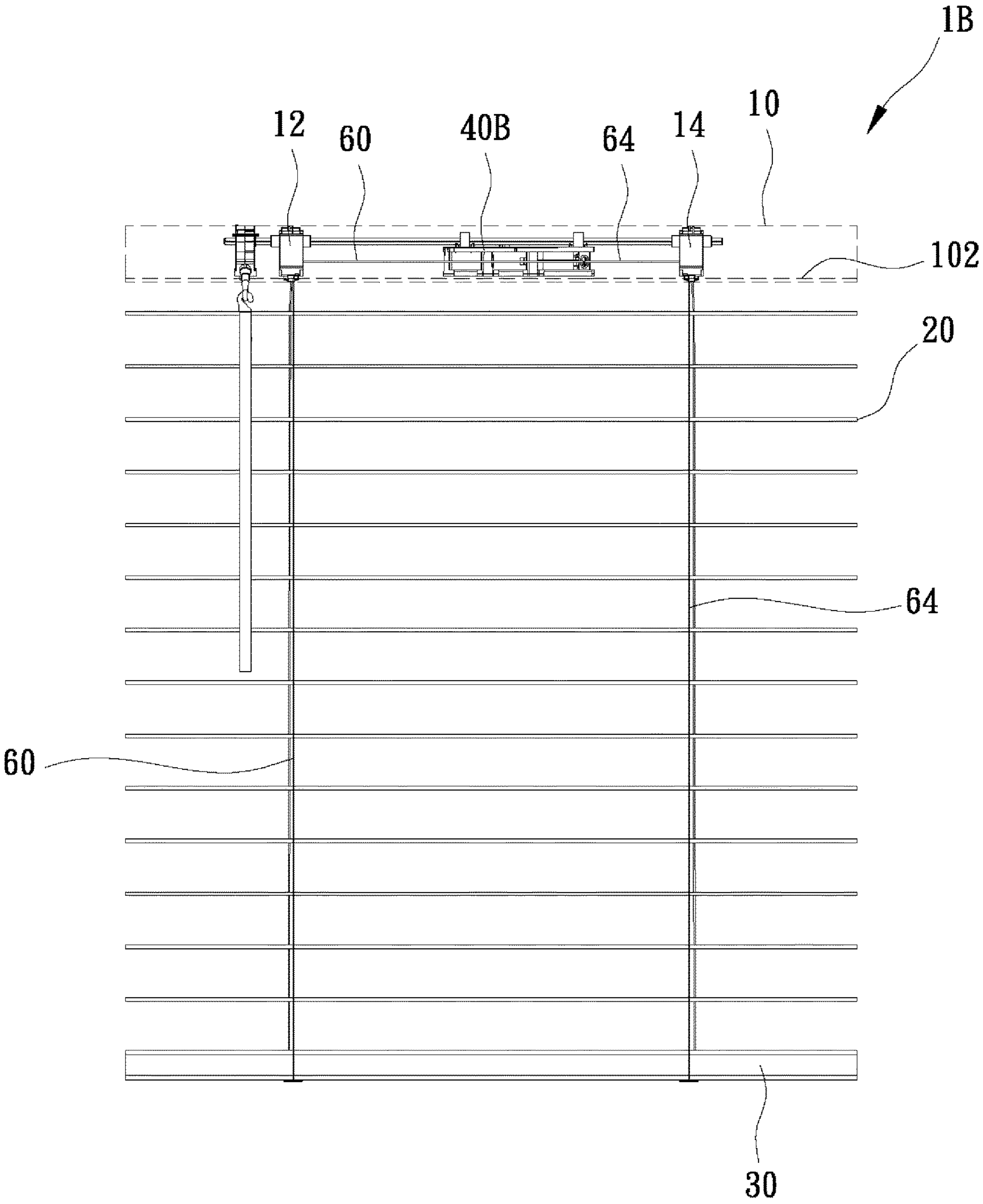
FIG. 27 is a front view of the cordless window covering according to the third embodiment of the present disclosure, in which the covering body is fully extended.
Figure 28:
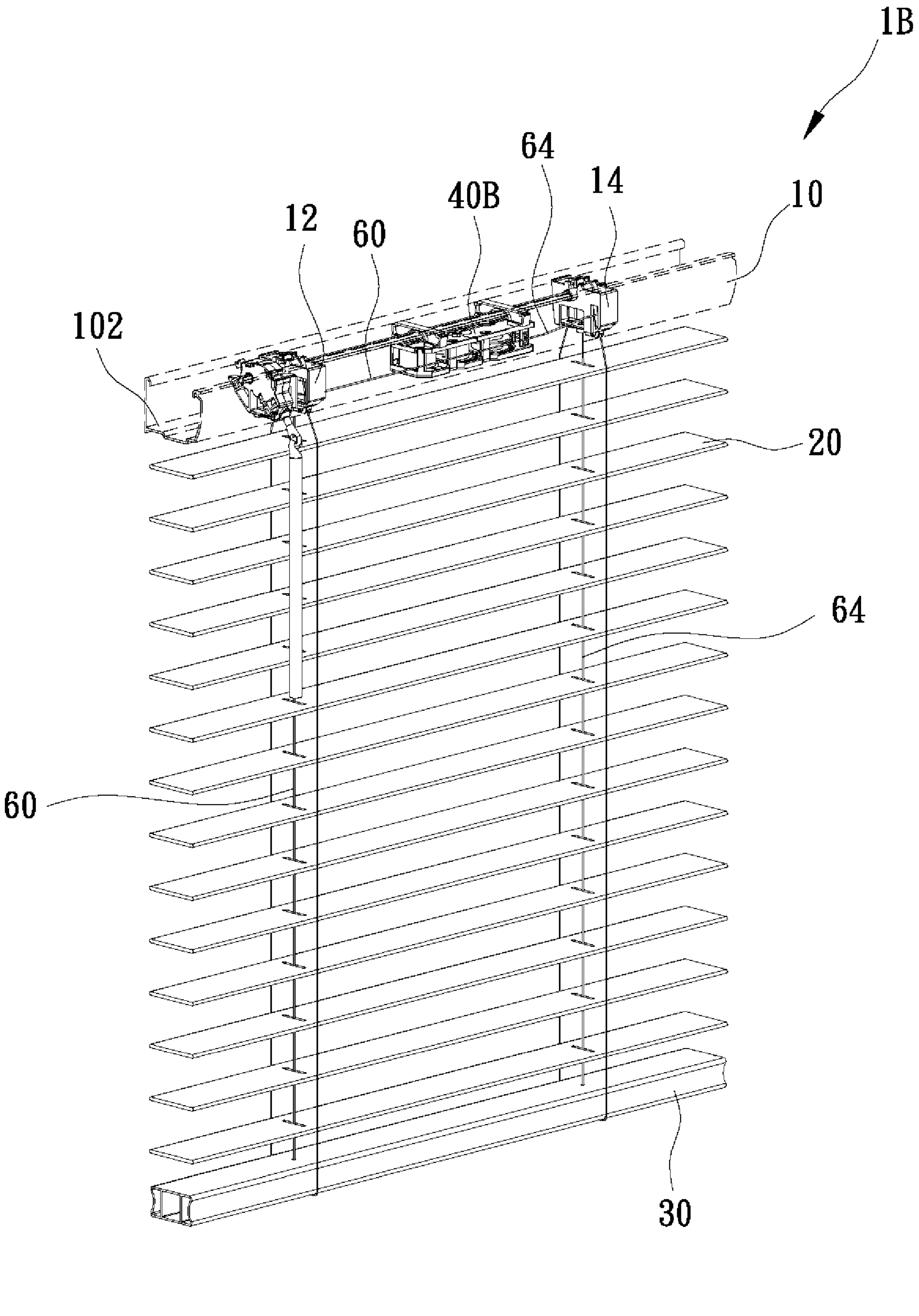
FIG. 28 is a perspective view of the cordless window covering in FIG. 27.

Referring to FIGS. 27 and 28, the cordless window covering 1B according to the third embodiment comprises a first rail 10, a covering body 20, a second rail 30, a cord-retracting device 40B, a first pulling cord 60 and a second pulling cord 64. Overall, the structure and the configuration of the third embodiment is similar to that of the second embodiment. The first rail 10 is for being mounting on a window frame or the wall to suspend the covering body 20 and the second rail 30. The covering body 20 comprises plural slats parallel to each other. The second rail 30 is disposed below the lowest slat of the covering body 20. The cord-retracting device 40B is disposed inside the first rail 10 and located between the first fixed seat 12 and the second fixed seat 14.

Figure 29:
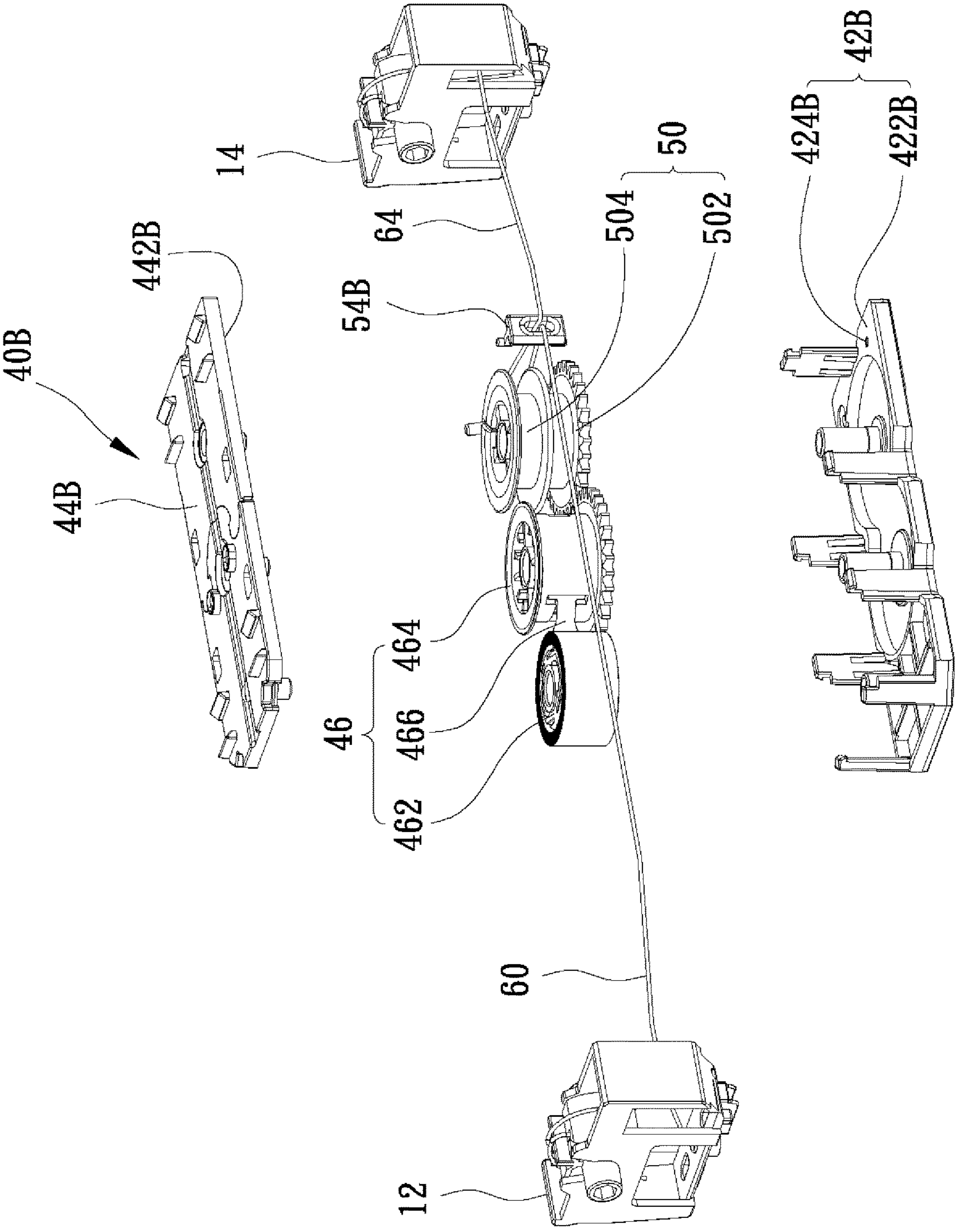
FIG. 29 is an exploded perspective view of the cord-retracting device in FIG. 27.
Figure 30:
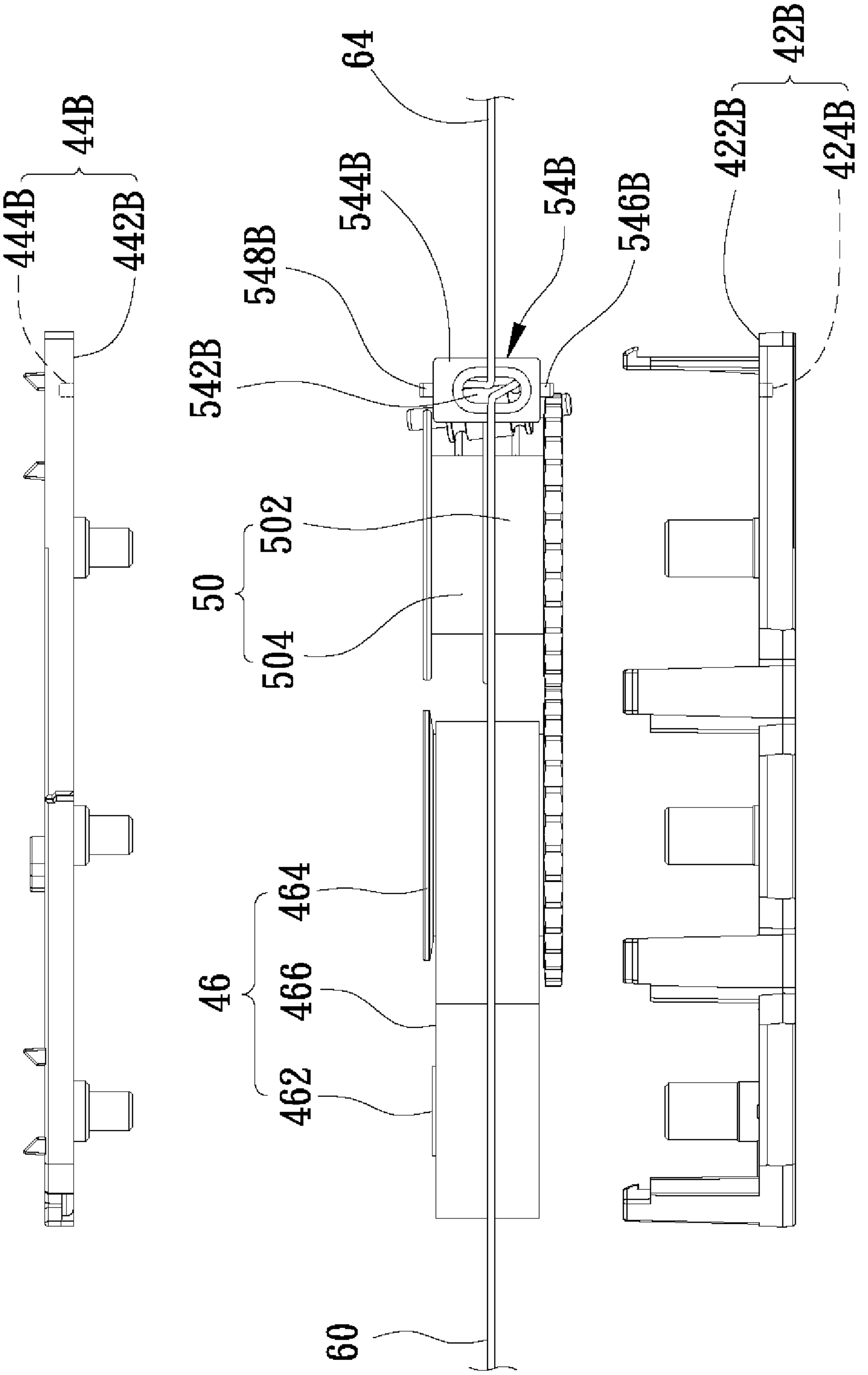
FIG. 30 is an exploded front view of the cord-retracting device in FIG. 27.
Figure 31:
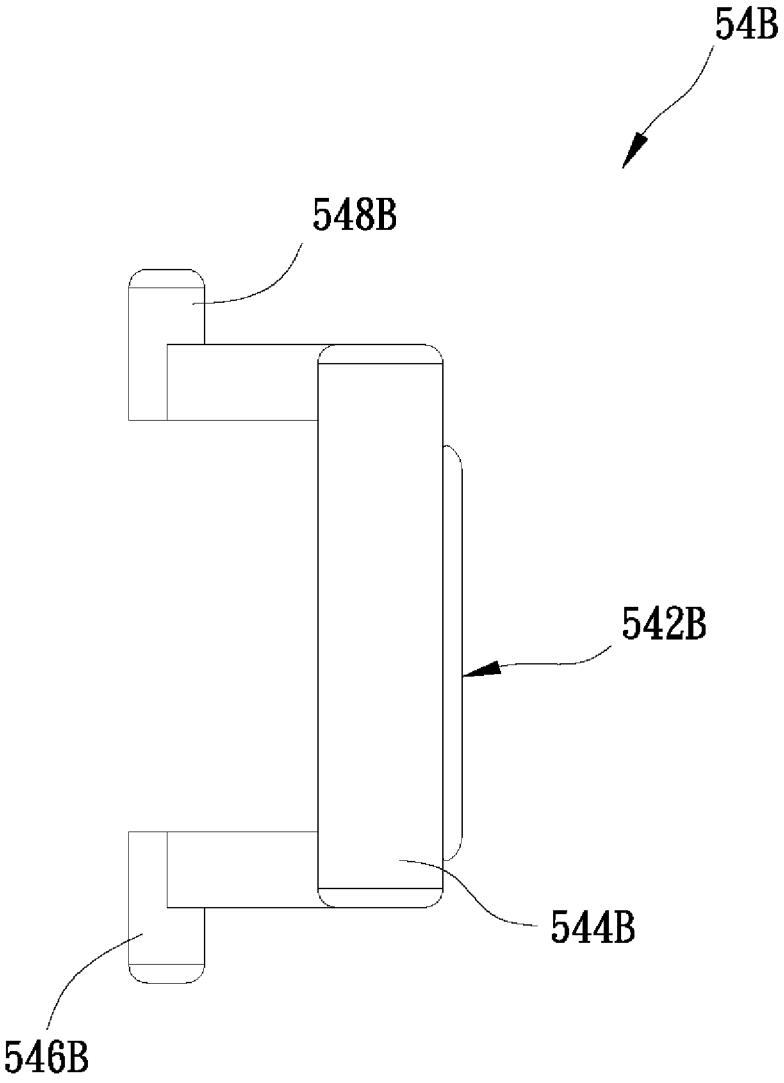
FIG. 31 is a left side view of the adjusting member in FIG. 27.
Figure 32:
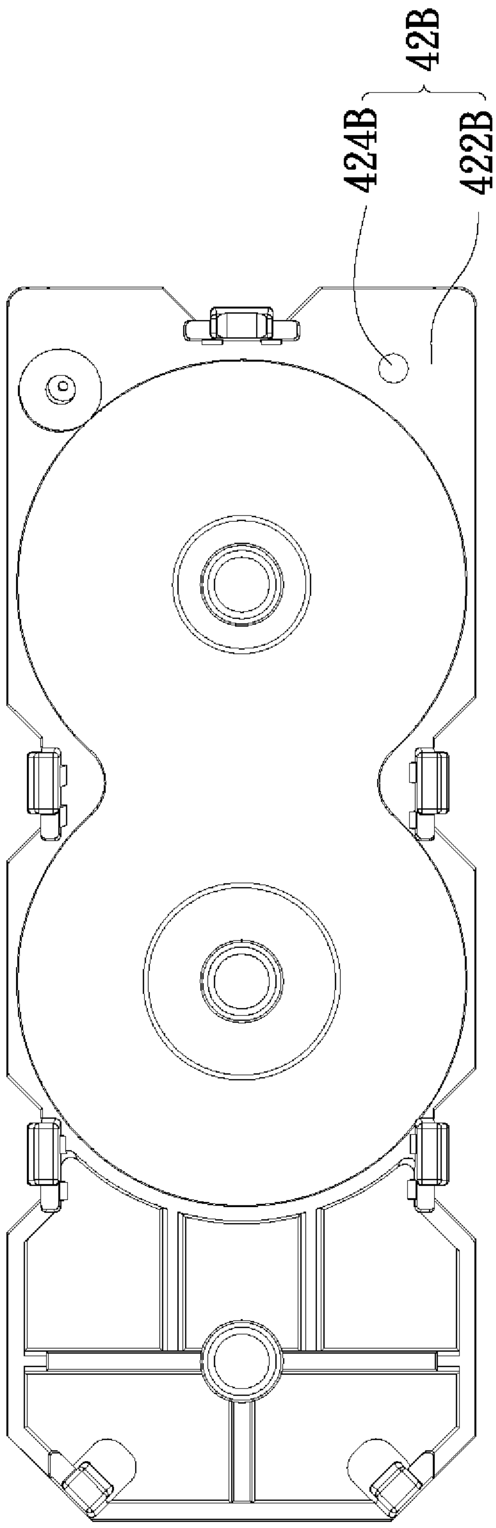
FIG. 32 is a top view of the first casing of the cord-retracting device in FIG. 27.

Please further refer to FIGS. 29 to 30 together. The cord-retracting device 40B comprises a first casing 42B, a second casing 44B, a power assembly 46, a reeling assembly 50 and an adjusting member 54B. The first casing 42B is disposed on an inner bottom surface 102 of the first rail 10, as shown in FIGS. 27 and 28. The first casing 42B has a first inner surface 422B. The second casing 44B and the first casing 42B are opposing to each other and engaged with each other. The power assembly 46, the reeling assembly 50 and the adjusting member 54B are sandwiched between the first casing 42B and the second casing 44B to be positioned in a more stable manner. The first casing 42B comprises a first guiding portion, which is a pivot hole 424B concavely formed on the first inner surface 422B of the first casing 42B and adjacent to the reeling assembly 50. The power assembly 46 comprises a spring storage wheel 462, a driving wheel 464 and a spring 466. The spring storage wheel 462 and the driving wheel 464 are rotatably disposed on the first inner surface 422B of the first casing 42 and are adjacent to each other. One end of the spring 466 is connected to the driving wheel 464, and the other end is connected to the spring storage wheel 462.

The reeling assembly 50 and the power assembly 46 are disposed adjacent to each other. The reeling assembly 50 comprises a first reeling wheel 502 and a second reeling wheel 504 connected in a concurrently rotatable manner. In the present embodiment, the first reeling wheel 502 and the second reeling wheel 504 are coaxially one stacked on the other and interconnected in an integrally-formed manner. The first reeling wheel 502 has a gear engaged with the driving wheel 464, such that the driving wheel 464, the first reeling wheel 502 and the second reeling wheel 504 can rotate concurrently.

Referring to FIGS. 29 to 32, the adjusting member 54B is disposed on the first inner surface 422B of the first casing 42B, and comprises a post body 544B, a through hole 542B on the post body 544B, and a first pivot portion 546B (i.e., the first guided portion) connected with the post body 544B. The through hole 542B is provided for the first pulling cord 60 and the second pulling cord 64 to pass therethrough. The first pivot portion 546B includes a pivot post inserted into the first pivot hole 424B of the first casing 42B, such that the post body 544B of the adjusting member 54B can swing around the first pivot hole 424B of the first casing 42B with respect to the first casing 42B.

Figure 33:
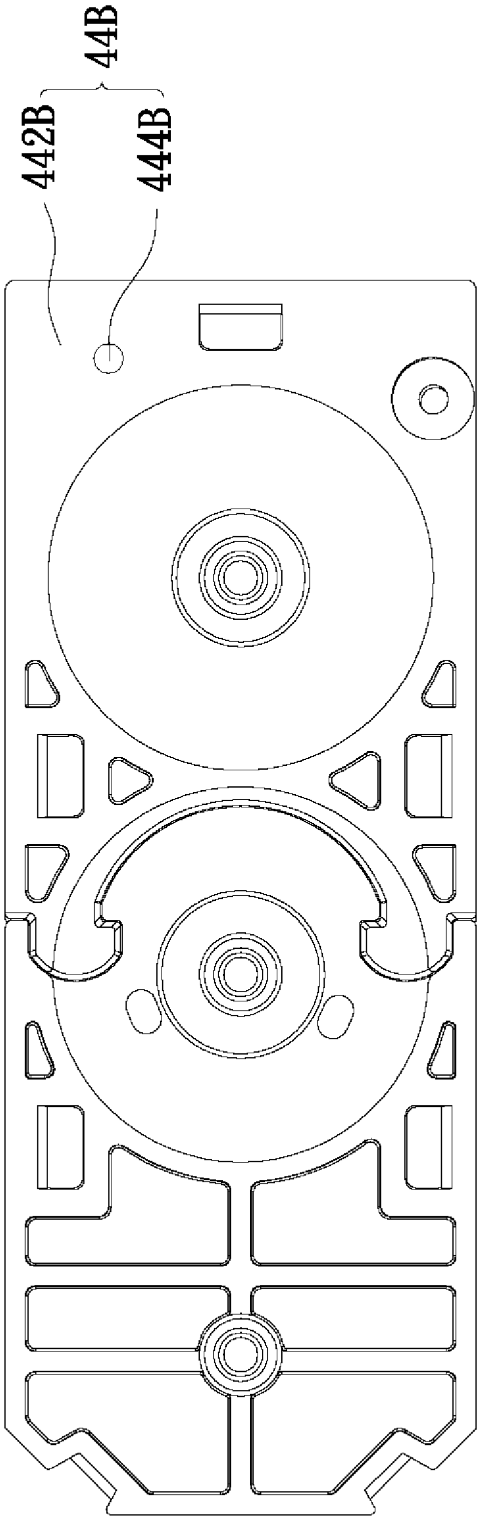
FIG. 33 is a bottom view of the second casing of the cord-retracting device in FIG. 27.

Please further refer to FIG. 33. In addition to the structure of the first pivot hole 424B and the first pivot portion 546B mentioned above, the second casing 44B also comprises a second guiding portion, which is a second pivot hole 444B concavely formed in the upward direction on the second inner surface 442B of the second casing 44B. The position of the second pivot hole 444B corresponds to the position of the first pivot hole 424B. The adjusting member 54B further comprises a second pivot portion 548B (i.e., the second guided portion), which includes a pivot post for being inserted into the second pivot hole 444B. The way that the second pivot portion 548B collaborates with the second pivot hole 444B is the same as that of the first pivot portion 546B and the first pivot hole 424B. Since the first pivot portion 546B and the second pivot portion 548B of the adjusting member 54B are inserted into the first pivot hole 424B and the second pivot hole 444B, respectively, the post body 544B of the adjusting member 54B can swing around the first pivot hole 424B and the second pivot hole 444B with respect to the first casing 42B and the second casing 44B.

Please refer to FIGS. 27 to 30, which illustrate the configuration of the first pulling cord 60 and the second pulling cord 64. A first end of the first pulling cord 60 and a first end of the second pulling cord 64 are located within the first rail 10 and connected to the first reeling wheel 502 and the second reeling wheel 504, respectively. Meanwhile, a second end of the first pulling cord 60 extends to the left and reaches the first fixed seat 12 after passing through the through hole 542B of the adjusting member 54B, and then passes out from the first rail 10. A second end of the second pulling cord 64 extends to the right and reaches the second fixed seat 14 after passing through the through hole 542B of the adjusting member 54B, and then passes out from the first rail 10. The parts of the first pulling cord 60 and the second pulling cord 64 outside the first rail 10 respectively thread through the slats of the covering body 20 and are connected to the second rail 30. Since the first pulling cord 60 and the second pulling cord 64 extend in opposite directions after passing through the through hole 542B of the adjusting member 54B, the first pulling cord 60 and the second pulling cord 64 apply a first force and a second force in opposite directions to the adjusting member 54B, respectively.

Please refer to FIGS. 34 to 38, which illustrate acting relationship among the components while the covering body 20 of the cordless window covering 1B is extended or retracted.

When the covering body 20 of the cordless window covering 1B is fully extended, as shown in FIG. 27 and FIG. 28, the second rail 30 is moved to a farthest position from the first rail 10, and the majority of the spring 466 is released from the spring storage wheel 462 and wound onto the driving wheel 464. As the spring 466 is coiled around the driving wheel 464, the spring 466 accumulates energy that would make the spring 466 rewound onto the spring storage wheel 462. At this moment, the first pulling cord 60 is almost fully released from the first reeling wheel 502, and the second pulling cord 64 is almost fully released from the second reeling wheel 504.

Figure 34:
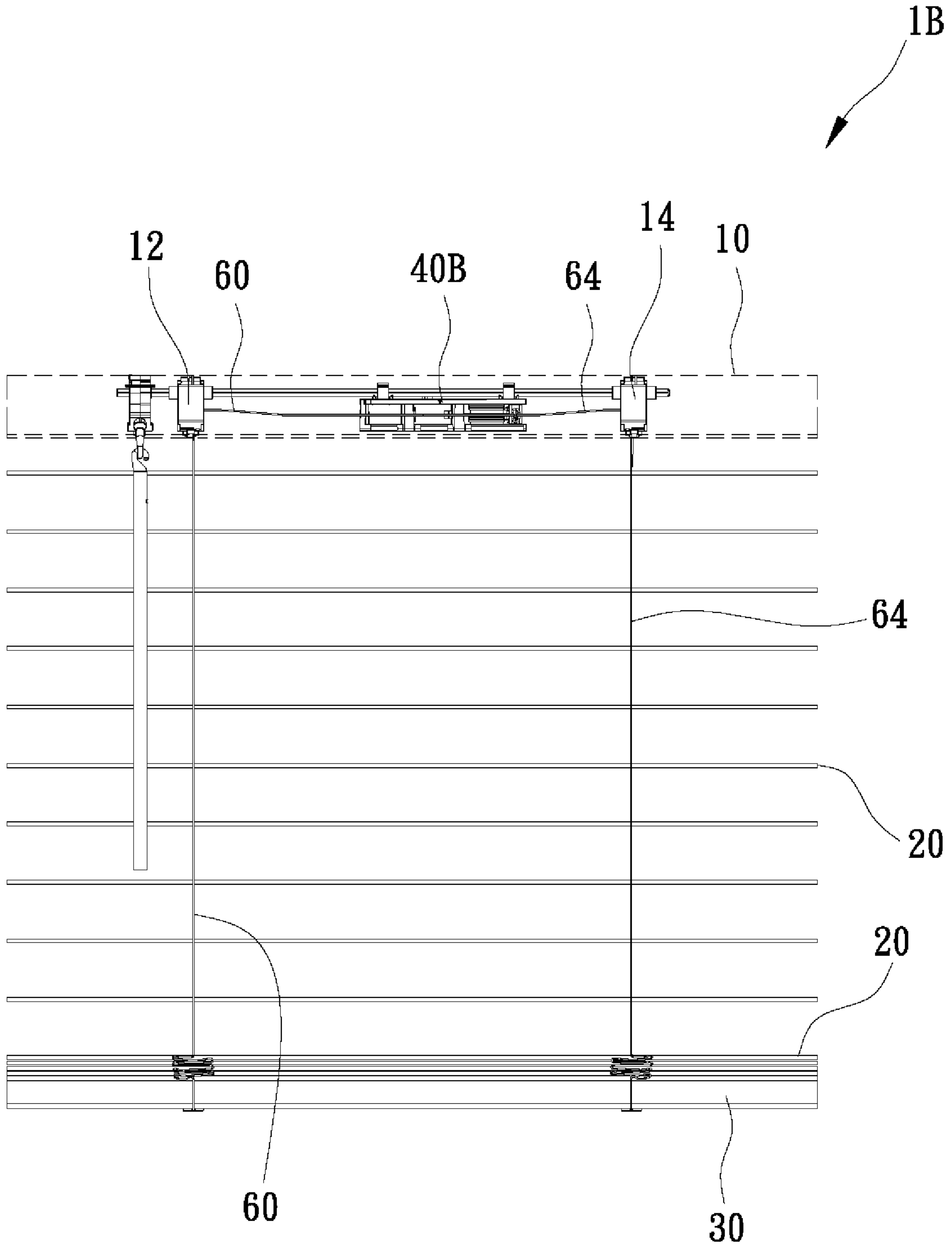
FIG. 34 is a front view of the cordless window covering according to the third embodiment of the present disclosure, in which the covering body is in a partial-retracted state.

In order to gradually retract the covering body 20 of the cordless window covering 1B from a fully extended state shown in FIG. 27 and FIG. 28 to a partial-retracted state shown in FIG. 34, the user can apply a force to the second rail 30 by hands or by a tool (e.g., a pushing or dragging rod) to make the second rail 30 move upwardly. During the upward movement of the second rail 30, the spring 466 releases energy and is rewound onto the spring storage wheel 462. In the process of rewind of the spring 466, the driving wheel 464 is driven to rotate, and the rotation of the driving wheel 464 drives the first reeling wheel 502 and the second reeling wheel 504 to rotate for pulling back the first pulling cord 60 and the second pulling cord 64, which are loosen because of the upward movement of the second rail 30.

During the upward movement of the second rail 30, the second rail 30 may be slanted as higher on the left side and lower on the right side, or alternatively, lower on the left side and higher on the right side, because the second rail 30 is moved too fast when being pushed by the user or the forces applied by the user to the second rail 30 is uneven. This results in variations in the stacking uniformity when the first pulling cord 60 and the second pulling cord 64 are rolled up on the first reeling wheel 502 and the second reeling wheel 504, respectively. For example, when each of the pulling cords is wound on the corresponding reeling wheel, it may not be stacked in order and not neatly arranged. Another possible situation is that when the pulling cords are wound on the reeling wheels for the same number of rotations, the pulling cord with higher tension will be collected with a shorter length, due to different tensions in each pulling cord. In both cases, the first pulling cord 60 and the second pulling cord 64 are collected with different lengths after the second rail 30 moves upwardly, at which point if the user stops applying the upward pushing force to the second rail 30 and lest the second rail 30 suspended naturally, the second rail 30 would be slanted and in a non-horizontal state.

Figure 35:
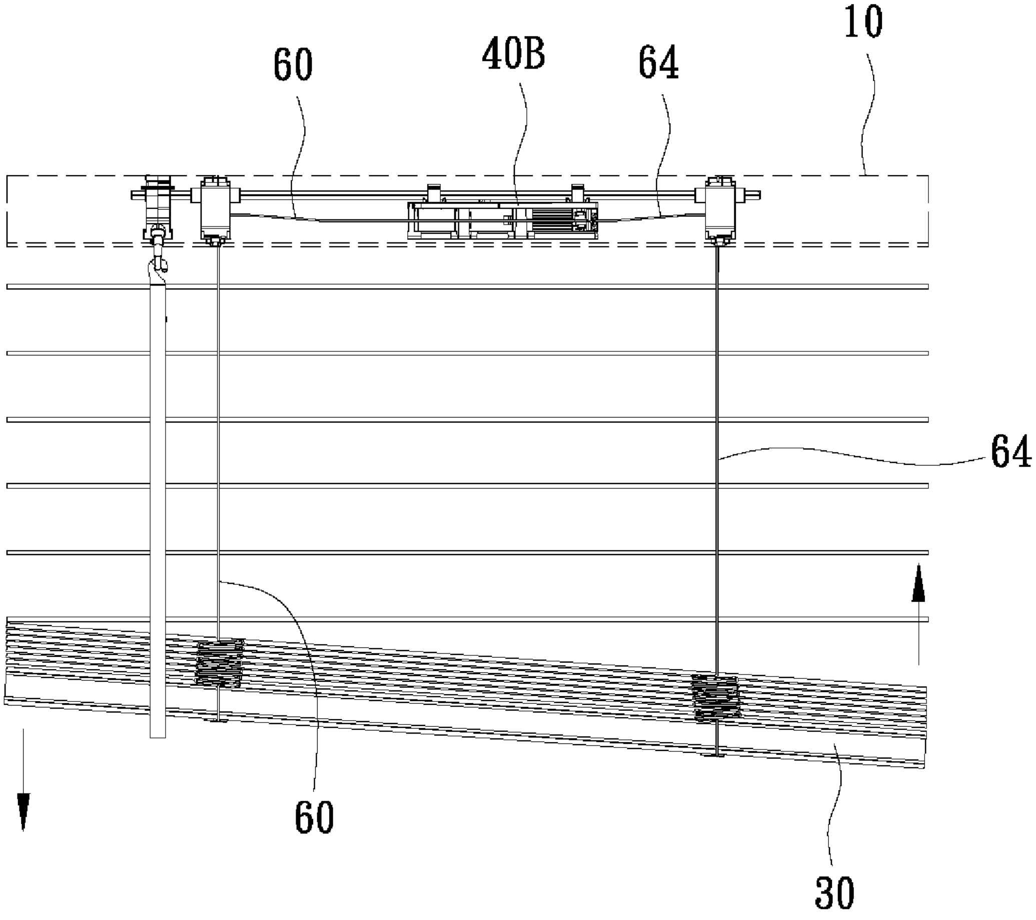
FIG. 35 schematically shows the second rail of the cordless window covering in the partial-retracted state, as the second rail is in a non-horizontal state as being higher on the left side and lower on the right side.
Figure 36:
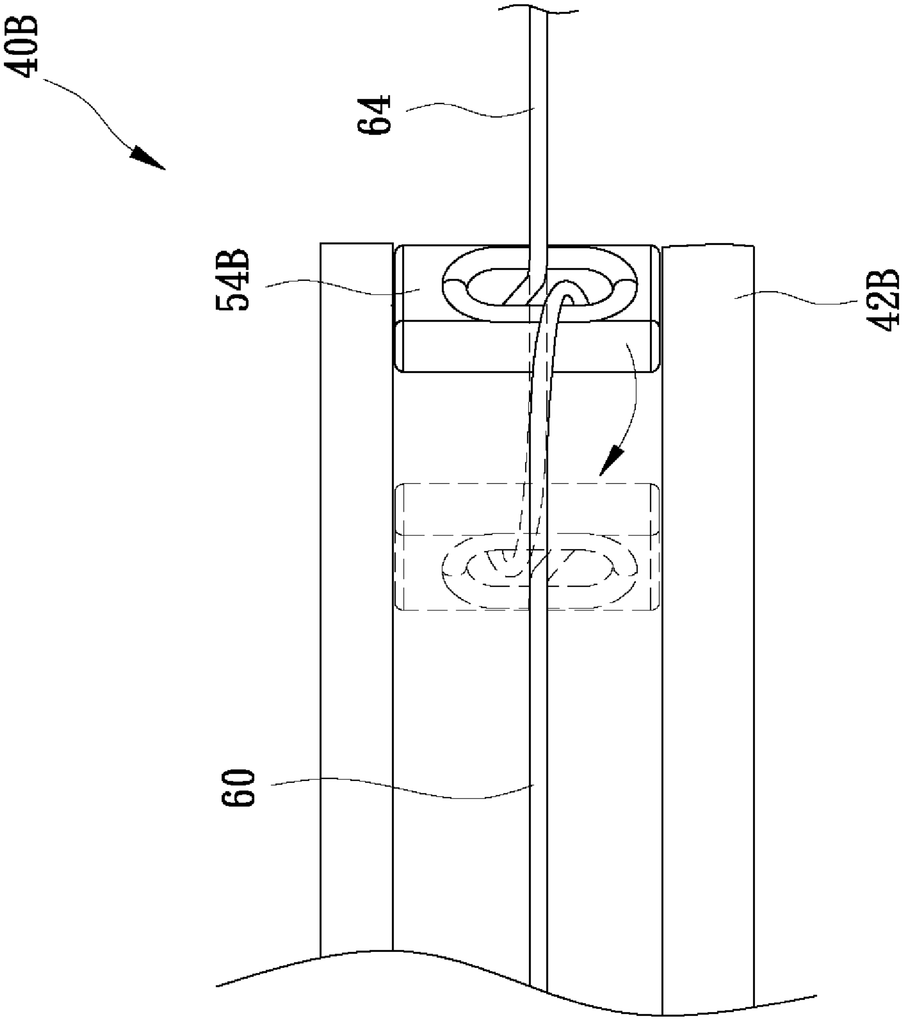
FIG. 36 schematically shows the action of the adjusting member during levelness adjustment of the cordless window covering in FIG. 35.

Please refer to FIGS. 30, 35 and 36 together, in which the second rail 30 in a slanted state as being higher on the left side and lower on the right side is taken for example. For adjusting the levelness of the second rail 30, the user only has to exert a small force on the second rail 30, by slightly pulling down the left side of the second rail 30 or slightly pushing up the right side of the second rail 30, to make the first force applied by the first pulling cord 60 to the adjusting member 54B greater than the second force applied by the second pulling cord 64 to the adjusting member 54B. Because the force exerted by the user is extremely small, the first force and the second force are merely sufficient for triggering the pivotally swing movement of the adjusting member 54B and not able to release the first pulling cord 60 and the second pulling cord 64 from the first reeling wheel 502 and the second reeling wheel 504. When the first force is greater than the second force, the post body 544B of the adjusting member 54B swings around the first pivot hole 424B of the first casing 42B towards where the first pulling cord 60 extends from, i.e., the post body 544B of the adjusting member 54B pivotally swings towards the left side. As a result, a length of the first pulling cord 60 and a length of the second pulling cord 64 which are located between the first rail 10 and the second rail 30 respectively increases and decreases along with the movement of the adjusting member 54B until the second rail 30 is in a horizontal state.

Figure 37:
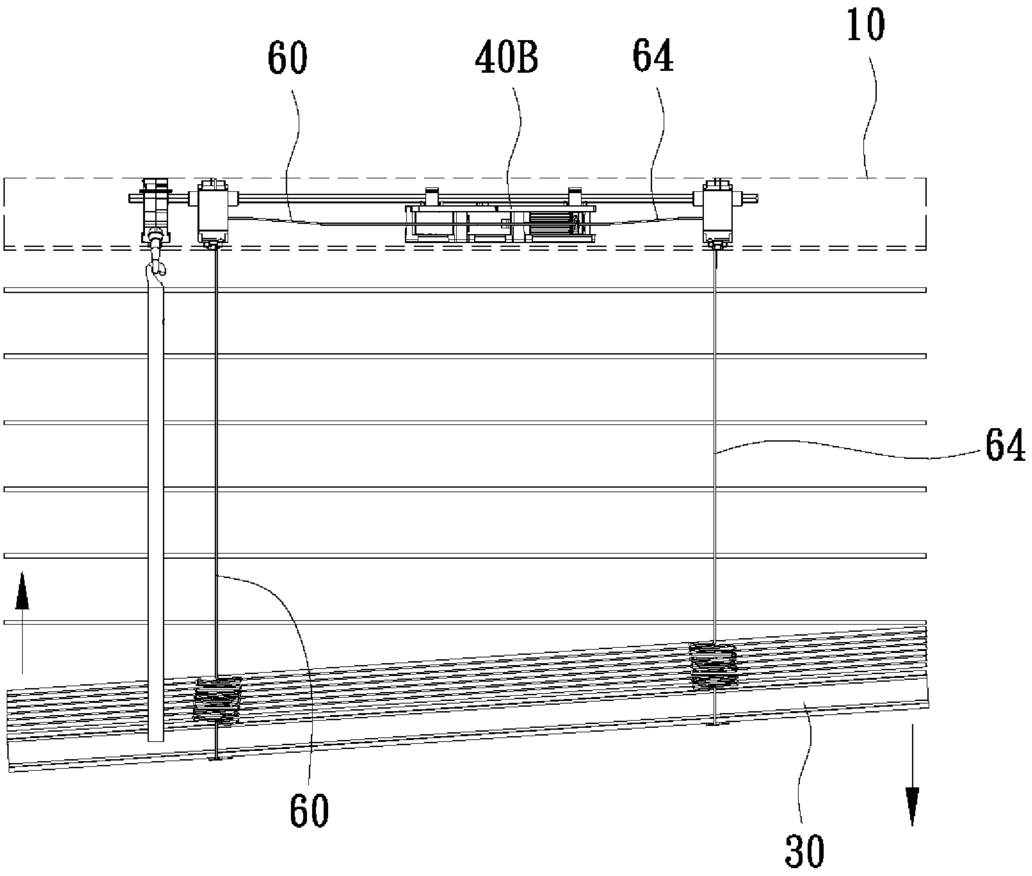
FIG. 37 schematically shows the second rail of the cordless window covering in the partial-retracted state, as the second rail is in a non-horizontal state as being lower on the left side and higher on the right side.
Figure 38:
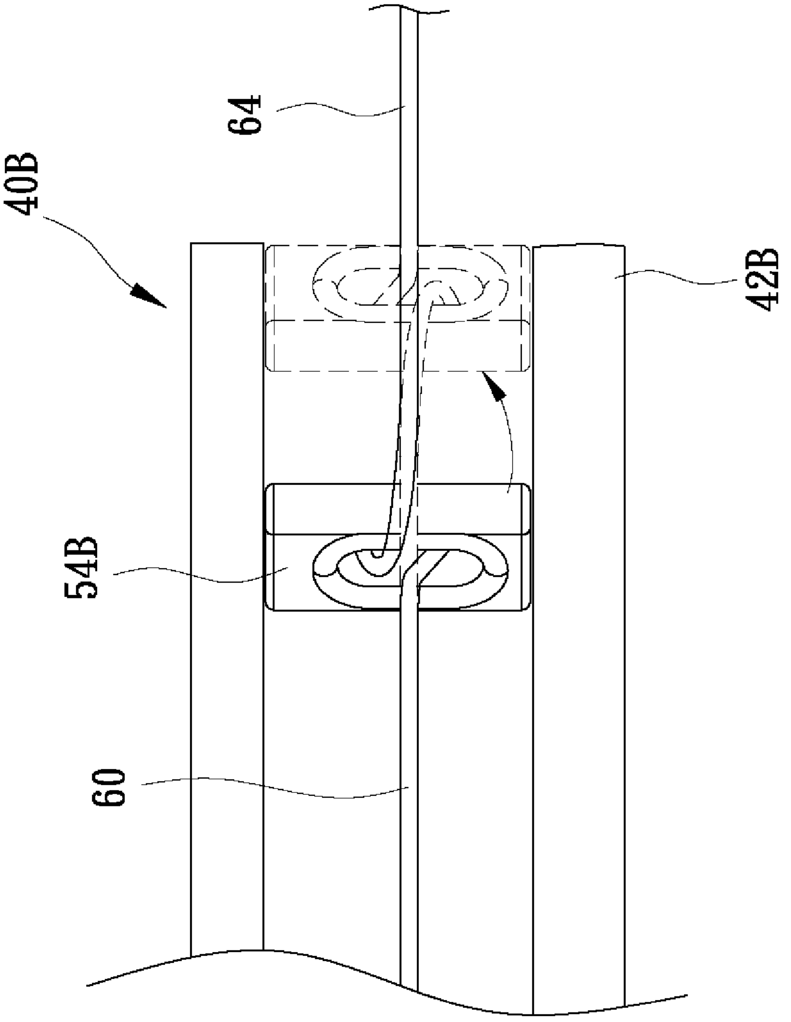
FIG. 38 schematically shows the action of the adjusting member during levelness adjustment of the cordless window covering in FIG. 37.

In a similar manner, please refer to FIGS. 30, 37 and 38 together, in which the second rail 30 in a state as being lower on the left side and higher on the right side is taken for example. For adjusting the levelness of the second rail 30, the user only has to exert a small force on the second rail 30, by slightly pushing up the left side of the second rail 30 or slightly pulling down the right side of the second rail 30, to make the first force applied by the first pulling cord 60 to the adjusting member 54B smaller than the second force applied by the second pulling cord 64 to the adjusting member 54B. Because the force exerted by the user is extremely small, the first force and the second force are merely sufficient for triggering the pivotally swing movement of the adjusting member 54 and not able to release the first pulling cord 60 and the second pulling cord 64 from the first reeling wheel 502 and the second reeling wheel 504. When the first force is smaller than the second force, the post body 544B of the adjusting member 54B swings around the first pivot hole 424B of the first casing 42B towards where the second pulling cord 64 extends from, i.e., the post body 544B of the adjusting member 54B pivotally swings towards the right side. As a result, a length of the first pulling cord 60 and a length of the second pulling cord 64 which are located between the first rail 10 and the second rail 30 respectively decreases and increases along with the movement of the adjusting member 54B until the second rail 30 is in a horizontal state.

As seen from the above, when the second rail of the cordless window covering of the present disclosure is slightly slanted, the user can easily adjust the levelness of the second rail without necessity of largely changing the height of the second rail, achieving the goals of ease of operation and aesthetic appeal of the cordless window covering at the same time.

In addition to the above-mentioned ways of adjusting the levelness of the second rail 30 by movement or pivotally swing of the adjusting member, the present disclosure also provides a way of adjusting the levelness of the second rail 30 by moving the cord-retracting device with respect to the first rail. Please refer to FIGS. 39 to 49, in which a cordless window covering 1C according to a fourth embodiment of the present disclosure is shown.

Figure 39:
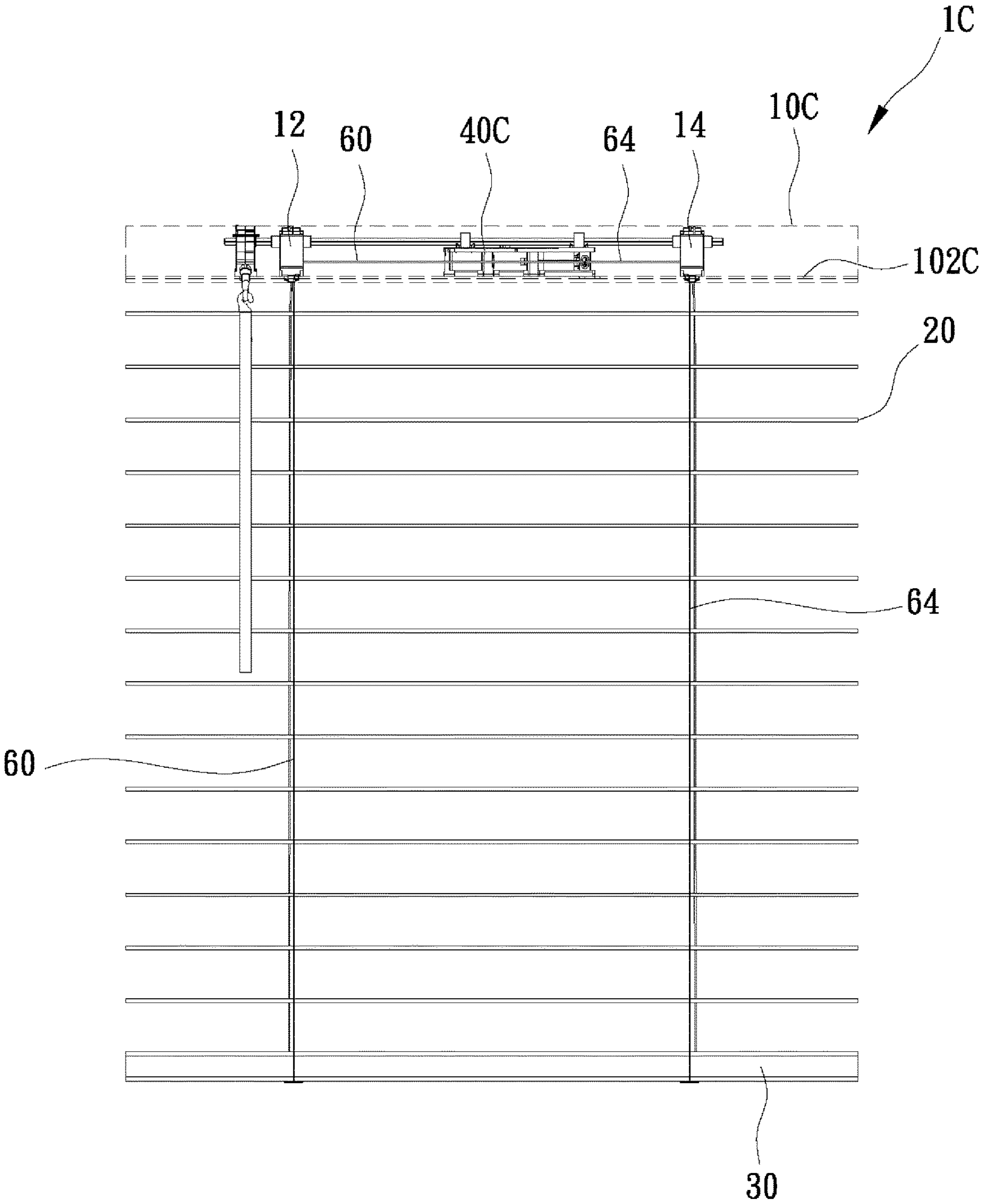
FIG. 39 is a front view of the cordless window covering according to the fourth embodiment of the present disclosure, in which the covering body is fully extended.
Figure 40:
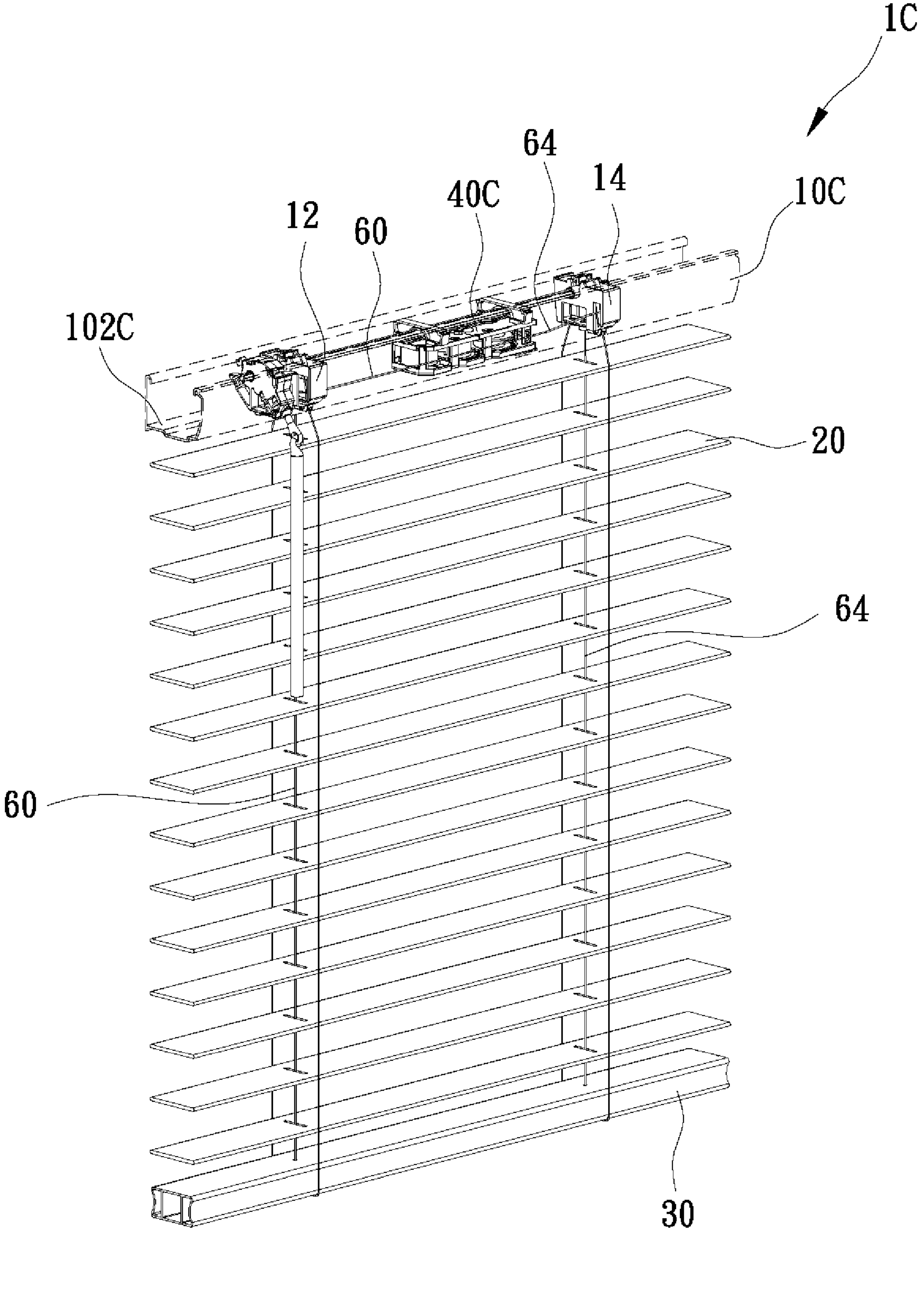
FIG. 40 is a perspective view of the cordless window covering in FIG. 41.
Figure 41:
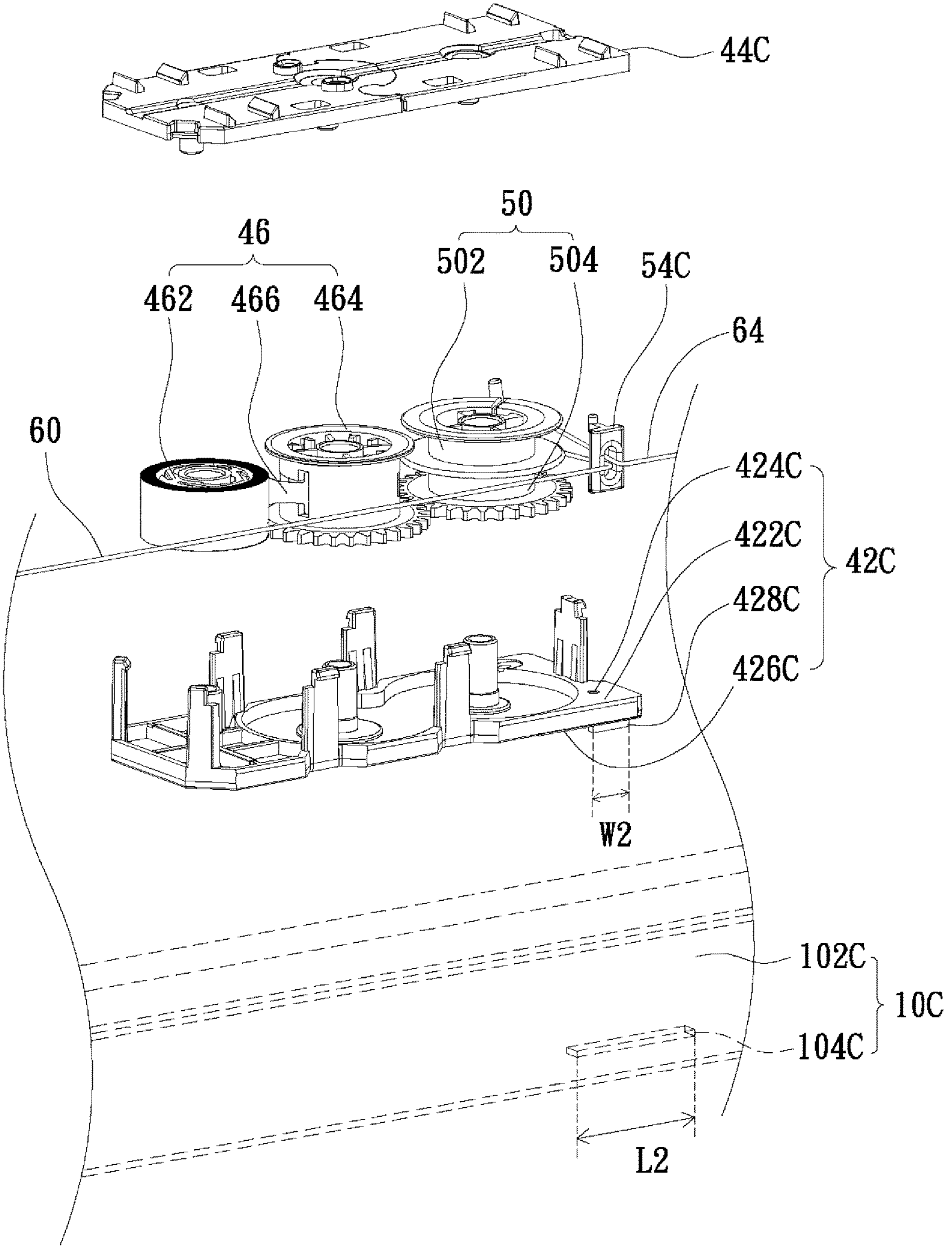
FIG. 41 is an exploded perspective view of the cord-retracting device and the partial first rail in FIG. 39.
Figure 42:
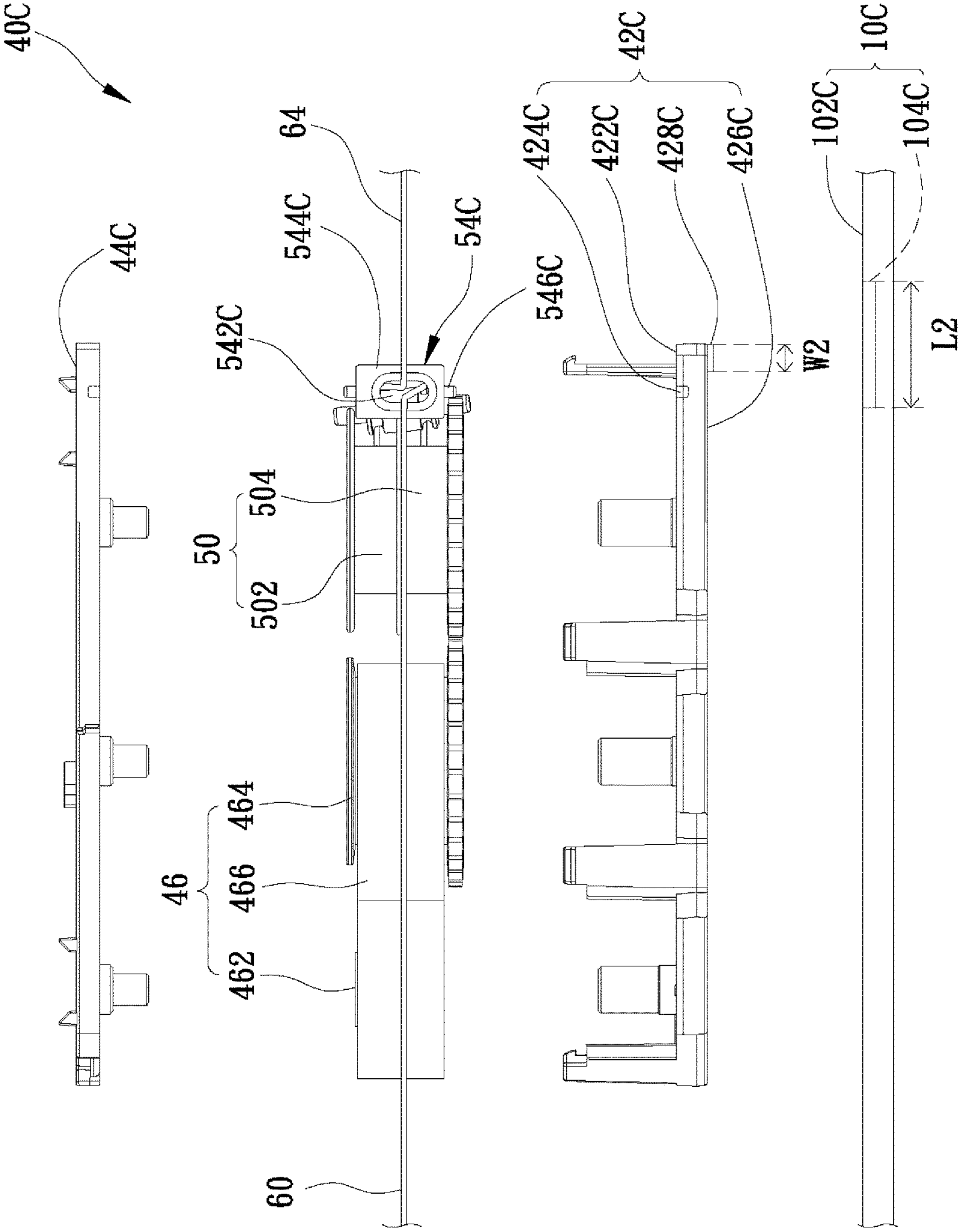
FIG. 42 is an exploded front view of the cord-retracting device in FIG. 39.

Referring to FIGS. 39 and 40, the cordless window covering 1C according to the fourth embodiment comprises a first rail 10C, a covering body 20, a second rail 30, a cord-retracting device 40C, a first pulling cord 60 and a second pulling cord 64. Overall, the structure and the configuration of the fourth embodiment is similar to that of the third embodiment. The first rail 10C is for being mounting on a window frame or the wall, comprising a third guiding portion which is a third groove 104C formed on an inner bottom surface 102C of the first rail 10C, as shown in FIGS. 41 and 42. The third groove 104C has a length L2 oriented along a longitudinal axis of the first rail 10C. The first rail 10C suspends the covering body 20 and the second rail 30. The covering body 20 comprises plural slats parallel to each other. The second rail 30 is disposed below the lowest slat of the covering body 20. The cord-retracting device 40C is disposed inside the first rail 10C and located between the first fixed seat 12 and the second fixed seat 14.

Please further refer to FIGS. 41 to 44 together. The cord-retracting device 40C comprises a first casing 42C, a second casing 44C, a power assembly 46, a reeling assembly 50 and an adjusting member 54C. The first casing 42C is disposed on the inner bottom surface 102C of the first rail 10C, and the first casing 42C has a first inner surface 422C and a first outer surface 426C. Moreover, the first casing 42C comprises a third guided portion, which is a third protrusion 428C projected outwardly from the first outer surface 426C of the first casing 42C. The third protrusion 428C is inserted into the third groove 104C of the first rail 10C, and has a breadth W2 oriented along the longer edge. The breadth W2 is smaller than the length L2 of the third groove 104C, such that the third protrusion 428C can slide within the third groove 104C along the longer edge with a restricted range of motion. By collaboration of the third protrusion 428C and the third groove 104C, the sliding direction and sliding distance of the cord-retracting device 40C with respect to the first rail 10C are under control and the cord-retracting device 40C is prevented from unpredictable movements when being subjected to forces.

A first pivot hole 424C (i.e., the first guiding portion) is concavely formed on the first inner surface 422C of the first casing 42C and adjacent to the reeling assembly 50. The second casing 44C and the first casing 42C are opposing to each other and engaged with each other. The power assembly 46, the reeling assembly 50 and the adjusting member 54C are sandwiched between the first casing 42C and the second casing 44C to be positioned in a more stable manner.

The reeling assembly 50 and the power assembly 46 are disposed adjacent to each other. The reeling assembly 50 comprises a first reeling wheel 502 and a second reeling wheel 504 connected in a concurrently rotatable manner. In the present embodiment, the first reeling wheel 502 and the second reeling wheel 504 are coaxial and stacked vertically and interconnected in an integrally-formed manner. The first reeling wheel 502 has a gear engaged with the driving wheel 464, such that the driving wheel 464, the first reeling wheel 502 and the second reeling wheel 504 can rotate concurrently.

Figure 43:
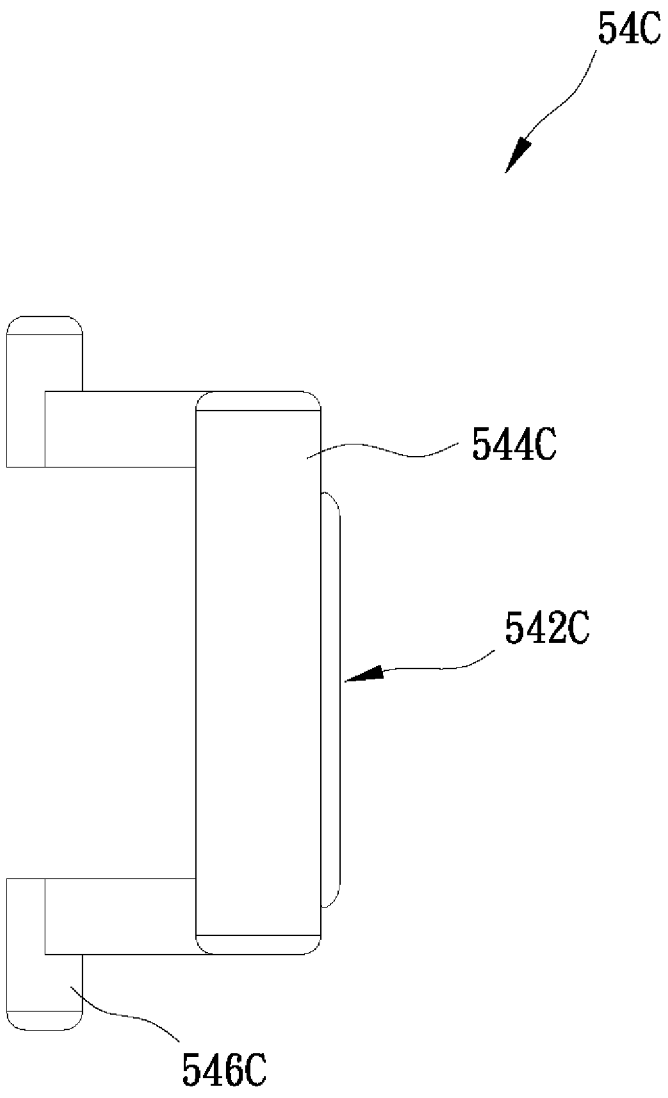
FIG. 43 is a left side view of the cordless window covering in FIG. 39.
Figure 44:
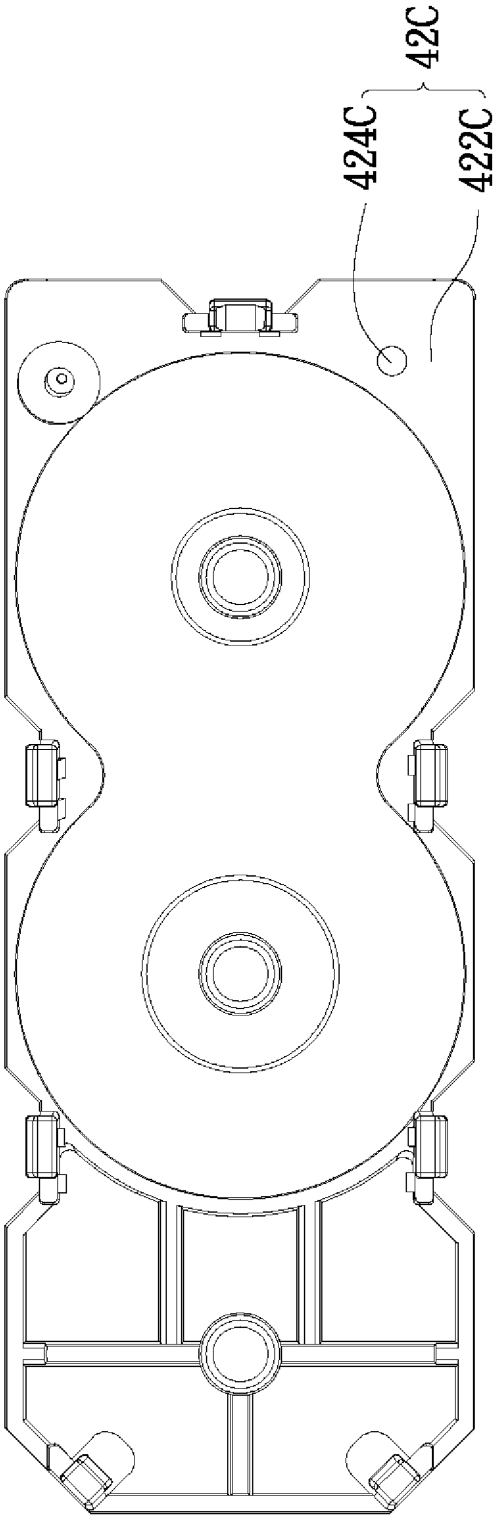
FIG. 44 is a top view of the first casing of the cordless window covering in FIG. 39.

Referring to FIGS. 42 to 44, the adjusting member 54C is disposed on the first inner surface 422C of the first casing 42C, and comprises a post body 544C, a through hole 542C on the post body 544C, and a first pivot portion 546C (i.e., the first guided portion) connected with the post body 544C. The through hole 542C is provided to be passed through by the first pulling cord 60 and the second pulling cord 64. The first pivot portion 546C is inserted into the first pivot hole 424C of the first casing 42C, such that the post body 544C of the adjusting member 54C can swing around the first pivot hole 424C of the first casing 42C with respect to the first casing 42C.

Please refer to FIGS. 39 to 42, which illustrate the configuration of the first pulling cord 60 and the second pulling cord 64. A first end of the first pulling cord 60 and a first end of the second pulling cord 64 are located within the first rail 10C and connected to the first reeling wheel 502 and the second reeling wheel 504, respectively. Meanwhile, a second end of the first pulling cord 60 extends to the left and reaches the first fixed seat 12 after passing through the through hole 542C of the adjusting member 54C, and then passes out from the first rail 10C. A second end of the second pulling cord 64 extends to the right and reaches the second fixed seat 14 after passing through the through hole 542C of the adjusting member 54C, and then passes out from the first rail 10C. The parts of the first pulling cord 60 and the second pulling cord 64 outside the first rail 10 respectively thread through the slats of the covering body 20 and are connected to the second rail 30. Since the first pulling cord 60 and the second pulling cord 64 extend in opposite directions after passing through the through hole 542C of the adjusting member 54C, the first pulling cord 60 and the second pulling cord 64 apply a first force and a second force in opposite directions to the adjusting member 54B, respectively.

Please refer to FIGS. 45 to 49, which illustrate acting relationship among the components while the covering body 20 of the cordless window covering 1C is extended or retracted.

When the covering body 20 of the cordless window covering 1C is fully extended, as shown in FIG. 39 and FIG. 40, the second rail 30 is moved to a farthest position from the first rail 10C, and the majority of the spring 466 is released from the spring storage wheel 462 and wound onto the driving wheel 464. As the spring 466 is coiled around the driving wheel 464, the spring 466 accumulates energy that would make the spring 466 rewound onto the spring storage wheel 462. At this moment, the first pulling cord 60 is almost fully released from the first reeling wheel 502, and the second pulling cord 64 is almost fully released from the second reeling wheel 504.

Figure 45:
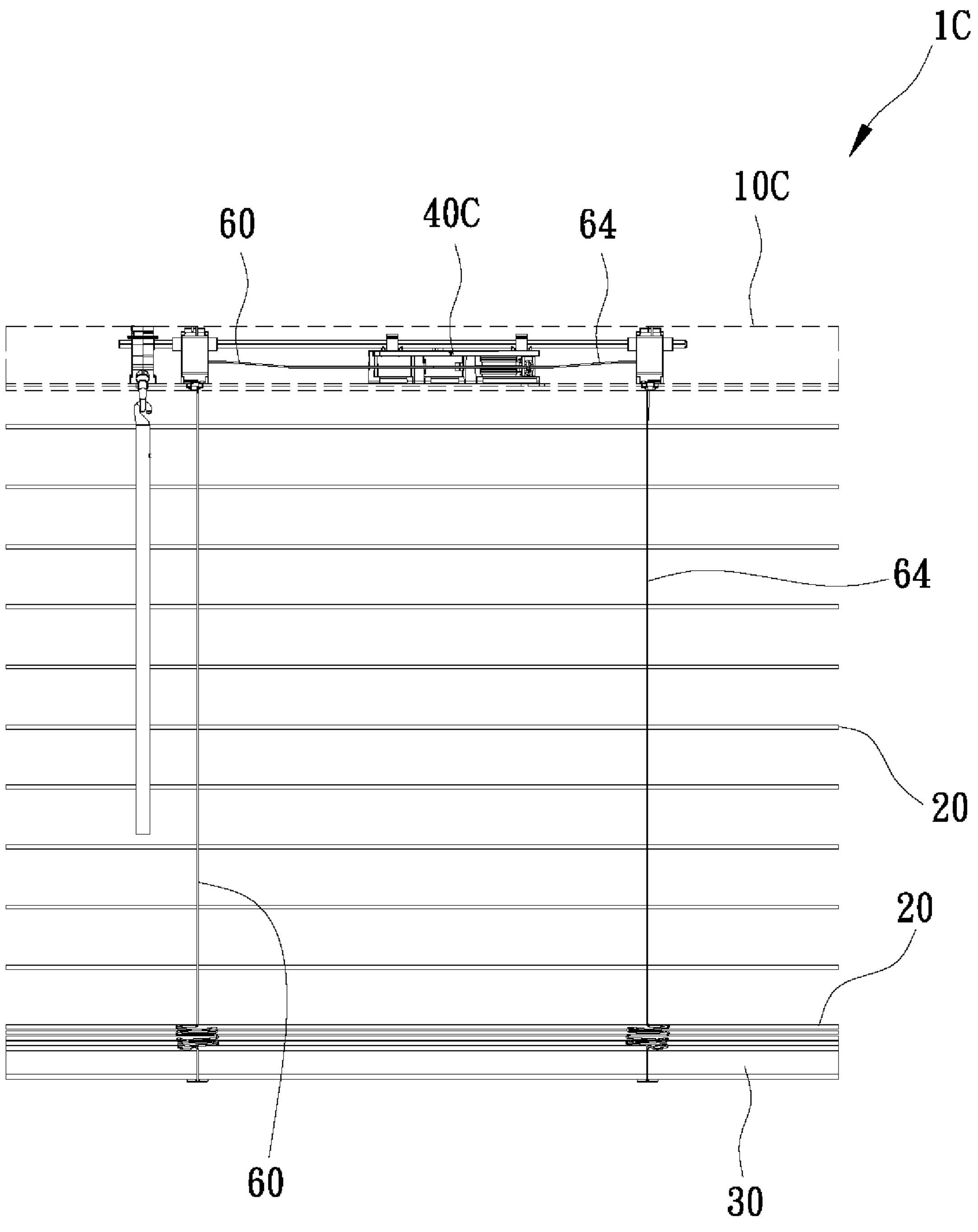
FIG. 45 a front view of the cordless window covering according to the fourth embodiment of the present disclosure, in which the covering body is in a partial-retracted state.

In order to gradually retract the covering body 20 of the cordless window covering 1C from a fully extended state shown in FIG. 39 and FIG. 40 to a partial-retracted state shown in FIG. 45, the user can apply a force to the second rail 30 by hands or by a tool (e.g., a pushing or dragging rod) to make the second rail 30 move upwardly. During the upward movement of the second rail 30, the spring 466 releases energy and is rewound onto the spring storage wheel 462. In the process of rewind of the spring 466, the driving wheel 464 is driven to rotate, and the rotation of the driving wheel 464 drives the first reeling wheel 502 and the second reeling wheel 504 to rotate for pulling back the first pulling cord 60 and the second pulling cord 64, which are loosen because of the upward movement of the second rail 30.

During the upward movement of the second rail 30, the second rail 30 may be slanted as higher on the left side and lower on the right side, or alternatively, lower on the left side and higher on the right side, because the second rail 30 is moved too fast by the user or the forces applied by the user to the second rail 30 is uneven. This results in variations in the stacking uniformity when the first pulling cord 60 and the second pulling cord 64 are rolled up on the first reeling wheel 502 and the second reeling wheel 504, respectively. For example, when each of the pulling cords is wound on the corresponding reeling wheel, it may not be stacked in order and neatly arranged. Another possible situation is that when the pulling cords are wound on the reeling wheels for the same number of rotations, the pulling cord with higher tension will be collected with a shorter length, due to different tensions in each pulling cord. In both cases, the first pulling cord 60 and the second pulling cord 64 are collected with different lengths after the second rail 30 moves upwardly, at which point if the user stops applying the upward pushing force to the second rail 30 and lets the second rail 30 suspended naturally, the second rail 30 would be slanted and in a non-horizontal state.

Figure 46:
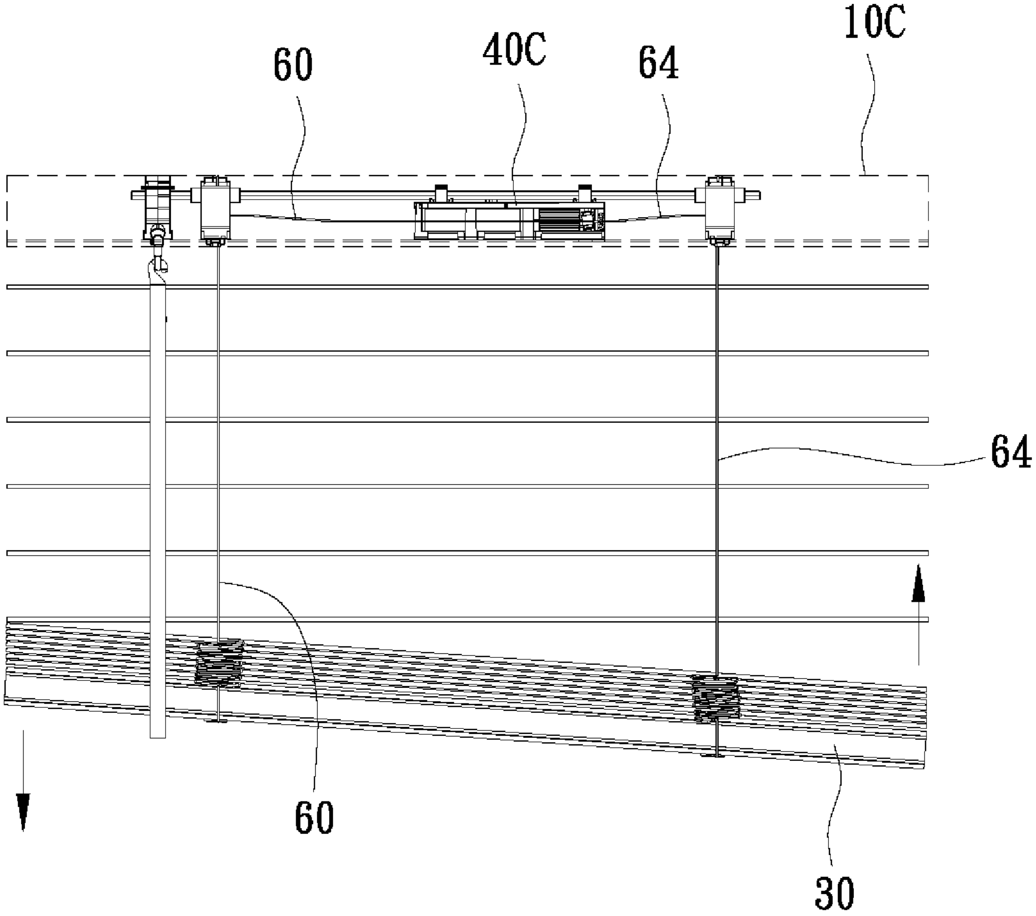
FIG. 46 schematically shows the second rail of the cordless window covering in the partial-retracted state, as the second rail is in a non-horizontal state as being higher on the left side and lower on the right side.
Figure 47:
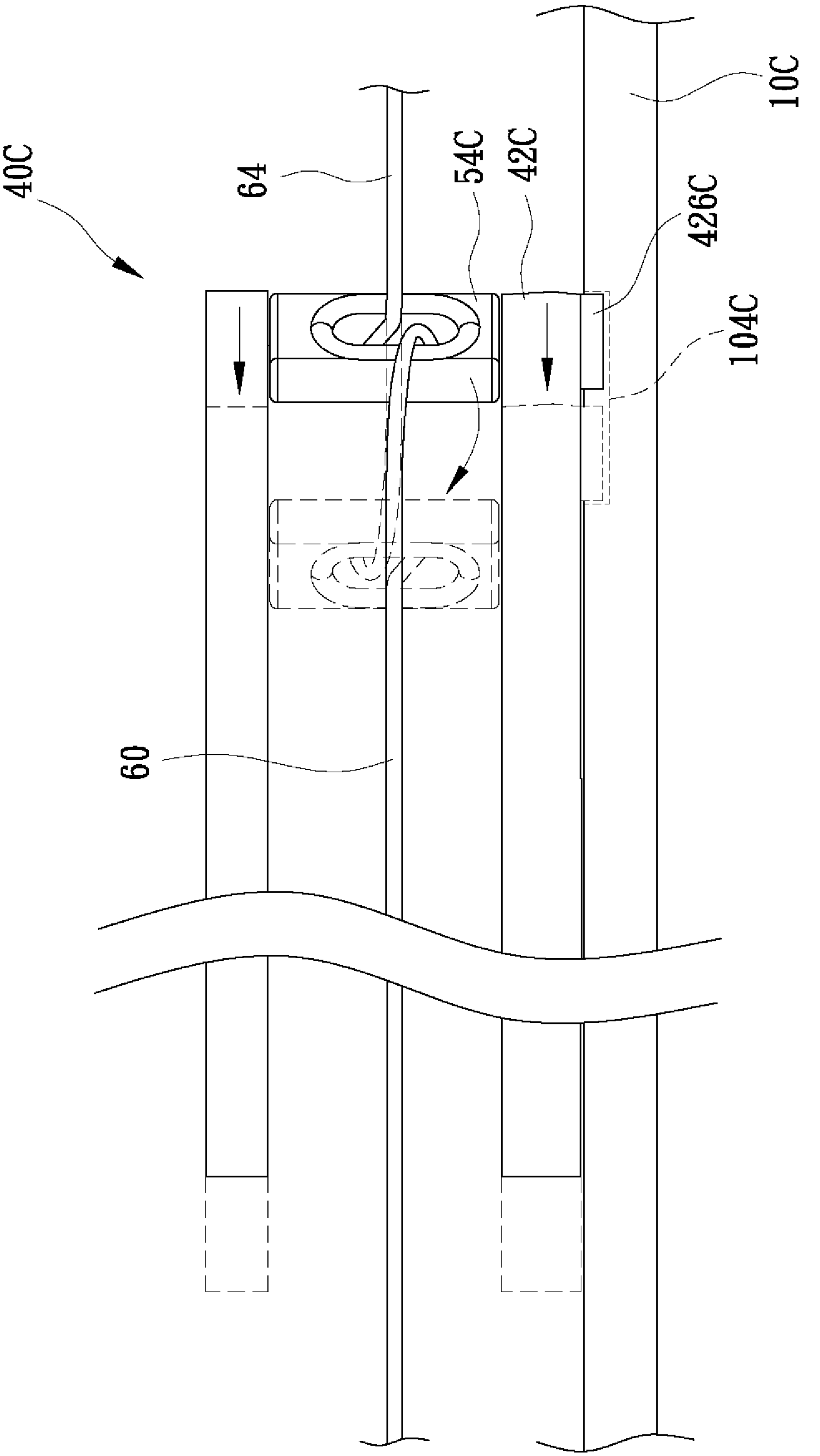
FIG. 47 schematically shows the action of the adjusting member and the cord-retracting device during levelness adjustment of the cordless window covering in FIG. 46.

Please refer to FIGS. 42, 46 and 47 together, in which the second rail 30 in a slanted state as being higher on the left side and lower on the right side is taken for example. For adjusting the levelness of the second rail 30, the user only has to exert a small force on the second rail 30, by slightly pulling down the left side of the second rail 30 or slightly pushing up the right side of the second rail 30, to make the first force applied by the first pulling cord 60 to the adjusting member 54C greater than the second force applied by the second pulling cord 64 to the adjusting member 54C. Because the force exerted by the user is extremely small, the first force and the second force are merely sufficient for triggering the pivotally swing movement of the adjusting member 54C and the slide movement of the cord-retracting device 40C relative to the first rail 10C, but not able to release the first pulling cord 60 and the second pulling cord 64 from the first reeling wheel 502 and the second reeling wheel 504 of the power assembly 50. When the first force is greater than the second force, the post body 544C of the adjusting member 54C swings around the first pivot hole 424C of the first casing 42C towards where the first pulling cord 60 extends from, i.e., the post body 544C of the adjusting member 54C pivotally swings towards the left side. Meanwhile, due to the slide movement of the first casing 42C, the cord-retracting device 40C moves with respect to the first rail 10C towards where the first pulling cord 60 extends from. As a result, a length of the first pulling cord 60 and a length of the second pulling cord 64 which are located between the first rail 10C and the second rail 30 respectively increases and decreases along with the movement of the adjusting member 54C until the second rail 30 is in a horizontal state.

Figure 48:
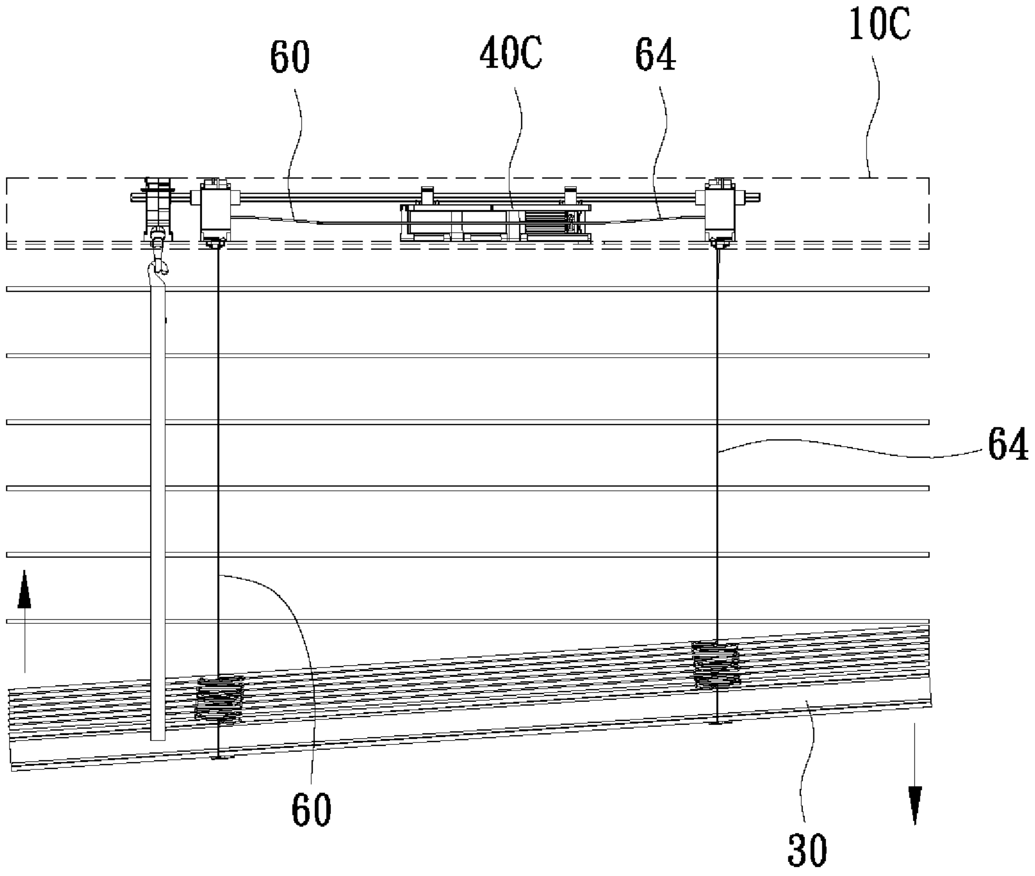
FIG. 48 schematically shows the second rail of the cordless window covering in the partial-retracted state, as the second rail is in a non-horizontal state as being lower on the left side and higher on the right side.
Figure 49:
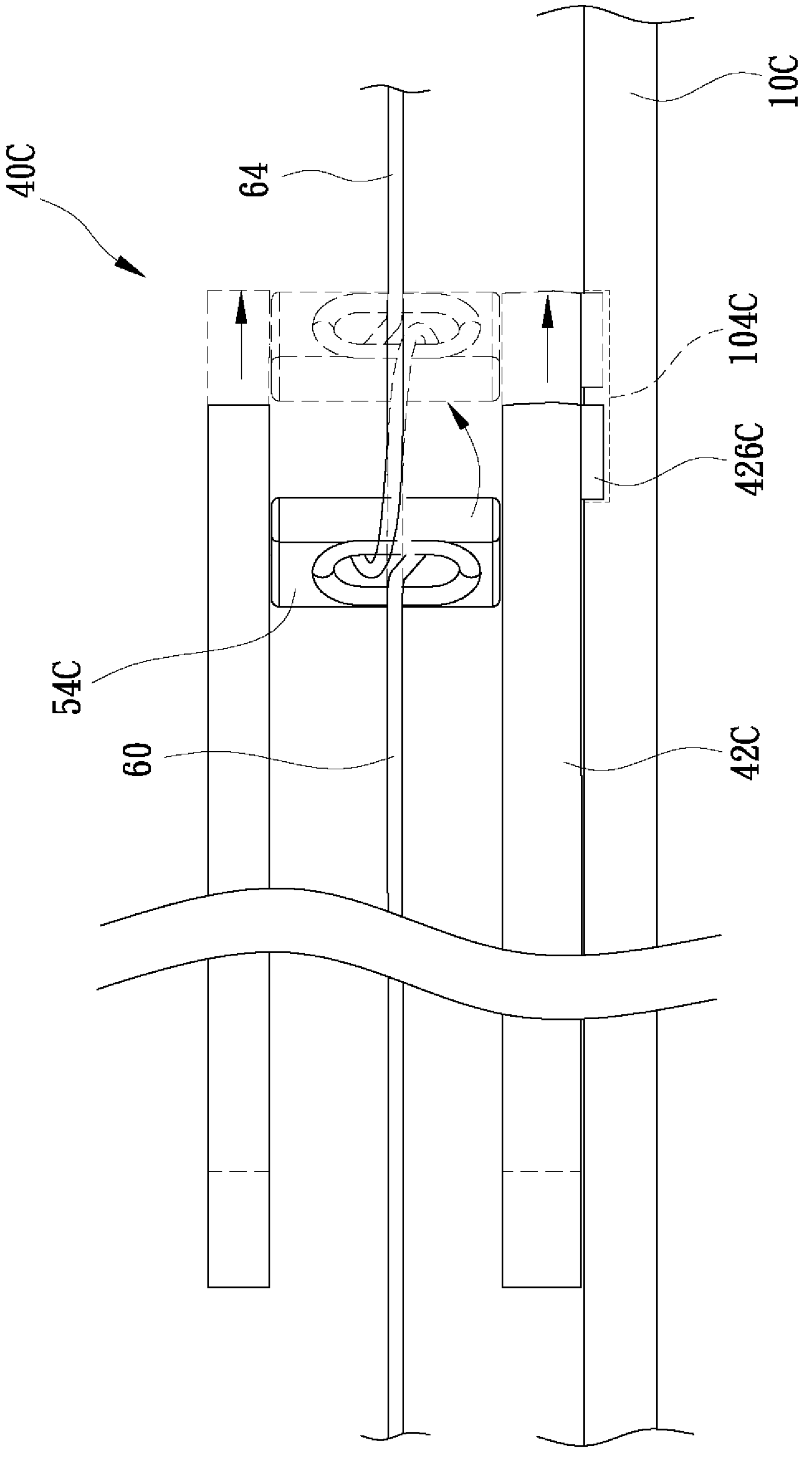
FIG. 49 schematically shows the action of the adjusting member and the cord-retracting device during levelness adjustment of the cordless window covering in FIG. 48.

In a similar manner, please refer to FIGS. 42, 48 and 49 together, in which the second rail 30 in a state as being lower on the left side and higher on the right side is taken for example. For adjusting the levelness of the second rail 30, the user only has to exert a small force on the second rail 30, by slightly pushing up the left side of the second rail 30 or slightly pulling down the right side of the second rail 30, to make the first force applied by the first pulling cord 60 to the adjusting member 54C smaller than the second force applied by the second pulling cord 64 to the adjusting member 54C. Because the force exerted by the user is extremely small, the first force and the second force are merely sufficient for triggering the pivotally swing movement of the adjusting member 54C with respect to the first casing 42C and the slide movement of the cord-retracting device 40C with respect to the first rail 10C, but not able to release the first pulling cord 60 and the second pulling cord 64 from the first reeling wheel 502 and the second reeling wheel 504 of the power assembly. When the first force is smaller than the second force, the post body 544C of the adjusting member 54C swings around the first pivot hole 424C of the first casing 42C towards where the second pulling cord 64 extends from, i.e., the post body 544C of the adjusting member 54C pivotally swings towards the right side. Meanwhile, due to the slide movement of the first casing 42C, the cord-retracting device 40C moves with respect to the first rail 10C towards where the second pulling cord 64 extends from. As a result, a length of the first pulling cord 60 and a length of the second pulling cord 64 which are located between the first rail 10C and the second rail 30 respectively decreases and increases along with the movement of the adjusting member 54C until the second rail 30 is in a horizontal state.

As seen from the above, when the second rail of the cordless window covering of the present disclosure is slightly slanted, the user can easily adjust the levelness of the second rail without necessity of largely changing the height of the second rail, achieving the goals of ease of operation and aesthetic appeal of the cordless window covering at the same time. Furthermore, compared with the above-mentioned embodiments in which only the adjusting member is movable in response to the forces, the adjusting member and the cord-retracting device according to the present embodiment can both undergo force-induced movements. Therefore, the present embodiment provides larger range of adjustment of the levelness of the second rail. In other words, the present embodiment can correct the second rail in the non-horizontal state with larger inclination angle.

In addition to the various exemplified cordless window coverings mentioned above, the cord-retracting device of the present disclosure can also be applied to a cordless window covering with an inverting system. For instance, in some embodiments, the aforesaid second rail can be a fixed rail or an upper rail fixed on a window frame or the wall, while the aforesaid first rail can be a movable rail or a lower rail attached to a free end of the covering body. The cord-retracting device is disposed in the movable rail or the lower rail for adjusting the levelness of the movable rail or the lower rail. In other words, the effect of the cord-retracting device remains the same no matter which rail or which position inside the rail it is disposed at. Therefore, the position where the cord-retracting device is disposed can be determined according to design requirements.

The embodiments described above are only some exemplary embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A cordless window covering, comprising:
- a first rail;
- a covering body, having a first edge disposed on one side of the first rail and a second edge opposing to the first edge;
- a second rail, connected to the second edge of the covering body so that the covering body is located between the first rail and the second rail;
- a first pulling cord and a second pulling cord; and
- a cord-retracting device, disposed in the first rail and comprising:
  - a first casing;
  - a power assembly, situated on the first casing;
  - a first reeling wheel, rotatably disposed on the first casing;
  - a second reeling wheel, rotatably disposed on the first casing and connected to the first reeling wheel in which the first reeling wheel and the second reeling wheel can be driven by each other to rotate concurrently; and
  - an adjusting member, situated on the first casing and movable with respect to the first casing;
- wherein a first end of the first pulling cord and a first end of the second pulling cord are respectively connected to the first reeling wheel and the second reeling wheel, and a second end of the first pulling cord and a second end of the second pulling cord extend in opposite directions after respectively going around the adjusting member, such that the first pulling cord and the second pulling cord respectively apply a first force and a second force in opposite directions to the adjusting member;
- wherein when the first force does not substantially equal to the second force, the adjusting member moves with respect to the first casing towards a side with greater force, and one of the first pulling cord and the second pulling cord applying greater force to the adjusting member than the other has a length thereof located between the first rail and the second rail elongate along with movement of the adjusting member.

2. The cordless window covering of claim 1, wherein the adjusting member has a pivot post located at one end of the adjusting member and connected to the first casing, such that the adjusting member can swing with respect to the first casing.

3. The cordless window covering of claim 1, wherein the first reeling wheel and the second reeling wheel are coaxially one stacked on the other vertically.

4. The cordless window covering of claim 1, wherein the power assembly comprises a driving wheel and a spring, and the driving wheel is rotatably disposed on the first casing; one end of the spring is connected to the driving wheel and can be wound onto or unwound from the driving wheel along with rotation of the driving wheel; the driving wheel is connected to the first reeling wheel and the second reeling wheel in a concurrent movable manner, so that the first reeling wheel and the second reeling wheel can be driven to rotate by the rotation of the driving wheel; when the spring is unwound from the driving wheel and makes the driving wheel rotate, the first reeling wheel and the second reeling wheel are driven to rotate and retract the first pulling cord and the second pulling cord respectively.

5. The cordless window covering of claim 1, wherein the first casing comprises a first guiding portion, and the adjusting member comprises a first guided portion at a first end of the adjusting member, wherein the first guided portion is movable with respect to the first guiding portion.

6. The cordless window covering of claim 5, wherein the first guiding portion is one of a first groove and a first protrusion, while the first guided portion is the other one of the first groove and the first protrusion, wherein the first protrusion stretches into the first groove and a length of the first groove is greater than a breadth of the first protrusion.

7. The cordless window covering of claim 5, further comprising a second casing opposing to and engaged with the first casing, and the first reeling wheel and the second reeling wheel are situated between the second casing and the first casing.

8. The cordless window covering of claim 7, wherein the second casing comprises a second guiding portion corresponding to the first guiding portion of the first casing, and the adjusting member comprises a second guided portion at a second end of the adjusting member, wherein the second guided portion is movable with respect to the second guiding portion.

9. The cordless window covering of claim 8, wherein the second guiding portion is one of a second groove and a second protrusion, while the second guided portion is the other one of the second groove and the second protrusion, wherein the second protrusion stretches into the second groove and a length of the second groove is greater than a breadth of the second protrusion.

10. The cordless window covering of claim 1, wherein the adjusting member has a through hole and a post body, and the through hole penetrates through the post body, wherein the second end of the first pulling cord and the second end of the second pulling cord pass through the through hole and then extend in opposite directions.

11. The cordless window covering of claim 10, wherein the adjusting member further comprises an annular member disposed around the through hole and corresponding to the through hole in shape.

12. The cordless window covering of claim 1, wherein the first rail comprises a third guiding portion on one surface thereof, and the first casing of the cord-retracting device comprises a third guided portion movable with respect to the third guiding portion.

13. The cordless window covering of claim 12, wherein the third guiding portion is one of a third groove and a third protrusion, while the third guided portion is the other one of the third groove and the third protrusion, wherein the third protrusion stretches into the third groove and a length of the third groove is greater than a breadth of the third protrusion.

* * * * *